United States Patent
Da Costa et al.

(10) Patent No.: US 10,715,068 B2
(45) Date of Patent: Jul. 14, 2020

(54) AUTO-BRAKING FOR AN ELECTROMAGNETIC MACHINE

(71) Applicant: EtaGen, Inc., Menlo Park, CA (US)

(72) Inventors: Anthony Da Costa, Mountain View, CA (US); Matthew Roelle, Belmont, CA (US); John Powers, Menlo Park, CA (US); Patrick Gorzelic, San Francisco, CA (US); Christopher David Gadda, Palo Alto, CA (US)

(73) Assignee: Mainspring Energy, Inc., Menlo Park, CA (US)

( * ) Notice: Subject to any disclaimer, the term of this patent is extended or adjusted under 35 U.S.C. 154(b) by 0 days.

(21) Appl. No.: 16/137,506

(22) Filed: Sep. 20, 2018

(65) Prior Publication Data

US 2019/0123668 A1 Apr. 25, 2019

Related U.S. Application Data

(60) Provisional application No. 62/561,166, filed on Sep. 20, 2017, provisional application No. 62/561,163, (Continued)

(51) Int. Cl.
*H02P 9/08* (2006.01)
*H02P 6/00* (2016.01)
(Continued)

(52) U.S. Cl.
CPC ............... *H02P 9/08* (2013.01); *F02B 71/04* (2013.01); *H02H 7/08* (2013.01); *H02P 3/18* (2013.01);
(Continued)

(58) Field of Classification Search
CPC .................................. H02P 9/08; H02P 9/006
(Continued)

(56) References Cited

U.S. PATENT DOCUMENTS 4,097,091 A 6/1978 Knorr
4,130,787 A 12/1978 Allaire et al.
(Continued)

FOREIGN PATENT DOCUMENTS

CN 106655963 A 5/2017
DE 102009048822 A1 4/2011
(Continued)

OTHER PUBLICATIONS

International Search Report dated Jan. 11, 2019 for Application No. PCT/US2018/052094.
Hopkins, Thomas, "DT003 Design tip: Implementing fast decay mode chopping using the L6506," Apr. 2012, pp. 1-4, STMicroelectronics.

\* cited by examiner

*Primary Examiner* — David Luo
(74) *Attorney, Agent, or Firm* — Haley Guiliano LLP

(57) ABSTRACT

Systems and methods are provided for braking a translator of a linear multiphase electromagnetic machine. The system detects a fault event, and in response to detecting the fault event, causes the translator to brake using an electromagnetic technique. Braking includes causing the translator to stop reciprocating, by applying a force opposing an axial motion, which may occur within one cycle, or over many cycles. The fault event may include, for example, a fault associated with an encoder, a controller, an electrical component, a communications link, a phase, or a subsystem. The system includes a power electronics system configured to apply current to the phases. The system may use position information, current information, operating parameters, or a combination thereof to brake. Alternatively, the system need not use position information, current information, and operating parameters, and may brake the translator independent of such information.

19 Claims, 25 Drawing Sheets

Related U.S. Application Data filed on Sep. 20, 2017, provisional application No. 62/561,167, filed on Sep. 20, 2017.

(51) Int. Cl.
*H02P 25/06* (2016.01)
*H02P 3/18* (2006.01)
*H02H 7/08* (2006.01)
*F02B 71/04* (2006.01)
*H02P 9/00* (2006.01)
*H02P 101/25* (2016.01)
*H02K 7/18* (2006.01)

(52) U.S. Cl.
CPC .............. *H02P 6/005* (2013.01); *H02P 6/006* (2013.01); *H02P 9/006* (2013.01); *H02P 25/06* (2013.01); *H02K 7/1884* (2013.01); *H02P 2101/25* (2015.01)

(58) Field of Classification Search
USPC ......................................... 318/687, 671, 560
See application file for complete search history.

(56) References Cited

U.S. PATENT DOCUMENTS

| | | | |
|---|---|---|---|
| 5,828,195 A | 10/1998 | Zalesski | |
| 6,559,615 B2* | 5/2003 | Sethi | G05G 1/30 318/565 |
| 6,686,715 B2* | 2/2004 | Fan | H02P 7/28 318/430 |
| 7,064,506 B2* | 6/2006 | Stewart | B60N 2/0244 318/280 |
| 9,016,435 B2 | 4/2015 | Allington et al. | |
| 2004/0070286 A1 | 4/2004 | Marzano | |
| 2007/0194632 A1 | 8/2007 | Yura et al. | |
| 2008/0105503 A1 | 5/2008 | Pribonic | |
| 2012/0193172 A1 | 8/2012 | Matscheko et al. | |
| 2016/0241173 A1 | 8/2016 | Prussmeier et al. | |

FOREIGN PATENT DOCUMENTS

| | | |
|---|---|---|
| EP | 2410650 A2 | 1/2012 |
| JP | 2007135308 A | 5/2007 |
| WO | WO2017084668 A1 | 5/2017 |

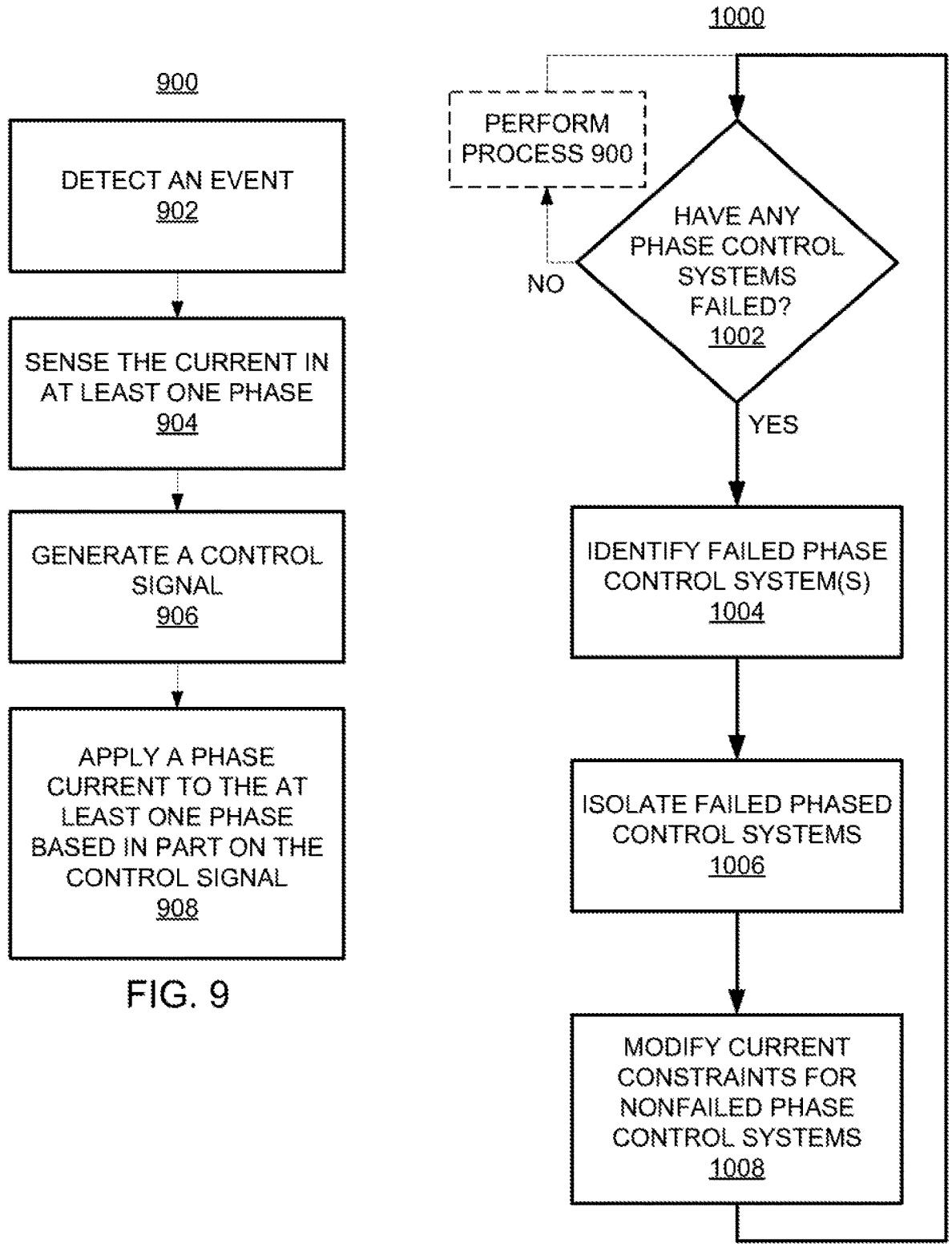

AUTO-BRAKING FOR AN ELECTROMAGNETIC MACHINE

The present disclosure is directed towards auto-braking, and more particularly towards auto-braking one or more translators of a multiphase electromagnetic machine in response to an event. This application claims the benefit of U.S. Provisional Patent Application No. 62/561,166 filed Sep. 20, 2017, U.S. Provisional Patent Application No. 62/561,163 filed Sep. 20, 2017, and U.S. Provisional Patent Application No. 62/561,167 filed Sep. 20, 2017, the disclosures of which are all hereby incorporated by reference herein in their entireties.

BACKGROUND

Systems that convert between kinetic energy and electrical energy, such as free piston systems, sometimes require fault management. Typical mechanically linked systems provide for a fixed trajectory. For example, in a conventional piston engine, energy is transferred to a crankshaft during an expansion stroke, while it is removed from the crankshaft during a compression stroke. If a fault occurs, the trajectory is usually maintained, and the moving parts can effectively spool down to a stop safely and predictably. Systems that do not include mechanical constraints, such as a free-piston machines having linear motors, for example, conventionally rely on extensive real-time control, and the loss of that control can be catastrophic.

Systems having multiple piston assemblies, such as opposed-piston engines typically require that the assemblies remain synchronized to some extent. If aspects of control are lost, or other faults occur, synchronization may suffer, and behavior of the system might become unpredictable.

SUMMARY

In some embodiments, the present disclosure is directed to a linear generator that includes a linear electromagnetic machine, a power electronics system coupled to the plurality of phases and control circuitry coupled to the power electronics system. The linear electromagnetic machine includes a translator and a stator comprising a plurality of phases. The control circuitry configured to detect a fault event; and in response to detecting the fault event, cause the translator of the linear multiphase electromagnetic machine to brake by using an electromagnetic technique.

In some embodiments, the control circuitry is further configured to determine the electromagnetic technique in response to detecting the fault event.

In some embodiments, the electromagnetic technique is a first electromagnetic technique, and the control circuitry is further configured to cause, using a second electromagnetic technique, the translator of the linear multiphase electromagnetic machine to brake.

In some embodiments, the electromagnetic technique is implemented in hardware or software.

In some embodiments, the control circuitry is further configured to determine availability information of at least one operating parameter of the linear multiphase electromagnetic machine, and determine the electromagnetic technique based on the availability information.

In some embodiments, the fault event is associated with one of a fault event associated with a controller, a fault event associated with an encoder, a fault event associated with a switch coupled to a phase of the multiphase electromagnetic machine, a fault event associated with a grid-tie inverter, a fault event associated with a shorted phase of the multiphase electromagnetic machine, a fault event associated with communication between one or more control subsystems, and a fault event associated with an operating parameter value of the linear multiphase electromagnetic machine.

In some embodiments, the control circuitry is further configured to determine phase current information for at least one phase of the linear multiphase electromagnetic machine, and the control circuitry is further configured to cause the translator to brake is based at least in part on the phase current information.

In some embodiments, the control circuitry is further configured to cause the translator to achieve a reduced position-velocity trajectory.

In some embodiments, the fault event includes an unavailability of position information of the translator, and wherein the electromagnetic technique is independent of position information.

In some embodiments, the translator includes a free-piston assembly.

In some embodiments, the present disclosure is directed to a linear generator that includes a linear electromagnetic machine, a power electronics system coupled to the plurality of phases and a DC bus, and control circuitry coupled to the power electronics system. The linear electromagnetic machine includes a translator and a stator comprising a plurality of phases. The power electronics system includes a resistor and at least one switch are coupled in series across the DC bus. The control circuitry is configured to detect a fault event; and in response to detecting the fault event, cause the translator of the linear multiphase electromagnetic machine to brake by closing the at least one switch.

In some embodiments, the DC bus is coupled to a grid-tie inverter, and the control circuitry is further configured to detect a fault associated with at least one of the DC bus and the grid-tie inverter.

In some embodiments, each phase of the linear multiphase electromagnetic machine includes a respective first phase lead and a respective second phase lead. Each first phase lead is coupled to a first side of a respective H-bridge coupled across the DC bus. Each second phase lead is coupled to a second side of the respective H-bridge across the DC bus. Each first phase lead is coupled by a first respective diode to the resistor, and the first respective diode has a polarity relative to the resistor. Each second phase lead is coupled by a second respective diode to the resistor, where the respective second diode has the polarity relative to the resistor. The control circuitry is further configured to cause switches of each first side and switches of each second side of each respective H-bridge to remain open.

In some embodiments, each phase of the linear multiphase electromagnetic machine includes a respective first phase lead and a respective second phase lead. Each first phase lead is coupled to a neutral wye connection, each second phase lead is coupled to a side of the respective half H-bridge across the DC bus. Each first phase lead is coupled by a first respective diode to the resistor, wherein the first respective diode has a polarity relative to the resistor. Each second phase lead is coupled by a second respective diode to the resistor, where the respective second diode has the polarity relative to the resistor. The control circuitry is further configured to cause switches of each first side and the switches of each respective half H-bridge to remain open.

In some embodiments, the present disclosure is directed to a linear generator that includes a linear electromagnetic machine, a power electronics system coupled to the plurality of phases, and control circuitry coupled to the power electronics system. The linear electromagnetic machine includes a translator and a stator comprising a plurality of phases. The control circuitry is configured to detect a fault event and determine phase current information for a plurality of phases of the linear multiphase electromagnetic machine. The control circuitry is configured to cause the power electronics system to apply to each phase of the plurality of phases a respective current based on the phase current information; and
in response to detecting the fault event, and determine, for at least one phase of the plurality of phases, a respective current. The control circuitry is configured to cause the power electronics system to apply the respective current to the at least one phase to oppose the motion of the translator to cause the translator to brake.

In some embodiments, the translator translates according to a first trajectory having a first apex position, and the control circuitry is further configured to cause the translator to achieve a second apex position. The second apex position is closer to a mid-stroke position than the first apex position.

In some embodiments, the at least one phase includes at least two phases, and wherein the control circuitry is further configured to determine a least norm solution for the respective current for each of the at least two phases.

In some embodiments, the present disclosure is directed to a linear generator that includes a linear electromagnetic machine, a power electronics system coupled to the plurality of phases, and control circuitry coupled to the power electronics system. The linear electromagnetic machine includes a translator and a stator comprising a plurality of phases. The control circuitry is configured to detect a fault event and determine a polarity indicative of an electromotive force (emf) in at least one phase of the linear multiphase electromagnetic machine caused by a motion of the translator. The control circuitry is configured to, in response to detecting the fault event, cause, based on the polarity, the power electronics system to apply a current to a respective phase of the at least one phase to cause a force acting on the translator that opposes an axial motion of the translator to cause the translator to brake.

In some embodiments, the control circuitry is further configured to determine phase current information for the respective phase, and determine the polarity based on the phase current information.

In some embodiments, the control circuitry is further configured to cause the power electronics system to short the respective phase for a first time period, determine phase current information for the respective phase for the first time period, and determine the polarity based on the phase current information. The control circuitry is further configured to cause the power electronics system to apply the current to the respective phase during a second time period that does not overlap with the first time period.

In some embodiments, the control circuitry is further configured to cause the power electronics system to apply a DC current to the respective phase during a first time period, determine phase current information for the respective phase for the first time period, and determine the polarity based on the phase current information. The control circuitry is further configured to cause the power electronics system to apply the current to the respective phase during a second time period that does not overlap with the first time period.

In some embodiments, the control circuitry is further configured to cause the power electronics system to apply the current to the respective phase further based on position information associated with the translator.

In some embodiments, the control circuitry is further configured to cause the power electronics system to apply the to the respective phase based on a control signal, and the control circuitry is further configured to compare the control signal to a threshold to determine the polarity.

In some embodiments, the present disclosure is directed to a linear generator that includes a linear electromagnetic machine, a power electronics system coupled to the plurality of phases, and control circuitry coupled to the power electronics system. The linear electromagnetic machine includes a translator and a stator comprising a plurality of phases. The power electronics system is coupled to the plurality of phases and includes a plurality of corresponding H-bridges. Each phase of the linear multiphase electromagnetic machine includes a respective first phase lead and a respective second phase lead. Each first phase lead is coupled to a first side of a respective H-bridge coupled across a DC bus. The first side includes a high-voltage switch and a low-voltage switch. Each second phase lead is coupled to a second side of the respective H-bridge across the DC bus. The second side includes a high-voltage switch and a low-voltage switch. The control circuitry is further configured to detect a fault event, and in response to detecting the fault event, apply braking signals to the first high-voltage switch, the first low-voltage switch, the second high-voltage switch, and the second low-voltage switch to cause the translator to brake.

In some embodiments, the braking signals include a first set of signals including a first signal applied to activate both the first high-voltage switch and the second high-voltage switch for a first time period, and to open the first high-voltage switch and the second high-voltage switch for a second time period, and a second signal applied to open both the first low-voltage switch and the second low-voltage switch during both the first time period and the second time period. In some embodiments, the braking signals include a second set of signals including a third signal applied to activate both the first low-voltage switch and the second low-voltage switch for a third time period, and to open the first low-voltage switch and the second low-voltage switch for a fourth time period, and a fourth signal applied to open both the first high-voltage switch and the second high-voltage switch during both the third time period and the fourth time period.

In some embodiments, the first signal includes an on-off duty cycle, and wherein the third signal includes an on-off duty cycle.

In some embodiments the braking signals are configured to cause a first state wherein the first high-voltage switch and the second high-voltage switch are closed for a first time period. In some embodiments the braking signals are configured to cause a second state wherein the first low-voltage switch and the second low-voltage switch are closed for a second time period that does not overlap the first time period. In some embodiments the braking signals are configured to cause a third state wherein the first high-voltage switch, the second high-voltage switch, the first low-voltage switch, and the second low-voltage switch are all open for a third time period that does not overlap the first time period or the second time period.

In some embodiments, the present disclosure is directed to a linear generator that includes a linear multiphase electromagnetic machine, a power electronics system coupled to the plurality of phases, and control circuitry coupled to the power electronics system. The linear electromagnetic machine includes a stator having a plurality of phases. The linear electromagnetic machine also includes a translator having a magnetic section and at least one conductive section axially offset from the magnetic section. The magnetic section is axially offset from a subset of phases of the plurality of phases. The control circuitry is further configured to detect a fault event and in response to detecting the fault event, cause the power electronics system to apply to at least one phase of the subset of phases a respective current configured to generate an eddy current in the at least one conductive section, wherein the eddy current generates a force that opposes an axial motion of the translator to cause the translator to brake.

In some embodiments, the present disclosure is directed to a method for braking a translator of a linear multiphase electromagnetic machine. The method includes detecting a fault event using circuitry, and in response to detecting the fault event, causing, using an electromagnetic technique, the translator of the linear multiphase electromagnetic machine to brake.

In some embodiments, the present disclosure is directed to a method for braking a translator of a linear multiphase electromagnetic machine, wherein the linear multiphase electromagnetic machine is coupled to a DC bus, and wherein a resistor and at least one switch are coupled in series across the DC bus. The method includes detecting a fault event using circuitry and in response to detecting the fault event, causing the translator of the linear multiphase electromagnetic machine to brake by closing the at least one switch.

In some embodiments, the present disclosure is directed to a method for braking a translator of a linear multiphase electromagnetic machine. The method includes detecting a fault event using circuitry, determining phase current information for a plurality of phases of the linear multiphase electromagnetic machine, applying to each phase of the plurality of phases a respective current based on the phase current information. In response to detecting the fault event, the method includes determining, for at least one phase of the plurality of phases, a respective current, and applying the respective current to the at least one phase to oppose the motion of the translator to cause the translator to brake.

In some embodiments, the present disclosure is directed to a method for braking a translator of a linear multiphase electromagnetic machine. The method includes detecting a fault event using circuitry, determining a polarity indicative of an electromotive force (emf) in at least one phase of the linear multiphase electromagnetic machine caused by a motion of the translator, and in response to detecting the fault event, causing, based on the polarity, a current to be applied to a respective phase of the at least one phase to cause a force acting on the translator that opposes an axial motion of the translator to cause the translator to brake.

In some embodiments, the present disclosure is directed to a method for braking a translator of a linear multiphase electromagnetic machine, wherein each phase of the linear multiphase electromagnetic machine includes a respective first phase lead and a respective second phase lead, each first phase lead is coupled to a first side of a respective H-bridge coupled across a DC bus, wherein the first side comprises a high-voltage switch and a low-voltage switch, and each second phase lead is coupled to a second side of the respective H-bridge across the DC bus, wherein the second side comprises a high-voltage switch and a low-voltage switch. The method includes detecting a fault event using circuitry and in response to detecting the fault event, applying braking signals to the first high-voltage switch, the first low-voltage switch, the second high-voltage switch, and the second low-voltage switch to cause the translator to brake.

In some embodiments, the present disclosure is directed to a method for braking a translator of a linear multiphase electromagnetic machine, wherein the linear multiphase electromagnetic machine includes a stator comprising a plurality of phases, and the translator includes a magnetic section and at least one conductive section axially offset from the magnetic section. The magnetic section is axially offset from a subset of phases of the plurality of phases. The method includes detecting a fault event using circuitry and in response to detecting the fault event, applying to at least one phase of the subset of phases a respective current configured to generate an eddy current in the at least one conductive section, wherein the eddy current generates a force that opposes an axial motion of the translator to cause the translator to brake.

In some embodiments, the present disclosure is directed to a non-transient computer readable medium including non-transitory computer readable instructions for braking a translator of a linear multiphase electromagnetic machine. The non-transitory computer readable instructions include an instruction for detecting, using circuitry, a fault event and an instruction for, in response to detecting the fault event, causing, using an electromagnetic technique, the translator of the linear multiphase electromagnetic machine to brake.

In some embodiments, the present disclosure is directed to a non-transient computer readable medium including non-transitory computer readable instructions for braking a translator of a linear multiphase electromagnetic machine, wherein the linear multiphase electromagnetic machine is coupled to a DC bus, and wherein a resistor and at least one switch are coupled in series across the DC bus. The non-transitory computer readable instructions include an instruction for detecting, using circuitry, a fault event and an instruction for, in response to detecting the fault event, causing the translator of the linear multiphase electromagnetic machine to brake by closing the at least one switch.

In some embodiments, the present disclosure is directed to a non-transient computer readable medium including non-transitory computer readable instructions for braking a translator of a linear multiphase electromagnetic machine. The non-transitory computer readable instructions include an instruction for detecting, using circuitry, a fault event, an instruction for determining phase current information for a plurality of phases of the linear multiphase electromagnetic machine, an instruction for applying to each phase of the plurality of phases a respective current based on the phase current information. In response to detecting the fault event the instructions include an instruction for determining, for at least one phase of the plurality of phases, a respective current, and an instruction for applying the respective current to the at least one phase to oppose the motion of the translator to cause the translator to brake.

In some embodiments, the present disclosure is directed to a non-transient computer readable medium including non-transitory computer readable instructions for braking a translator of a linear multiphase electromagnetic machine. The non-transitory computer readable instructions include an instruction for detecting, using circuitry, a fault event, an instruction for determining a polarity indicative of an electromotive force (emf) in at least one phase of the linear multiphase electromagnetic machine caused by a motion of the translator, and an instruction for, in response to detecting the fault event, causing, based on the polarity, a current to be applied to a respective phase of the at least one phase to cause a force acting on the translator that opposes an axial motion of the translator to cause the translator to brake.

In some embodiments, the present disclosure is directed to a non-transient computer readable medium including non-transitory computer readable instructions for braking a translator of a linear multiphase electromagnetic machine, wherein each phase of the linear multiphase electromagnetic machine includes a respective first phase lead and a respective second phase lead, and each first phase lead is coupled to a first side of a respective H-bridge coupled across a DC bus, wherein the first side comprises a high-voltage switch and a low-voltage switch. Each second phase lead is coupled to a second side of the respective H-bridge across the DC bus, wherein the second side comprises a high-voltage switch and a low-voltage switch. The non-transitory computer readable instructions include an instruction for detecting, using circuitry, a fault event, and an instruction for, in response to detecting the fault event, applying braking signals to the first high-voltage switch, the first low-voltage switch, the second high-voltage switch, and the second low-voltage switch to cause the translator to brake.

In some embodiments, the present disclosure is directed to a non-transient computer readable medium including non-transitory computer readable instructions for braking a translator of a linear multiphase electromagnetic machine. The linear multiphase electromagnetic machine includes a stator having a plurality of phases. The translator includes a magnetic section and at least one conductive section axially offset from the magnetic section. The magnetic section is axially offset from a subset of phases of the plurality of phases. The non-transitory computer readable instructions include an instruction for detecting, using circuitry, a fault event and an instruction for, in response to detecting the fault event, applying to at least one phase of the subset of phases a respective current configured to generate an eddy current in the at least one conductive section, wherein the eddy current generates a force that opposes an axial motion of the translator to cause the translator to brake.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 9 shows a flowchart of an illustrative process for managing phase current, in accordance with some embodiments of the present disclosure; and FIG. 10 shows a flowchart of an illustrative process for managing one or more failed phase control systems, in accordance with some embodiments of the present disclosure.

DETAILED DESCRIPTION

Figure 1:
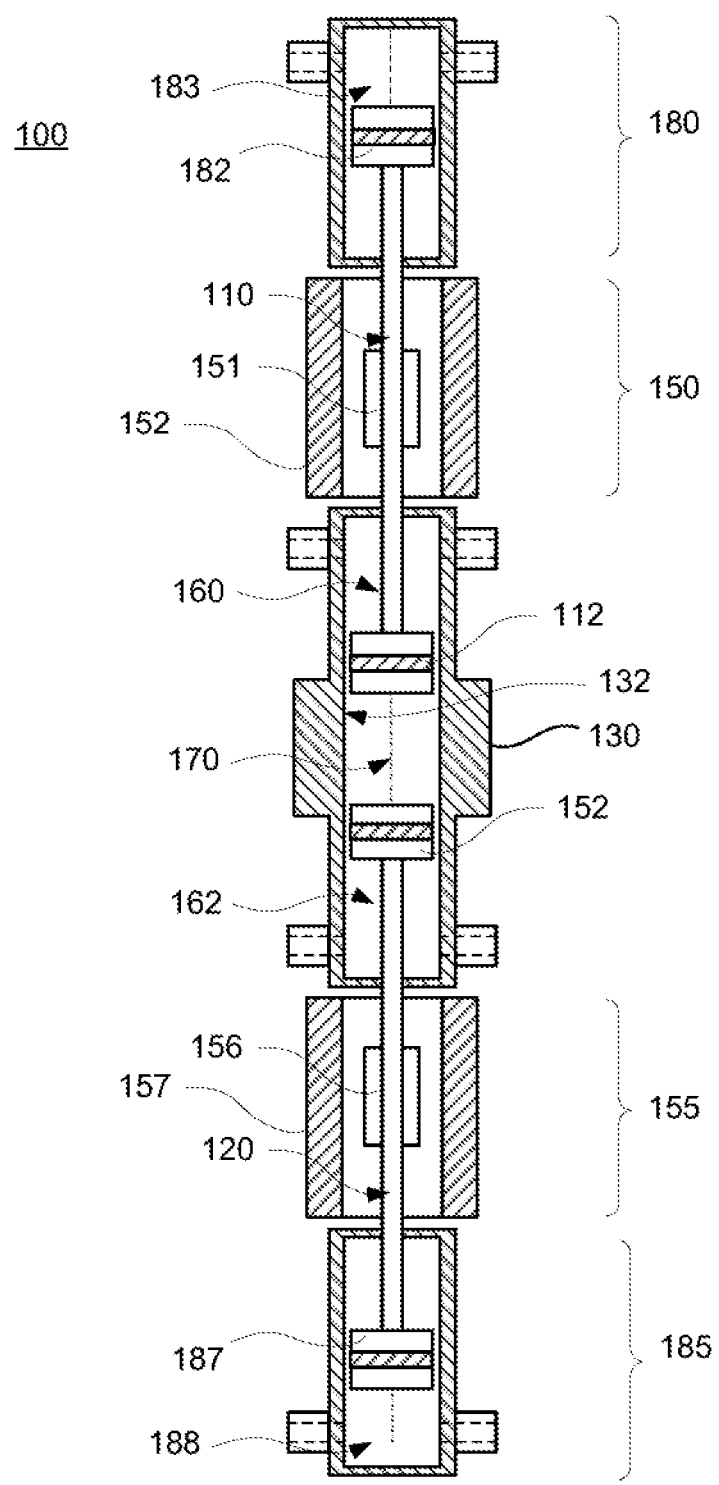
FIG. 1 shows a cross-sectional view of a device including two linear electromagnetic machines, in accordance with some embodiments of the present disclosure.

The present disclosure is directed to electromagnetic machines. For example, an electromagnetic machine may include a stator having one or more phases.

In some embodiments, the present disclosure is directed to automatically braking a translating assembly of an electromagnetic machine in response to an event such as a fault event (e.g., a controller stops receiving signals from the central control unit, or a position encoder for the translating assembly stops producing a signal to a central control unit). "Braking", as used herein, is the act of causing a trajectory (e.g., a position-velocity trajectory) of a translator to reduce in stroke, peak velocity, or both. For example, braking may include applying current to phases of a multiphase electromagnetic machine to produce a force on a translator that opposes motion of the translator (e.g., thereby slowing it down by extracting energy in the form of electrical work), which acts to shrink the trajectory. In a further example, braking may include removing kinetic energy from a translator, actively or passively, which may act to shrink the trajectory of the translator. It will be understood that under normal operation, the electromagnetic force on a translator may oppose motion to extract electrical energy from kinetic energy. Braking can be distinguished from normal operation by the intent to reduce a translator stroke, reduce a translator velocity, decelerate a translator, remove energy from a translator, or otherwise bring the translator to rest, near rest, or an otherwise reduced-power operating condition. For example, during normal operation, a translator may achieve a zero velocity at ends of the stroke, and a maximum velocity near the middle of the stroke. Normal operation is typically directed to repeating a set of strokes, defining cycles, to provide a consistent power output (e.g., whether steady or transient). Braking is typically directed to bringing a translator towards a stop, as a result of an indication to shut down (e.g., for maintenance, to avoid damage, or in response to an event such as a fault). For example, the descriptions of FIGS. 11-30 provide illustrative examples of braking systems and techniques for braking multiphase systems.

In some embodiments, the present disclosure is directed to distributing components, control, or both, among phases, rather than grouping many phases together. For example, a stator may include thirty windings corresponding to thirty iron cores. Rather than grouping many windings together (e.g., six groups of five phases), each winding and iron core may be treated as a phase to provide better spatial resolution of phase currents (e.g., thirty phase currents rather than six phase currents in the grouped case). Further, any suitable components of the electrical network may be distributed to these phase control systems to provide robustness and reliability. For example, the descriptions of FIGS. 4-10 provide illustrative examples of controls and arrangements of multiphase systems.

A linear electromagnetic machine (LEM) may include a high number of windings (e.g., thirty windings) and a number of phases that are at least two to three times greater (e.g., six phases to nine phases) than the number of phases in conventional LEM designs (e.g., three phases). A LEM may include windings, which may optionally be coupled in series into groups, forming corresponding phases (e.g., five windings per phase for six phases, or one winding per phase for thirty phases). Grouping windings in series into phases reduces the number of control electronics and power transistors needed to operate the LEM. However, a reduction in the number of components may increase reliability concerns.

Grouping the windings also means that each grouped winding has the same current, which may be non-ideal in a LEM. For example, it may be desired for a phase control system to apply time-phased currents to the windings to more optimally generate electromagnetic force based on a translator's instantaneous position, which changes in time during operation. In the present disclosure, windings may be ungrouped, or grouped to any suitable extent, to provide spatial resolution, robustness, and reliability of the provided LEM.

In some embodiments, the present disclosure may be applied to multiphase electromagnetic machines. For example, in some embodiments, the present disclosure describes a LEM that includes a large number of windings. It will be understood that a large number of phases refers to a number of phases in excess of conventional LEM designs (e.g., three phases). The terms "winding," "phase," and "group" are used herein to describe aspects of a LEM.

A "winding" refers to a continuous, electrically conductive wire wrapping around one or more iron cores, having a single current which may be applied (e.g., regardless of control, the same current is applied). As used herein, the term "winding" is defined by a state of hardware. For example, a winding may include copper wire wound around a single iron core, having two terminal ends to which voltage may be applied. In a further example, a winding may include a contiguous length of copper wire wound around several iron cores in series, having two terminal ends to which voltage may be applied. In a further example, a winding may include several lengths of copper wire wound around several corresponding iron cores, and crimped together in series (e.g., using a butt-splice connector or other suitable connector) to have two terminal ends to which voltage may be applied. In an illustrative example, a stator of a LEM may include thirty windings and thirty corresponding iron cores, with sixty terminal ends (i.e., thirty pairs) to which voltage may be applied. Windings may be combined (e.g., a terminal end of one winding may be hardwired to a terminal end of another winding) or separated (e.g., a continuous wrapping of copper wire around several teeth may be cut in between the teeth to create separate windings).

A "phase" refers to a winding, or group of windings, that can be controlled individually (e.g., to which a unique phase current can be applied). To illustrate, a phase may refer to the number of individually controllable N/S pole pairs of a stator. As used herein, the term "phase" is defined by a state of control (e.g., how current is applied). For example, phases may be coupled by a wye neutral, and interact with one another (e.g., not necessarily independent, but rather part of a network), but still be controlled individually. A phase is useful, for example, to describe time behavior of an applied current to one or more phases. As a translator moves relative to a stator, the "phasing" of currents in the phases determines the instantaneous current applied to each phase. For example, a winding may include copper wire wound around a single iron core, and that winding may correspond to a phase if it can be controlled independently (e.g., by a dedicated phase control system). In a further example, a winding may include a continuous length of copper wire wound around several iron cores in series, and the entire length of wire and the cores correspond to a phase. It is apparent that the number of phases in a LEM is equal to or less than the number of windings in the LEM.

A "group," in the context of windings and phases, refers to more than one item combined in some way. A group of windings refers to windings connected together such that a single current may be applied. A group of phases refers to phases that are controlled to act as a single phase by applying the same current at the same time. Accordingly, a group of windings refers to a state of hardware, and a group of phases refers to an aspect of control.

FIG. 1 shows a cross-sectional view of illustrative device 100, including two linear electromagnetic machines 150 and 155, in accordance with some embodiments of the present disclosure. Free-piston assemblies 110 and 120 (i.e., also called translators) include respective pistons 112 and 152, respective pistons 182 and 187, and respective translator sections 151 and 156. Device 100 includes cylinder 130, having bore 132, which may, for example, house a high-pressure section (e.g., a combustion section) between pistons 112 and 152.

In some embodiments, device 100 includes gas springs 180 and 185, which may be used to store and release energy during a cycle in the form of compressed gas (e.g., a driver section). For example, free-piston assemblies 110 and 120 may each include respective pistons 182 and 187 in contact with respective gas regions 183 and 188 (e.g., high-pressure regions).

Cylinder 130 may include bore 132, centered about axis 170. In some embodiments, free-piston assemblies 110 and 120 may translate along axis 170, within bore 132, allowing the gas region in contact with pistons 112 and 152 to compress and expand.

In some embodiments, free-piston assemblies 110 and 120 include respective translator sections 151 and 156 (e.g., which may include magnets), which interact with respective stators 152 and 157 (e.g., controlled by a power electronics system) to form respective LEMs 150 and 155. For example, as free-piston assembly 110 translates along axis 170 (e.g., during a stroke of an engine cycle), translator section 151 may induce current in windings of stator 152. Further, current may be supplied to respective windings of stator 152 to generate an electromagnetic force on free-piston assembly 110 (e.g., to affect motion of free-piston assembly 110). Braking refers to the application of a force to a translator that opposes an axial motion of the translator (e.g., along axis 170 as shown in FIG. 1), to reduce a trajectory, slow reciprocation to a stop, or otherwise remove kinetic energy from a translator to significantly slow, or stop, the system (e.g., stop device 100). In some embodiments, a control system is configured to provide synchronization between translators 110 and 120, during normal operation, braking, or both. In some embodiments, during braking, energy is extracted from one or more translators without regard to efficiency, optimal control, or other constraints that may be in effect during normal operation. For example, tolerances between desired and achieved operating parameter values (e.g., a desired and achieved apex position) may be loosened during braking.

Figure 2:
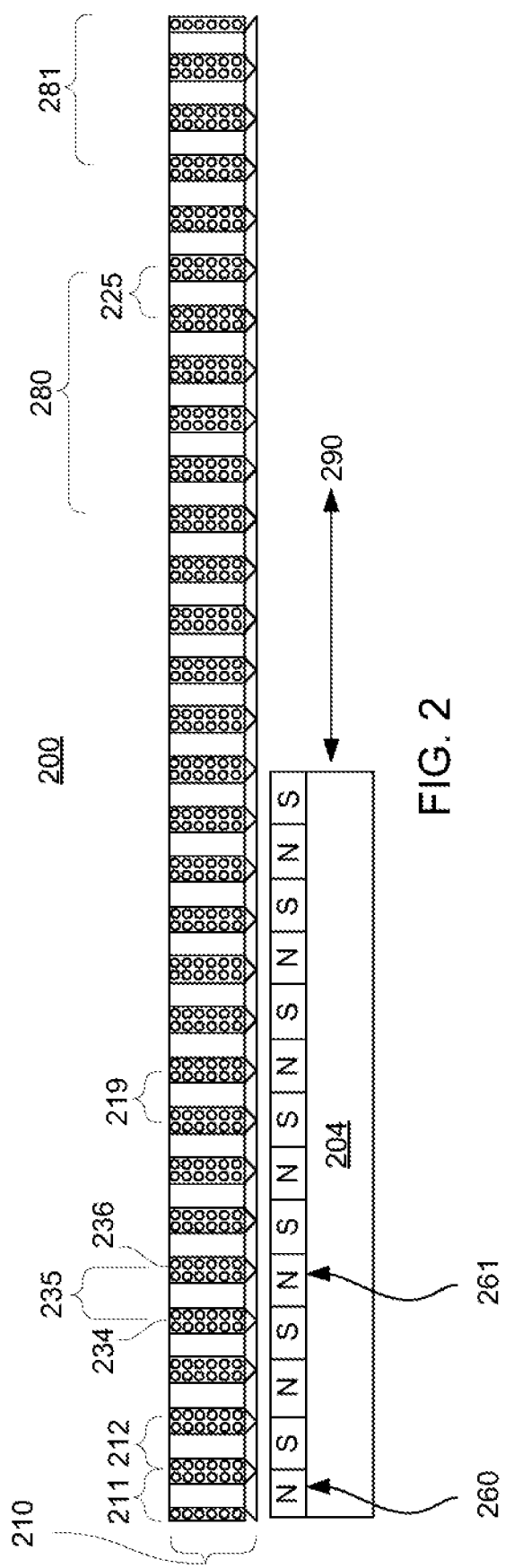
FIG. 2 shows a cross-sectional view of an illustrative linear electromagnetic machine (LEM), in accordance with some embodiments of the present disclosure.

FIG. 2 shows a cross-sectional view of illustrative LEM 200, including stator 210 and translator section 204, in accordance with some embodiments of the present disclosure. Translator section 204 may be configured to move along axis 290, relative to stator 210. Stator 210 includes a plurality of windings (e.g., winding 234), wound around corresponding ferrous cores (e.g., iron core 236). A phase refers to a group of one or more iron cores and corresponding windings, to which a single current is applied. Accordingly, a phase may include any suitable number of cores and corresponding windings, which may be, for example, coupled in series. A phase control system (e.g., included in a motor controller or control system) may be configured to apply current, via a corresponding power electronics system, to each respective phase. To illustrate, exemplary phase 280 includes five iron cores and five windings (e.g., one of which is winding 225), which may be coupled in series. To illustrate further, each winding may correspond to a respective phase (e.g., no windings are grouped or wound together in series). Accordingly, a single current may be applied to the five windings (i.e., because they are connected in series). Any suitable configuration of windings, grouped into any suitable number of phases, may be used in accordance with the present disclosure. To further illustrate, exemplary phase 281 includes three iron cores and three windings, which may be coupled in series.

The iron cores and windings of stator 210 are configured to generate a magnetic field causing a net electromagnetic force on translator section 204, when translator section 204 overlaps the cores axially. The net electromagnetic force may be oriented in a direction substantially parallel to axis 290. For example, referencing FIG. 2 and the illustrated relative position of translator section 204, windings 211, 212, and 219 (e.g., corresponding to one or more phases) may interact electromagnetically with translator section 204. However, at the illustrated position, the phase corresponding to winding 225 (e.g., illustrative phase 280) does not have a substantially strong electromagnetic interaction with translator section 204. As translator section 204 moves to the right, eventually it will axially overlap with winding 225, and accordingly the phase corresponding to winding 225 will be able to more substantially electromagnetically interact with translator section 204. As an illustrative example, as translator section 204 axially moves over a winding, a back electromotive force (back emf) is generated in the winding, and an electromotive force may be applied to translator section 204 as a result of current flow in the winding.

Translator section 204, as shown in FIG. 2, includes an array of multiple permanent magnets arranged axially (relative to axis 290), with polarity indicated as North "N" or South "S." It will be understood that the magnet array of FIG. 2 is an illustrative example, and that a translator may include any suitable arrangement of permanent magnets, or may include no permanent magnets (e.g., an induction electromagnetic machine). As translator section 204 moves along axis 290 relative to stator 210, current may flow through windings of one or more phases.

As shown in FIG. 2, assuming each winding corresponds to a phase, stator 210 includes thirty phases. Also, as shown in FIG. 2, translator section 204 includes fourteen magnet poles. As shown in FIG. 2, the axial alignment of phase one (i.e., corresponding to winding 211) and magnetic pole 260 is different from the axial alignment of phase five (i.e., corresponding to winding 235) and magnetic pole 261. Accordingly, applying the same current in phase one and phase five will not necessarily be the best current for the position of one or both of the magnets. For example, the relative difference in alignment of phases one and five with respective magnetic poles 260 and 261 may correspond to a difference in effective force constants (e.g., electromagnetic force divided by current) for phases one and five at the shown position of translator 204. Phases in a permanent magnet motor must be properly commutated to achieve force. This commutation can be achieved electronically by measuring or estimating the position of magnets relative to phases.

Figure 3:
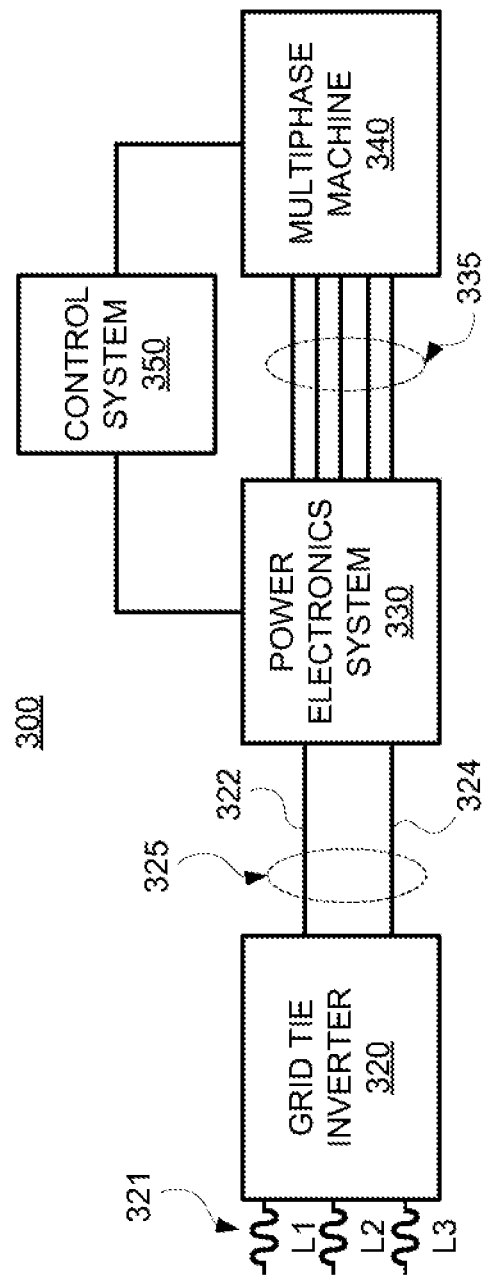
FIG. 3 shows a block diagram of an illustrative system for controlling a multiphase machine, in accordance with some embodiments of the present disclosure.

FIG. 3 shows a diagram of illustrative system 300, in accordance with some embodiments of the present disclosure. System 300 includes multiphase machine 340, power electronics system 330, control system 350, and grid-tie inverter 320. System 300 may be referred to as a linear generator. It will be understood that while shown separately in FIG. 3, multiphase machine 340 and power electronics system 330 may be integrated, or otherwise combined to any suitable extent. For example, in some embodiments, multiphase machine 340 and power electronics system 330 may be affixed to a frame separately, coupled by phase leads 335. In a further example, in some embodiments, power electronics system 330 may be integrated as part of multiphase machine 340. In a further example, multiphase machine 340 may include a stator having a plurality of phases and a translator (e.g., and other suitable components such as cylinders, bearings, plumbing, etc.), with phase leads 335 that are coupled to DC bus 325 by power electronics system 330.

Multiphase machine 340 may include a system similar to that shown in FIG. 1 (e.g., a free-piston generator), for example. In general, multiphase machine 340 may include one or more translating assemblies (i.e., "translators") which may undergo reciprocating motion relative to corresponding one or more stators under the combined effects of gas pressures and electromagnetic forces. The translators may, but need not, include permanent magnets, which may generate a back electromotive force (emf) in phases of the respective stator. It will be understood that, as used herein and as widely understood, back electromotive force refers to a voltage (e.g., causing a current that opposes the current due to an applied phase voltage). Power electronics system 330 are configured to provide current to the phases of the stators. For example, power electronics system 330 may expose phase leads of phases of the stator to one or more buses of a DC bus, a neutral, a ground, or a combination thereof.

Power electronics system 330 may include, for example, switches (e.g., insulated gate bipolar transistors (IGBTs), metal oxide semiconductor field effect transistor (MOSFET)), diodes, current sensors, voltage sensors, circuitry for managing PWM signals, any other suitable components, or any suitable combination thereof. For example, power electronics system 330 may include one or more H-bridges, or other motor control topology of switches for applying current to one or more phases. In some embodiments, power electronics system 330 may interface with multiphase machine 340 via phase leads 335 which couple to windings of the stators, and power electronics system 330 may interface with grid-tie inverter 320 via DC bus 325 (e.g., a pair of buses, one bus at a higher voltage relative to the other bus). Bus 322 and bus 324 together form DC bus 325 in system 300. For example, bus 322 may be at nominally 800V relative to 0V of bus 324 (e.g., bus 322 is the "high" and bus 324 is the "low"). Bus 322 and bus 324 may be at any suitable, nominal voltage, which may fluctuate in time about a mean value, in accordance with the present disclosure. Accordingly, the term "DC bus" as used herein shall refer to a pair of buses having a roughly fixed mean voltage difference, although the instantaneous voltage may fluctuate, vary, exhibit noise, or otherwise be non-constant.

Grid-tie inverter 320 may be configured to manage electrical interactions between AC grid 321 (e.g., three-phase 480 VAC) and DC bus 325. In some embodiments, grid-tie inverter 320 is configured to provide electrical power to AC grid 321 from multiphase machine 340 (e.g., a free-piston engine) via power electronics system 330. In some embodiments, grid-tie inverter 320 may be configured to source electrical power from AC grid 321 to input to multiphase machine 340 (e.g., a free-piston air compressor) via power electronics system 330. In some embodiments, grid-tie inverter 320 manages electrical power in both directions (e.g., to and from AC grid 321). In some embodiments, grid-tie inverter 320 rectifies AC power from AC grid 321 to supply electrical power over DC bus 325. In some embodiments, grid-tie inverter 320 converts DC power from DC bus 325 to AC power for injecting into AC grid 321. In some embodiments, grid-tie inverter 320 generates AC waveforms of current and voltage that are suitable for AC grid 321. For example, grid-tie inverter 320 may manage a power factor, frequency, voltage, or combination thereof of AC power injected into AC grid 321.

Although shown as being coupled to AC grid 321 in FIG. 3, grid-tie inverter 320 may be coupled directly to a load, a power source, another generator system, another grid-tie inverter, any other suitable electric power system, or any combination thereof. For example, generator system 300 may be in "islanding" mode or "stand-alone" mode, wherein AC grid 321 may be a local AC grid, having an AC load. In some embodiments, generator system 300 need not include GTI 320, and may be configured for a direct DC application (e.g., a DC grid). For example, DC bus 325 may be coupled to a DC grid, DC load, or any other suitable DC electrical architecture.

FIGS. 4-7 illustrate various arrangements of LEMs, phase control systems, grid-tie inverters, DC buses, electrical components, and AC grids. Arrangements 400, 500, 600, and 700 of FIGS. 4-7 are illustrative embodiments of the present disclosure, and may be combined, appended, truncated, or otherwise suitably modified in accordance with the present disclosure. Further, the components shown in FIGS. 4-7 may be combined, appended, truncated, or otherwise suitably modified in accordance with the present disclosure.

It will be understood that the topology of arrangements 400, 500, 600, and 700 of FIGS. 4-7 need not represent actual physical geometries of a linear generator. For example, referencing FIG. 4, phases one through N may be aligned along the axis of each of LEMs 402 and 404, but are shown partitioned into rows of even and odd phases to simplify the illustrated arrangement of phase control systems. Similarly, the actual spatial arrangement of phase control systems may assume any suitable regular or irregular configuration (e.g., arranged in a line, array, or star). Further details regarding phase control systems are described, for example, in the context of FIG. 8.

Figure 4:
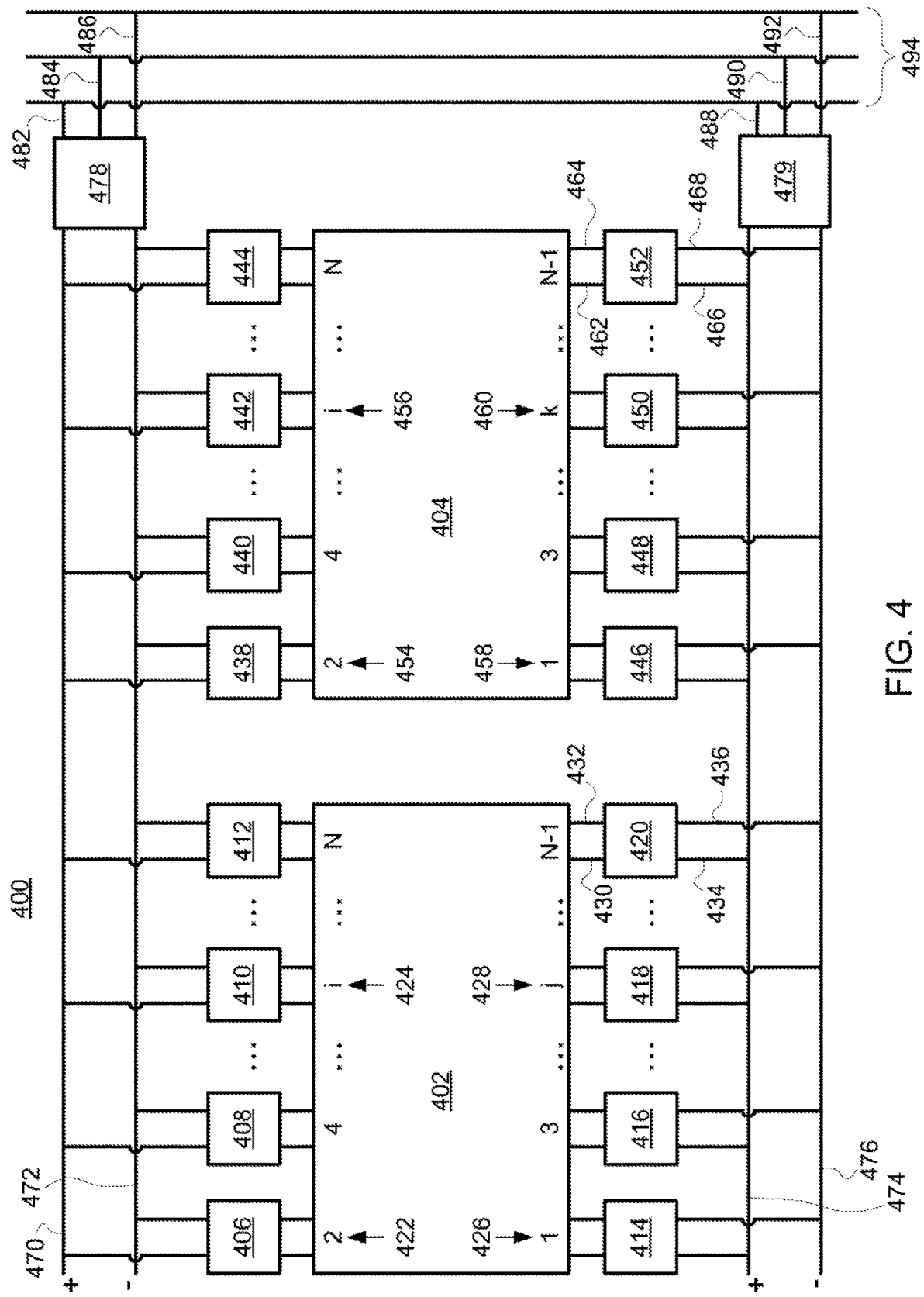
FIG. 4 shows a block diagram of an illustrative arrangement having distributed phase control and distributed power management, in accordance with some embodiments of the present disclosure.

FIG. 4 shows a block diagram of illustrative arrangement 400 having distributed phase control and distributed power management, in accordance with some embodiments of the present disclosure. Arrangement 400 includes LEMs 402 and 404, AC grid 494, grid-tie inverters 478 and 479, two DC buses, and phase control systems 406, 408, 410, 412, 414, 416, 418, 420, 438, 440, 442, 444, 446, 448, 450, and 452.

LEMs 402 and 404 each include multiple phases, each phase including one or more windings. As shown in FIG. 4, LEMs 402 and 404 each include N phases, wherein N is an integer greater than three. For example, LEM 402 includes N phases, including phase 426 (i.e., an end phase) and phase 428. For example, LEM 404 includes N phases, including phase 458 (i.e., an end phase) and phase 460. Each phase of LEMs 402 and 404 corresponds to a phase control system. For example, phases 422, 424, 426, 428, 454, 456, 458 and 460 correspond to phase control systems 406, 410, 414, 418, 438, 442, 446, and 450, respectively. Although not shown in FIG. 4, LEMs 402 and 404 include corresponding translator sections (e.g., magnet sections).

Phase control systems 406, 408, 410, 412, 414, 416, 418, 420, 438, 440, 442, 444, 446, 448, 450, and 452 are configured to manage the application of current to corresponding phases. Each phase control system is coupled to a DC bus. For example, a first DC bus is formed from bus 474 and bus 476. In a further example, a second DC bus is formed from bus 470 and bus 472. Phase leads 430 and 432 correspond to phase control system 420, which is coupled to a DC bus by leads 434 and 436. Phase leads 462 and 464 correspond to phase control system 452, which is coupled to a DC bus by leads 466 and 468.

Grid-tie inverters 478 and 479 are configured to manage electrical power interactions between respective DC buses and AC grid 494, as well as manage a voltage and/or other characteristics of the respective DC buses. AC grid 494, as shown in FIG. 4, includes a three-phase AC grid (e.g., a 480 VAC 3-phase power supply). Grid-tie inverter 478 is coupled to AC leads 482, 484, and 486 of AC grid 494. Grid-tie inverter 479 is coupled to AC leads 488, 490, and 492 of AC grid 494. In some embodiments, AC leads 482, 484, and 486 and AC leads 488, 490, and 492 may be coupled to separate breakers, fuses, or otherwise AC circuits. In some embodiments, AC leads 482, 484, and 486 and AC leads 488, 490, and 492 may be coupled to the same breakers, fuses, or otherwise AC circuits. Although not shown in FIG. 4, in some embodiments, grid-tie inverters 478 and 479 may be distributed among, or included as a part of, the phase control systems in the form of smaller-capacity grid-tie inverters, for example. In arrangements where the number of grid-tie inverters is different than the number of phases, but greater than one, the DC bus interconnections to phase control systems may be designed to avoid the complete loss of control of any entire LEMs (i.e., all phases of the LEM) in the event of a grid-tie inverter failure.

In some embodiments, arrangement 400 provides robustness against failures of one DC bus. For example, in the event that the DC bus formed from bus 474 and 476 fails, every other phase of LEMs 402 and 404 (i.e., even-numbered phases two, four, etc.) may still be operational using the DC bus formed from buses 470 and 472. Accordingly, phase control systems 406, 408, 410, and 412 may still provide control authority over corresponding phases of LEM 402 (e.g., allowing position and/or force control). Further, phase control systems 438, 440, 442, and 444 may still provide control authority over corresponding phases of LEM 404 (e.g., allowing position and/or force control). Similarly, if the DC bus formed from buses 470 and 472 fails, phase control systems 414, 416, 418, 420, 446, 448, 450, and 452 that are coupled to the DC bus formed from buses 474 and 476 may still provide control authority.

For example, the redundancy provided by arrangement 400 may be useful for maintaining control in the event of a DC bus failure, a failure of one grid-tie inverter (e.g., either grid-tie inverter 478 or 479, but not both), or both. In some embodiments, if one of grid-tie inverters 478 and 479 fails, the linear generator is still able to function at nominally half-load, using half of the LEMs' phases (i.e., N/2 as shown in FIG. 4, if N is even). This functionality may, for example, allow continued operation, controlled shutdown, auto-braking, or a combination thereof. Accordingly, each grid-tie inverter need not be a single point of complete failure for the entire system.

In a further example, the use of multiple phase control systems per LEM may allow for continued operation in the event that a single phase, phase control system, or component thereof undergoes a partial or complete failure. For example, if windings of a particular phase such as phase 428 become shorted (e.g., to the ferrous cores or other components), the particular phase may be isolated by corresponding phase control system 418 ceasing to apply current. Such continued operation may allow for power production, safe shutdown, or other operation in the event of a phase short or component failure.

Figure 5:
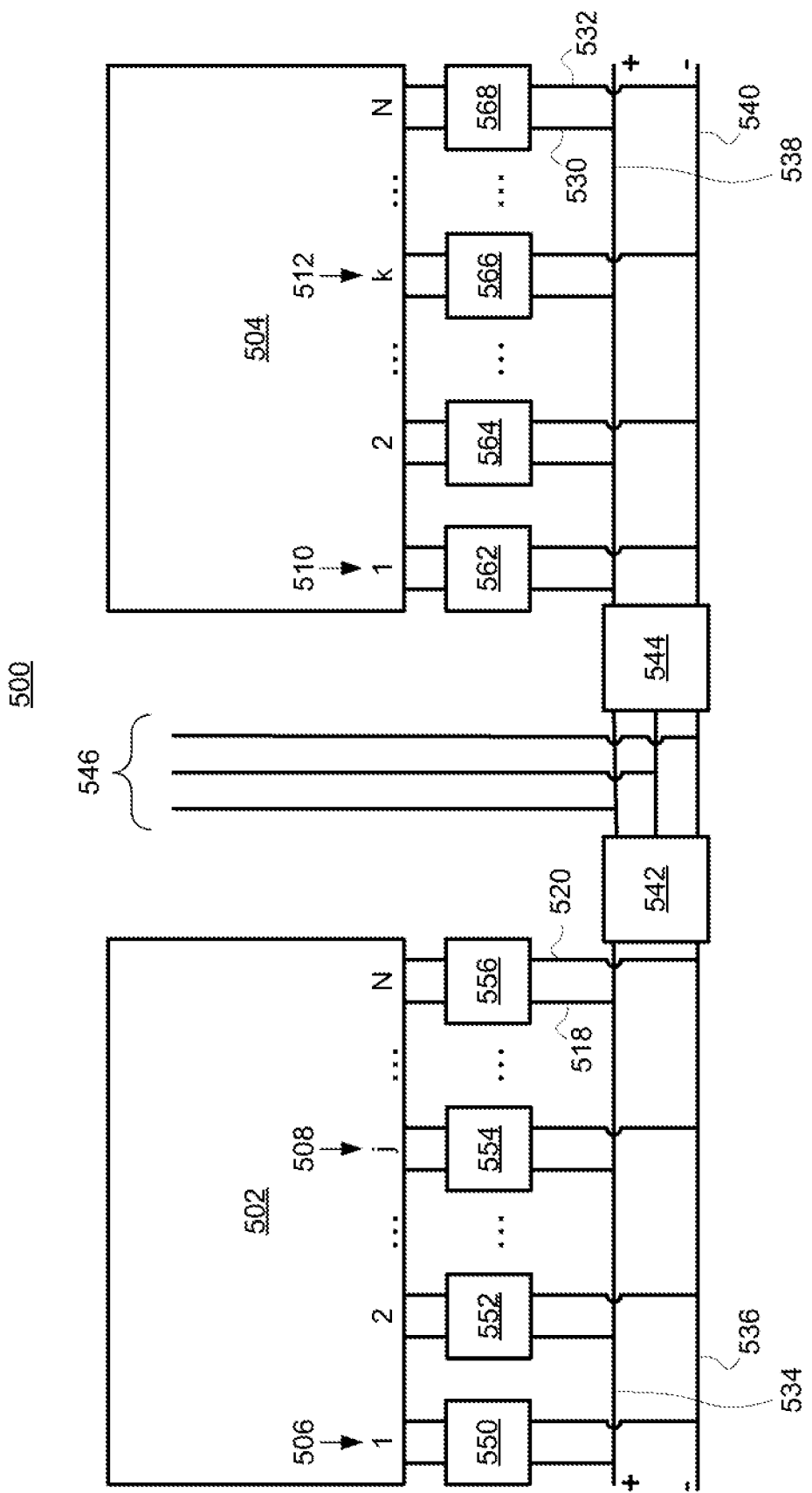
FIG. 5 shows a block diagram of an illustrative arrangement having distributed phase control and distributed power management, in accordance with some embodiments of the present disclosure.

FIG. 5 shows a block diagram of illustrative arrangement 500 having distributed phase control and distributed power management, in accordance with some embodiments of the present disclosure. Arrangement 500 includes LEMs 502 and 504, AC grid 546, grid-tie inverters 542 and 544, two DC buses, and phase control systems 510, 512, 512, 514, 516, 522, 524, 526, and 528. Arrangement 500 differs from arrangement 400 in that the loss of a single grid-tie inverter may affect all phases of a corresponding LEM (e.g., LEM 502 or 504), but not the other LEM. Although not shown in FIG. 5, in some embodiments, grid-tie inverters 542 and 544 may be distributed among, or included as a part of, the phase control systems in the form of smaller-capacity grid-tie inverters (e.g., grid-tie inverters 542 and 544 need not be included in some embodiments). Accordingly, the loss of a grid-tie inverter in such a distributed scheme may allow for some phases to still operate if one phase of a LEM were to fail.

LEMs 502 and 504 each include multiple phases, each phase including one or more windings. As shown in FIG. 5, LEMs 502 and 504 each include N phases, wherein N is an integer greater than three. For example, LEM 502 includes N phases, including phase 506 (i.e., an end phase) and phase 508. For example, LEM 504 includes N phases, including phase 510 (i.e., an end phase) and phase 512. Each phase of LEMs 502 and 504 corresponds to a phase control system. For example, phases 506, 508, 510 and 512 correspond to phase control systems 550, 554, 562, and 566, respectively.

Phase control systems 550, 552, 554, 556, 562, 564, 566, and 568 are configured to manage the application of current to corresponding phases. Each phase control system is coupled to a DC bus. For example, a first DC bus is formed from bus 534 and bus 536. In a further example, a second DC bus is formed from bus 538 and bus 540. Phase control system 556 is coupled to a DC bus by leads 518 and 520. Phase control system 568 is coupled to a DC bus by leads 530 and 532.

Grid-tie inverters 542 and 544 are configured to manage electrical power interactions between respective DC buses and AC grid 546, as well as manage a voltage and/or other characteristics of the respective DC buses. AC grid 546, as shown in FIG. 5, includes a three-phase AC grid (e.g., a 480 VAC 3-phase power supply). In some embodiments, a single grid-tie inverted is used to manage both DC buses. For example, in some embodiments, only one of grid-tie inverters 542 and 544 is included.

For example, the use of multiple phase control systems per LEM may allow for continued operation in the event that a single phase, phase control system, or component thereof undergoes a partial or complete failure. For example, if windings of a particular phase such as phase 506 become shorted (e.g., to the ferrous cores or other components), the particular phase may be isolated by corresponding phase control system 550 ceasing to apply current. Such continued operation may allow for power production, safe shutdown, or other operation in the event of a phase short or component failure.

In the event of a failure of either of grid-tie inverter 542 and grid-tie inverter 544, an entire LEM will be impacted (e.g., be rendered without access to a DC bus), although the other LEM may maintain access to a DC bus. For example, if grid-tie inverter 542 experiences a failure, LEM 502 is rendered without a DC bus. Further, if grid-tie inverter 544 is still operational, then LEM 504 may benefit from continued operation of grid-tie inverter 544. For example, without a DC bus, little force may be applied to a translator of LEM 502, but enough force may be applied to a translator of LEM 504 to maintain synchronization of the translators (e.g., a desired trajectory of the translators in time). Synchronization may, for example, prevent mechanical damage, undesirable engine behavior, or unpredictable engine behavior.

Figure 6:
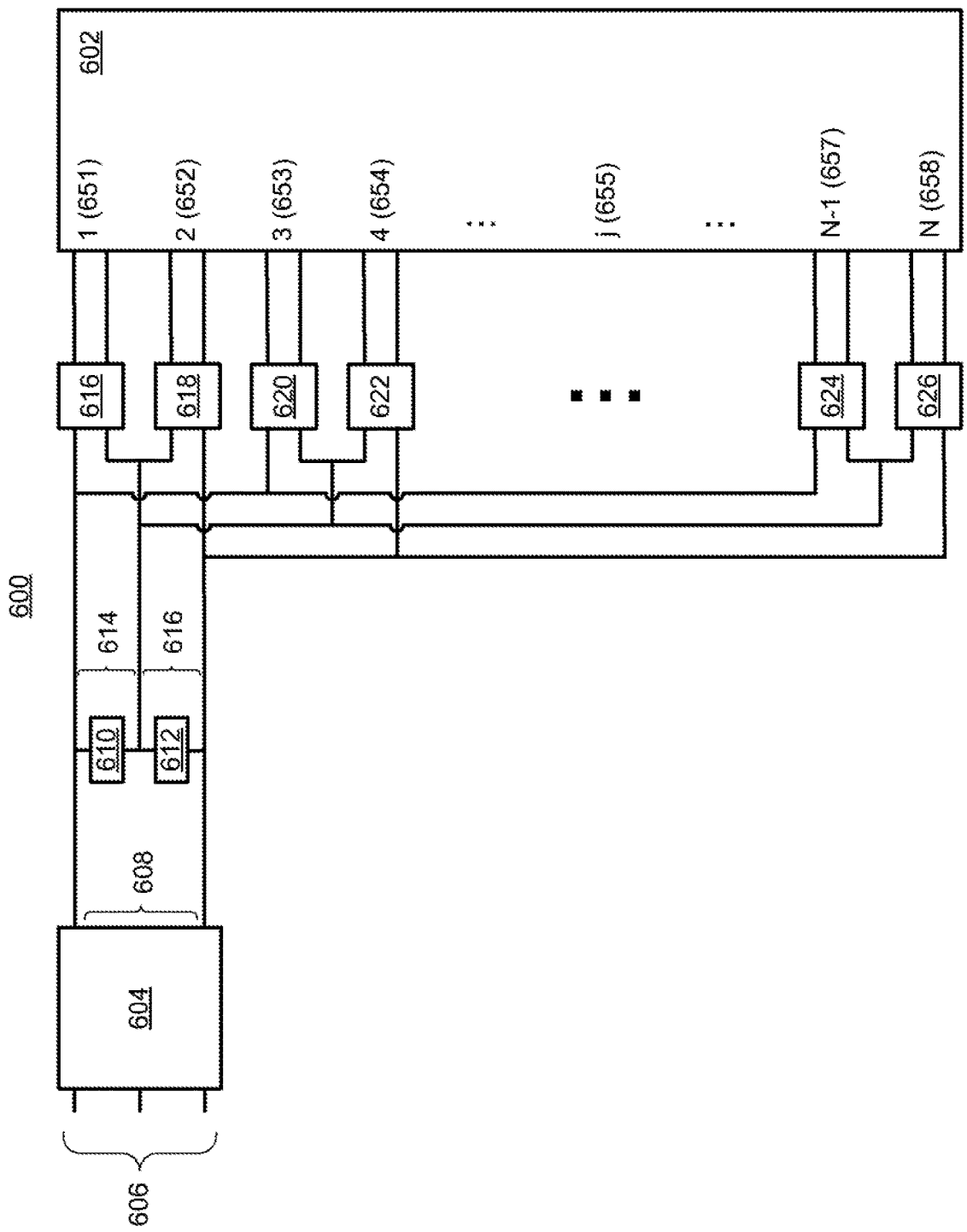
FIG. 6 shows a block diagram of an illustrative arrangement having a single LEM, distributed phase control and distributed power management, with a partitioned DC bus, in accordance with some embodiments of the present disclosure.

FIG. 6 shows a block diagram of illustrative arrangement 600 including LEM 602, distributed phase control and distributed power management, with partitioned DC bus 608, in accordance with some embodiments of the present disclosure. Arrangement 600 includes LEM 602, AC grid 606, grid-tie inverter 604, DC buses 608, 614, and 616, components 610 and 612, and phase control systems 616, 618, 620, 622, 624, and 626. Arrangement 600 differs from arrangements 400 and 500 of FIGS. 4-5 in that DC bus 608 managed by grid-tie inverter 604 is portioned in to first DC bus 614 and second DC bus 616 using components 610 and 612. The voltage of DC bus 608 is distributed to DC buses 614 and 616. Arrangement 600 may be extended to two LEMs by repeating the components shown in FIG. 6, in accordance with the present disclosure. For example, a second grid-tie inverter, two more components (e.g., similar to components 610 and 612, or not), and N more phase control systems may be included.

In an illustrative example, arrangement 600 may include DC bus 608 maintained by grid-tie inverter 604, but phase control systems are supplied with power from DC buses 614 and 616. In some embodiments, components 610 and 612 include, for example, energy storage devices configured to operate at nominally half the voltage of DC bus 608. For example, DC buses 614 and 616 may each be nominally 380 VDC when DC bus 608 is nominally 760 VDC. The voltage balance between DC buses 614 and 616 may be controlled by adjusting (e.g., continuously, or intermittently) the portion of energy extracted by the corresponding phases (e.g., odd or even phases as shown in FIG. 6). Further, the voltage balance between DC buses 614 and 616 may be controlled by adding a DC-DC converter between components 610 and 612 (e.g., 380V capacitor banks in some embodiments).

LEM 602 includes N phases, with each phase including one or more windings. For example, in some embodiments, N may be thirty or more. Each phase of LEM 602 corresponds to a phase control system. For example, phases 651, 652, 653, 654, 655, 657, and 658 correspond to phase control systems 616, 618, 620, 622, 624, and 626, respectively. Although LEM 602 is illustrated with a plurality of phases, a LEM may include one phase, or more than one phase.

Phase control systems 616, 618, 620, 622, 624, and 626 are configured to manage the application of current to corresponding phases. Each phase control system is coupled to either DC bus 614 or 616, with adjacent phases being coupled to different DC buses. For example, as shown in FIG. 6, phases 651, 653, and 657 are coupled to DC bus 614, while phases 652, 654, and 658 are coupled to DC bus 616.

Components 610 and 612 are configured to accommodate fluctuations in electric power in DC buses 614 and 616. In some embodiments, either or both of components 610 and 612 may include an energy storage device such as, for example, a battery, a capacitor, a capacitor bank, or any other suitable device for storing and releasing electric energy on time scales relevant for the operation of LEM 602.

Figure 7:
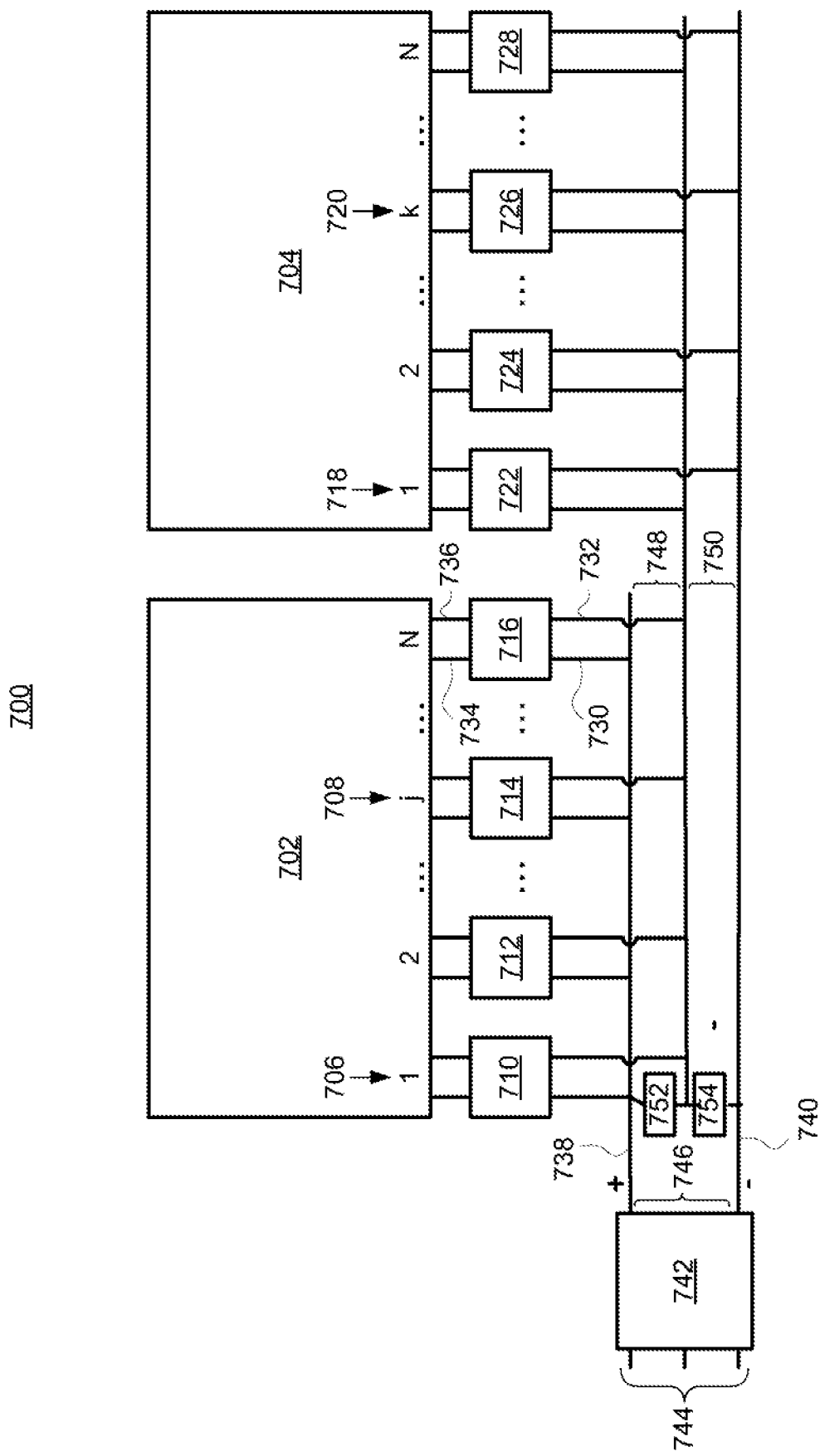
FIG. 7 shows a block diagram of an illustrative arrangement having two LEMs, distributed phase control and distributed power management, with a partitioned DC bus, in accordance with some embodiments of the present disclosure.

FIG. 7 shows a block diagram of illustrative arrangement 700 including LEMs 702 and 704, distributed phase control and distributed power management, with partitioned DC bus 746, in accordance with some embodiments of the present disclosure. Arrangement 700 includes LEMs 702 and 704, AC grid 744, grid-tie inverter 742, DC buses 746, 748, and 750, components 752 and 754, and phase control systems 710, 712, 714, 716, 722, 724, 726, and 728. Arrangement 700 differs from arrangement 600 of FIG. 6 in that each phase of a particular LEM is coupled to the same DC bus. For example, phase control systems 710, 712, 714, and 716 corresponding to LEM 702 are coupled to DC bus 748, while phase control systems 722, 724, 726, and 728 corresponding to LEM 704 are coupled to DC bus 750. Further, DC bus 746 is formed from buses 738 and 740.

In an illustrative example, arrangement 700 may include DC bus 746 maintained by grid-tie inverter 742, but phase control systems are supplied power by DC buses 748 and 750. For example, DC buses 748 and 750 may each be nominally 380 VDC when DC bus 746 is nominally 760 VDC. The voltage balance between DC buses 748 and 750 may be controlled by adjusting (e.g., continuously, or intermittently) the portion of energy extracted by the corresponding phases (e.g., phases of a particular LEM as shown in FIG. 7). Further, the voltage balance between DC buses 748 and 750 may be controlled by adding a DC-DC converter between components 752 and 754 (e.g., 380V capacitor banks in some embodiments).

LEMs 702 and 704 each include N phases, where N is an integer greater than three, with each phase including one or more windings. For example, in some embodiments, N may be thirty or more. Each phase of LEM 602 corresponds to a phase control system.

Phase control systems 710, 712, 714, 716, 722, 724, 726, and 728 are configured to manage the application of current to corresponding phases of LEMs 702 and 704. Each phase control system is coupled to either DC bus 748 or 750, with phases in either LEM being coupled to the same DC bus. Phase leads 734 and 736 correspond to phase control system 716, which is coupled to DC bus 748 by leads 730 and 732.

Components 752 and 754 are configured to accommodate fluctuations in electric power in DC buses 748 and 750. In some embodiments, either or both of components 752 and 754 may include an energy storage device such as, for example, a battery, a capacitor, a capacitor bank, or any other suitable device for storing and releasing electric energy on time scales relevant for the operation of LEMs 702 and 704.

Although not shown in FIG. 7, it may be desired to include a DC-DC converter to balance energy between components 752 and 754. For example, when maintaining synchronization of translators of LEMs 702 and 704, the energy balance at any time is not necessarily equal. To illustrate, if more power is extracted from one of LEM 702 and 704 than the other, the voltages across DC buses 748 and 750 may diverge from each other.

Figure 8:
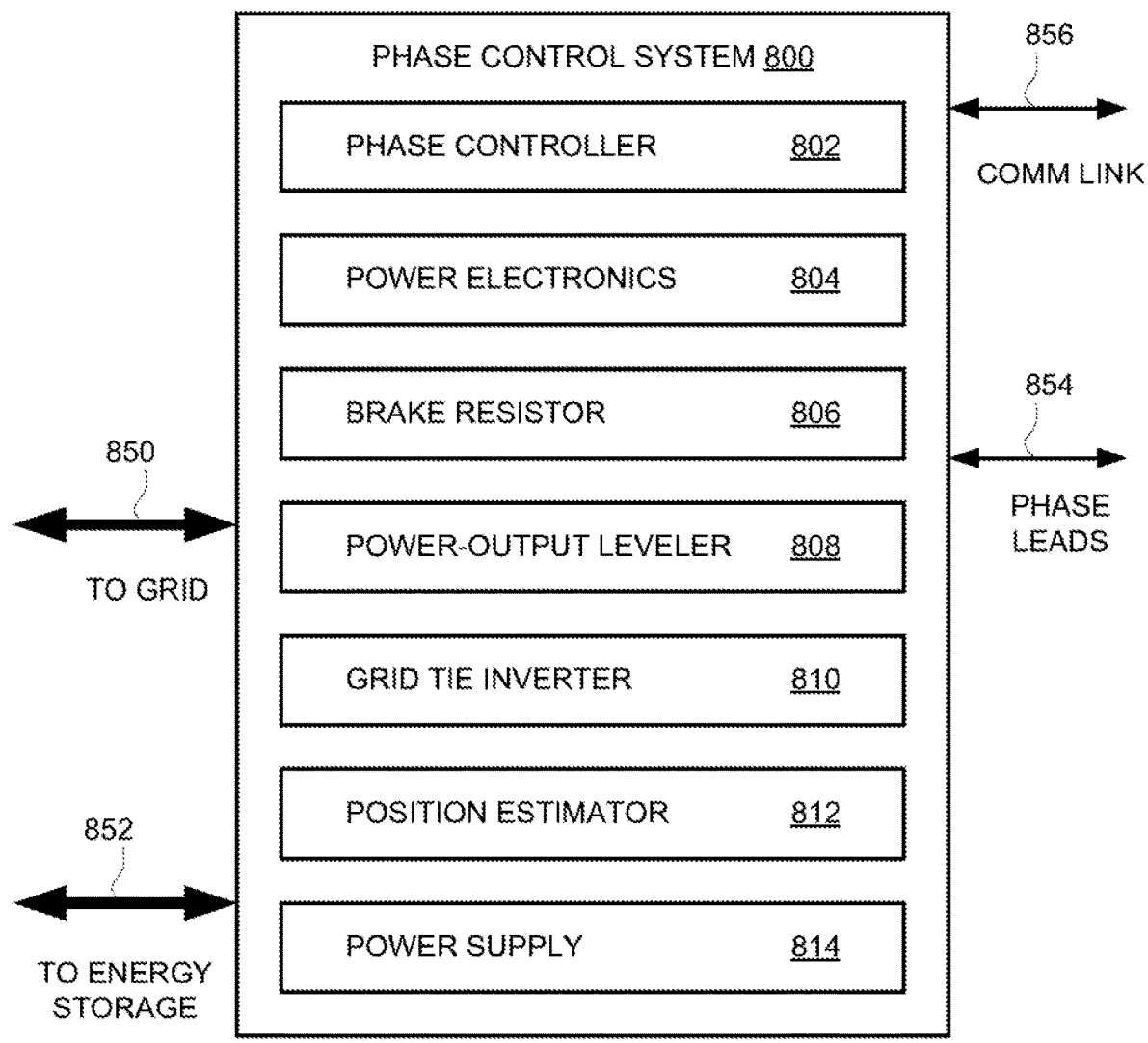
FIG. 8 shows a block diagram of an illustrative phase control system, in accordance with some embodiments of the present disclosure.

FIG. 8 shows a block diagram of illustrative phase control system 800, in accordance with some embodiments of the present disclosure. Phase control system 800, as shown illustratively in FIG. 8, includes phase controller 802, power electronics 804, brake resistor 806, power-output leveler 808, grid-tie inverter 810, position estimator 812, and power supply 814. In some embodiments, each phase control system (e.g., similar to phase control system 800) controls an application of current to a single phase of a multiphase LEM. Further, each phase control system may include elements of the overall electrical system distributed to each phase control system.

In some embodiments, phase controller 802 is configured to control current in a corresponding phase. In some embodiments, a desired or commanded current to be applied to the corresponding phase is calculated locally by phase controller 802. In some embodiments, a desired or commanded current to be applied to the corresponding phase is communicated from a central controller, which is determining currents to be applied on all the phases. For example, the desired or commanded current to be applied to the corresponding phase may be determined to align a measured magnet or translator position, to achieve a total LEM force (e.g., summed from the electromagnetic force applied by each phase), or both. In some embodiments, if a sufficiently fast switching frequency is used, then phase controller 802 may execute a single feedback loop with high bandwidth and fast switching frequency. For example, a sufficiently fast switching frequency may be achieved using, but not limited to, any one or more of the following techniques: fast switching semiconductor devices, soft-switching or resonant converter arrangements, or a combination thereof. In an illustrative example, fast switching may refer to switching at high enough frequency to avoid an overcurrent or current ripple. In a further illustrative example, a fast switching frequency may be 10 kHz or faster.

In some embodiments, phase controller 802 is configured to sense magnetic flux in the corresponding phase. For example, phase controller 802 may sense the phase's magnetic flux and use the sensed flux as a control feedback. In some such embodiments, phase controller 802 need not include a current sensor or be configured to receive input from a current sensor. Further, in some such embodiments, phase controller 802 includes a current sensor with relatively reduced performance, requirements, cost, or a combination thereof. In an illustrative example, phase controller 802 may be configured to determine flux based on the relation V=N (dflux/dt), using a measured voltage V and known turn count N of the phase winding.

In some embodiments, the current applied to, or voltage applied across, each phase is controlled locally (i.e., by an instance of phase control system 800) to any suitable degree.

In some embodiments, phase controller 802 may execute a local control loop on phase current. For example, a current command may be communicated over a communication link from a central controller to phase controller 802. The communication link may include hardware and software for communicating, for example, an analog signal, a digital signal (e.g., using a serial peripheral interface (SPI)), a CANbus signal, a Modbus signal, an Ethernet signal, any other suitable signal, or any combination thereof. In some embodiments, local control is very fast since the current loop is fast (e.g., low computation times). Any suitable part of the control mechanism may also be distributed in accordance with the present disclosure. For example, a position measurement may be distributed to every phase and each phase controller 802 may determine desired position and force to determine a current command, which may be applied by power electronics 804. Distributed control is applicable to, for example, maintaining an auto-braking algorithm (e.g., allowing for power to be extracted) in the event that communication is lost between the phase control system and a central controller or position measurement system.

In some embodiments, phase controller 802 is configured to provide a control signal to power electronics 804. Power electronics 804 is configured to electrically couple to the phase leads of the phase and provide the current to the phase. Accordingly, power electronics 804 includes components configured to operate at amperages and voltages relevant to the DC bus and phase leads. For example, power electronics 804 may IGBTs, MOSFETs, busbars, shunts, sensors (e.g., for measuring current or voltage), capacitors, diodes, any other suitable components, or any suitable combination thereof. Phase controller 802 need not be configured to electrically manage or interact with such large currents or voltages as required by the phase leads and power electronics 804. For example, phase controller 802 may operate using relatively low DC voltages (e.g., 5 VDC, 12 VDC, 24 VDC, 48 VDC) and provide low-voltage control signals to power electronics 804 to control phase currents and voltages. In some embodiments, phase controller 802 and power electronics 804 may be combined or integrated into a single module configured to control and apply current to the phase. In some embodiments, power electronics 804 may be shared among more than one phase. For example, power electronics 804 may include multiple power circuits, be configured to receive multiple control signals, and be configured to apply current to more than one phase.

In some embodiments, the inclusion of brake resistor 806 in phase control system 800 allows smaller, and possibly cheaper, brake resistors to be used. For example, several small brake resistors and corresponding transistors, distributed among phase control systems, are possibly cheaper than a single larger brake resistor and corresponding large contactor. Further, the chance of complete failure of the brake resistor system is reduced. For example, if thirty phase control systems each have a brake resistor, in the event that one of the brake resistors fails, there still exists 29/30 brake resistors for energy dissipation (e.g., for use during braking). This is advantageous compared to 0/30 brake resistors of energy dissipation for the failure case of a single brake resistor for an entire LEM. In some embodiments, brake resistor 806 is used in response to emergency situations (e.g., failures such as the loss of grid-tie inverter 810) to sink power and decelerate motion of a translator. In some embodiments, brake resistor 806 (e.g., along with a corresponding transistor for switching) can be used to reduce power quickly for transient operation of the LEM (e.g., fast load-drops). For example, under some circumstances, in which there is limited DC bus capacitance, distributed brake resistors, controlled by transistors rather than contactors, provide better control of the DC bus voltage than if a single brake resistor was used for an entire LEM. Brake resistor 806 may have any suitable resistance and be configured for any suitable power dissipation (e.g., the square of current multiplied by resistance). For example, brake resistor 806 may be configured to dissipate sufficient energy during a cycle of a free-piston generator to allow for a safe shutdown (e.g., slowing and stopping motion of a translator over the course of some number of cycles).

In some embodiments, phase control system 800 may include power-output leveler 808 to achieve a steadier power output on the DC bus. For example, power output levelers, also referred to as DC-DC converters, are further described in commonly assigned U.S. patent application Ser. No. 16/137,029 titled "DC-DC CONVERTER IN A NON-STEADY SYSTEM,", filed on Sep. 20, 2018, which is hereby incorporated by reference herein in its entirety. For example, a free-piston generator may output a pulsed power profile, and accordingly may benefit from power-output leveler 808 providing a steadier power output to grid-tie inverter 810. In an illustrative example, due to the reciprocating nature of a LEM, the LEM may exhibit a power fluctuation in time approximately twice the nominal power output of power-output leveler 808. For example, this fluctuation could occur between nominal power outputs of 250 to 500 kW. In some embodiments, power-output leveler 808 includes significant capacitance, or a DC-DC bidirectional converter and some capacitance. In some such embodiments, the capacitance, DC-DC bidirectional converter, or both, can be distributed to each phase control system corresponding to a LEM. For example, in some embodiments, a capacitor bank, DC-DC converter, or both may be able to use one or more phase-current control transistors (e.g., of a system similar to phase control system 800).

In some embodiments, a DC bus itself can be used to store and release electrical energy, provided that power electronics 804 can tolerate a varying bus voltage. The use of the DC bus to store energy may be achieved by grid-tie inverter 810, for example, in accordance with the present disclosure.

Grid-tie inverter 810 is configured to manage electrical interactions between an AC grid and a DC bus. In some embodiments, each phase control system includes a grid-tie inverter and is configured to output, for example, three-phase 480 VAC power. For example, some such embodiments prevent the need for a distributed DC bus and allow use of cheaper and safer distributed AC power. For example, in some embodiments, phase control system 800 includes transistors configured to convert a local DC bus (i.e., for the phase) directly to 480 VAC 3 phase for grid interconnection, rather than sharing a common DC bus with one or more other phases. Accordingly, a DC bus may be, but need not be, shared among phases. In some embodiments, several phases, which need not be contiguous, or phases from two or more different LEMs, may share a common DC bus to enable more constant AC power output, for example.

In some embodiments, power electronics 804 and power-output leveler 808 are coupled to a DC bus managed by grid-tie inverter 810. In some embodiments, any of power electronics 804, power-output leveler 808, and grid-tie inverter 810 may be combined or integrated. In some embodiments, phase control system 800 includes a connection to a battery bank and battery management system. For example, in some implementations, a battery may be necessary to provide electrical energy storage. Each phase control system may include a connection to a battery bank, as well as a connection to a DC-DC converter. In some embodiments, phase control system 800 includes a battery bank and battery management system (e.g., integrated into power electronics 804 or power-output leveler 808). For example, each phase control system may include a relatively small battery rather than be coupled to a relatively larger battery shared among DC buses of multiple phases (e.g., which represents a single point of failure).

Position estimator 812 is configured to estimate a relative position, an absolute position, or both of a translator (e.g., a position of a face of a piston or some other suitable reference) or section thereof (e.g., a position of a magnet or pole thereof, or some other suitable reference). Position estimator 812 may estimate a position based on, for example, a measured current, a calculated current, a measured voltage, a calculated voltage, a measured electromagnetic flux in a phase, a calculated electromagnetic flux in a phase, a measured position of a moving component (e.g., using an encoder tape and suitable encoder read-head), any other suitable information or any combination thereof.

In some embodiments, each phase control system may estimate position (e.g., include position estimator 812), rather than a central algorithm estimating or measuring position. Accordingly, the central algorithm may be distributed among several phase control systems.

In some embodiments, each position estimator (e.g., each similar to position estimator 812) for multiple phase control systems (e.g., each similar to position control system 800) may participate in a distributed position estimator. The distributed position estimator may estimate position based on, for example, the sensing of phase voltage in each corresponding phase. In some such embodiments, a dedicated position sensor need not be included, thus saving the cost and reliability concerns of the position sensor.

Power supply 814 is configured to power components of phase control system 800, aside from applying current to the corresponding phase. For example, power supply 814 may provide power for processing functions of phase controller 802 or position estimator 812, diagnostics (e.g., for power electronics 804, power-output leveler 808, grid-tie inverter 810, and position estimator 812), power switching on/off for brake resistor 806, any other suitable process requiring power, or any suitable combination thereof. In some embodiments, each phase control system may include a power supply (e.g., similar to power supply 814). In many instances, a single power supply serving many components is a distinct failure mode. For example, if every phase controller for multiple phases is powered by a single power supply, the loss of the power supply would mean the loss in power for all the phase controllers. Accordingly, in some embodiments, each phase control system may include a DC power supply. In some embodiments, a limited number of phase control systems (e.g., between 1 and N non-inclusively, and not necessarily corresponding to contiguous phases) may be powered by a DC power supply.

In some embodiments, suitable components of phase control system 800 may be coupled to a grid via coupling 850. For example, power-output leveler 808, power electronics 804, grid-tie inverter 810, or a combination thereof may be coupled to coupling 850. In some embodiments, coupling 850 may include cables or buses transmitting AC power (e.g., three-phase 480 VAC). In some embodiments, coupling 850 may include cables or buses transmitting DC power (e.g., a DC bus), which may be coupled to a grid via a grid-tie inverter separate from phase control system 800, for example. In some embodiments, grid-tie inverter 810 need not be included in phase control system 800. For example, in some embodiments, coupling 850 couples phase control system 800 to a DC grid, DC load, or other suitable DC electrical architecture.

In some embodiments, suitable components of phase control system 800 may be coupled to an energy storage device, DC-DC converter, or both, via coupling 852. For example, power-output leveler 808, power electronics 804, grid-tie inverter 810, or a combination thereof may be coupled to coupling 852. In some embodiments, coupling 852 may include cables or buses transmitting AC power (e.g., three-phase 480 VAC). In some embodiments, coupling 850 may include cables or buses transmitting DC power (e.g., a DC bus). In some embodiments, coupling 850 and 852 may be combined (e.g., when an energy storage device and DC-DC converter are coupled to a DC bus).

In some embodiments, suitable components of phase control system 800 may be coupled to phases of a LEM via phase leads 854. For example, power electronics 804, brake resistor 806, or both, may be coupled to phase leads 854. In some embodiments, phase leads 854 may include two phase leads per phase corresponding to phase control system 800 (e.g., six phase leads of three phases correspond to phase control system 800). In some embodiments, phase leads 854 may include one phase lead per phase corresponding to phase control system 800 (e.g., six phase leads of six wye-connected phases correspond to phase control system 800).

In some embodiments, suitable components of phase control system 800 may be coupled to communications (COMM) link 856. For example, phase controller 802, power electronics 804, power-output leveler 808, grid-tie inverter 810, position estimator 812, or a combination thereof may be coupled to COMM link 856. In some embodiments, COMM link 856 may include a wired communications link such as, for example, an ethernet cable, a serial cable, any other suitable wired link, or any combination thereof. For example, in some embodiments, COMM link 856 includes multiple cables, each corresponding to a port of a component of phase control system 800. In some embodiments, COMM link 856 may include a wireless communications link such as, for example, a WiFi transmitter/receiver, a Bluetooth transmitter/receiver, any other suitable wireless link, or any combination thereof. COMM link 856 may include any suitable communication link enabling transmission of data, messages, signals, information, or a combination thereof. In some embodiments, phase control system 800 is coupled to a central control system via communications link 856. For example, in some embodiments, phase controller 802 communicates with a central controller via COMM link 856.

Illustrative arrangements 400-700 of FIGS. 4-7 and phase control system 800 of FIG. 8 may be used in accordance with the present disclosure to manage electric power interactions between an AC grid and one or more LEMs.

In some embodiments, the distribution of electronics increases robustness and overall system reliability.

In some embodiments, the use of more, smaller components allows volume costs to be available. For example, if 120 power blades are used for a linear generator system having two LEMs, then 10,000 # unit pricing is achieved at the construction of 100 linear generator systems.

In some embodiments, one or more components of a phase control system have a reduced power rating (e.g., in terms of current, voltage, or both), which may allow for the use of smaller semiconductors. In addition to cost advantages and potential efficiency benefits, the use of smaller semiconductors also provides the possibility to increase switching frequency (e.g., generally lower caliber semiconductors are faster). Further, reactive elements (e.g., capacitive and electromagnetic components) are able to decrease in size as switching frequency increases. For example, regarding the arrangements of FIGS. 4-7, separately controlling each phase directly allows the use of different topologies, in which reactive elements are included in the phase control system. This may improve the performance, cost, or both of each phase control system. Additionally, the use of phase control systems to control each phase may provide smoother voltage waveforms across the phases, which would in turn reduce losses in the LEM. Further, the phase control system topology may provide voltage step-up functionality. For example, considering a system where the voltage across a DC bus varies in time, this allows the design of a LEM with a higher back-EMF. This is due to the removal of the constraint of a low bus voltage configuration. The use of a higher DC bus voltage corresponds to lower bus current, which reduces electrical losses (e.g., ohmic losses). In an illustrative example, the voltage required across a phase to achieve a target current is primarily based on back emf and inductance. The back emf is related to force production from current (e.g., the larger the back emf, the larger the force per unit current). In a further illustrative example, a larger DC bus voltage may allow a higher turn count in a phase winding (e.g., resulting in a larger back emf), which may allow for the use of switches having a smaller current capacity (e.g., smaller and cheaper switches).

In some embodiments, an increase in switching frequency provides a higher bandwidth for control purposes. For example, a higher switching frequency may be used to maintain a desired controllability of a phase controller, while reducing the number of required sensors, thus reducing costs and possibly improving reliability. To illustrate, a single feedback loop on phase current may be used in lieu of a two-state feedback loop (e.g., phase voltage and phase current, or current and mode control).

In some embodiments, phase leads may be wired in a star configuration. For example, for a wye-type configuration, one phase lead from each phase may be coupled together to form a neutral (e.g., having net zero current input or output, so phase currents must sum to zero), while each phase control system applies a controlled phase voltage, and thus current, to the other lead of the corresponding phase. In some such embodiments, only some of the DC bus voltage (e.g., the difference between a bus and the neutral voltage) may be available to apply across each phase. In some embodiments, one or more subsets of phase leads may be coupled in respective star configurations, having respective neutrals (e.g., that may be but need not be coupled together).

In some embodiments, phase leads for each phase may be wired in an independent configuration. For example, a phase control system may include a full H-bridge per phase and may be able to apply the full DC bus voltage across the phase in either direction (e.g., to cause a desired current to flow in either direction). This provides a larger voltage range available to each phase as well as complete control independence from the other phases. For example, without a common neutral wye connection, the phase currents need not sum to zero.

In some embodiments, for which the phases are wired to corresponding phase control systems in an independent configuration, phase control systems may be interconnected in any suitable fashion (e.g., series, parallel, or a combination thereof). For example, each phase control system may be provided power at a lower voltage than the DC bus voltage. This flexibility may aid in optimizing the overall cost and efficiency of the system.

In some embodiments, a phase control system detects failures such as opens or shorts, and accordingly shuts itself off (e.g., does not apply current to the corresponding phase) to protect the rest of the system. Although a LEM will experience a reduction in overall power capability if a phase of the LEM is lost, the other phase control systems may continue operating. Accordingly, the LEM and distribution of phase control systems may be configured to tolerate the loss of a phase. For example, if there exist planned service intervals for the overall system, a failed phase control system, or component thereof, could be replaced at that time rather than as an emergency repair, and the linear generator could keep operating until that time (e.g., albeit at possibly reduced power output).

In some embodiments, each phase control system may be configured to extract power from the corresponding LEM or LEMs. For example, in the event of a detected system failure or a loss of communication with a control system, a part thereof, or other phase control system, a phase controller may attempt to extract energy from kinetic energy of a translator by commanding current in the opposite direction of a back emf voltage in the corresponding phase (e.g., use the phase to brake the translator motion).

In some embodiments, which include a long stator and short magnet section (e.g., the phases extend spatially beyond a magnet section), for example, some phases are unused for at least some of the magnet travel. For example, when no magnet is under a phase (e.g., not axially overlapping with at least some of the phase), the phase will not interact electromagnetically with the magnet section in a significant way. At a particular time during a stroke, unused phases may be used as inductors and the phase control system may be configured to store energy in capacitors or perform power conversion to help regulate the DC bus voltage, bus current, bus power, or a combination thereof. Accordingly, a phase control system, or phase controller thereof, may be used for other purposes besides exciting an electromagnetic force in the LEM.

FIG. 9 shows a flowchart of illustrative process 900 for managing phase current (i.e., current in a phase), in accordance with some embodiments of the present disclosure. For example, phase controller 802 of FIG. 8, or any of the phase control systems of FIGS. 4-7, may be configured to implement the steps of illustrative process 900. The following description is included in the context of a phase control system but may be implemented using any suitable control circuitry. It will be understood that illustrative process 900 may be, for example, performed by multiple phase control systems corresponding to multiple phases, simultaneously or sequentially. Although discussed in the context of a linear multiphase electromagnetic machine (e.g., a free-piston generator), process 900 may be applied to any suitable multiphase electromagnetic machine.

Step 902 includes a phase control system detecting an event. An event may include, for example, a sample time of a processing algorithm, receipt of a signal (e.g., a message, value or flag), a failure to receive a signal, a failure of a component, a feature in a measured voltage (e.g., an edge of a pulse), an analog signal, any other suitable event, or any suitable combination thereof. For example, in some embodiments, a phase controller may detect a leading edge of a clock signal (e.g., from a clock included in the phase controller, or from a clock signal communicated to the phase controller). In a further example, a phase control system may receive an indication from a central controller, the indication being the event. In some embodiments, for example, the phase controller may execute an algorithm, and the event may be an indication to execute the current controller (e.g., as part of a control scheme).

Step 904 includes a phase control system sensing the current in at least one phase. In some embodiments, step 904 includes the phase controller receiving an input signal from a sensor configured to sense current in the at least one phase corresponding to the phase controller. For example, a loop-type inductive sensor, or a voltage measurement across a high amperage precision resistor, may be used to provide a signal to the phase controller. In a further example, the phase controller may receive input from another system (e.g., a power electronics system) that may include a current sensor. In some embodiments, the phase controller may sense one or more physical quantities and determine a current from those quantities. For example, a phase controller may sense flux, phase voltage, back emf, or other quantities, under suitable conditions, and determine current in the at least one phase based on its relation to these sensed quantities. In an illustrative example, an analog current sensor may be coupled to an analog-to-digital converter of the phase controller, which may sample the output of the current sensor at a suitable sampling rate. The sensor may be powered by a power supply of the phase control system, for example.

Step 906 includes a phase controller generating a control signal. The phase controller may generate the control signal by executing an algorithm such as a feedback-loop control algorithm. In some embodiments, the phase controller determines a desired current value (e.g., in units of amps) and generates a control signal to communicate the desired current value to a power electronics system. For example, the phase controller may generate a pulse-width modulation (PWM) signal to communicate to the power electronics system (e.g., which may activate an IGBT, MOSFET or other high-amperage switching component). In a further example, the phase controller may communicate a message indicative of a desired current using a user datagram protocol (UDP), a transmission control protocol (TCP), or other suitable protocol via a network connection to processing equipment included in a power electronics system. In a further example, the phase controller may generate a control signal indicative of a desired current using a low-voltage bus including any suitable number of conductors (e.g., via CANbus, Modbus, SPI, or other serial bus or parallel bus). The control signal may include a digital signal, an analog signal, an optical signal, a message of any suitable format, any other suitable signal, any suitable modulation thereof, or any suitable combination thereof.

Step 908 includes power electronics applying a phase current to the at least one phase based in part on the control signal of step 906. In some embodiments, the power electronics includes one or more switching components configured to apply a commutated voltage to phase leads. For example, in some embodiments, the power electronics may include one or more switches (e.g., IGBTs, MOSFETs, SiC-based MOSFETS, or other suitable components), or any other suitable switching component, arranged in any suitable arrangement (e.g., H-bridge, star-connected), which can apply voltage from a DC bus to phase leads of the at least one phase for a predetermined schedule. To illustrate, the control signal may include a PWM signal configured to open/close the switch, with suitable commutation, for a period of time indicative of the duty cycle of the PWM signal (e.g., longer duty cycles correspond to larger phase currents as the switches are activated for a longer time). In a further example, in some embodiments, the power electronics may include a half bridge of switches, and the phase leads may be wye-connected, and the power electronics can apply voltage from one bus of the DC bus to a phase lead of the at least one phase for a predetermined schedule.

In some embodiments, the phase controller uses desired currents in all phases of a LEM in generating a control signal. For example, considering wye-connected phases, the currents for all of the phases connected to the neutral must sum to zero (i.e., by Kirchhoff's current law as applicable). Accordingly, all phase controllers corresponding to a LEM may determine desired current values constrained to sum to zero.

It will be understood that in the context of FIG. 9, a desired current value may be replaced by, or supplemented by, a desired phase voltage or any other value that may be indicative of a desired current. For example, a phase controller may determine a desired phase voltage, a desired PWM duty cycle, a desired commutation (e.g., positive or negative current), or any other suitable value or combination of values. In a further example, the illustrative steps of process 900 may be implemented during normal operation, braking, or both to manage one or more phase currents.

FIG. 10 shows a flowchart of illustrative process 1000 for managing one or more failed phase control systems, in accordance with some embodiments of the present disclosure. The steps of illustrative process 1000 may be performed by a plurality of phase control systems, a central controller, or a suitable combination thereof. The following description will reference control circuitry which may be included in any suitable controller or control system. In some embodiments, the illustrative steps of process 1000 are performed in response to detecting an event such as a fault (e.g., a short in a phase, a non-responsive phase, an altered property of a phase). Although discussed in the context of a linear multiphase electromagnetic machine (e.g., a free-piston generator), process 1000 may be applied to any suitable multiphase electromagnetic machine.

Step 1002 includes control circuitry determining if phase control systems, or components thereof, have failed. In some embodiments, each phase control system may perform step 1002. For example, a plurality of phase control systems may communicate with one another and indicate (e.g., using any suitable communication protocol) to other phase control systems if a local failure occurs (i.e., the instant phase control system fails). To illustrate, each phase control system may send a status indicator to all other phase control systems, which may be configured to indicate if a failure has occurred. Further, the absence of an indication may also be used to determine that a failure has occurred. In some embodiments, a central control system may communicate with each phase control system and determine if one has failed (e.g., by lack of communication, or an affirmative indication of failure). In some embodiments, a central control system, one or more phase control systems, or a combination thereof may determine that a phase control system has failed based on measured or calculated values of operating conditions of the LEM. For example, if a measured current, voltage, flux, back emf, other signal, or feature of a signal indicates a failure of a particular phase, the corresponding phase control system may be determined to have failed. In some embodiments, a failure of a phase such as a short, an open circuit, thermal degradation, or other failure event may cause the determination that a phase control system has failed. In a further example, if a grid-tie inverter is determined to have failed, the control circuitry may determine that any phase control system coupled to the failed grid-tie inverter has also failed. A failure event may include a failure of any component of a phase control system (e.g., any of the components or systems of FIG. 8), a phase itself (e.g., a winding of the phase, an interconnect of the phase, or a ferrous core of the phase), a phase lead, a grid-tie inverter, a DC bus, a lead coupled to a DC bus, a DC-DC converter, a sensor, a communications link, a component (e.g., an energy storage device), any other suitable component or system, or any combination thereof.

If it is determined at step 1002 that no phase control systems have failed, the phase control systems may proceed to execute or continue executing process 900 of FIG. 9. for example. If it is determined at step 1002 that one or more phase control systems have failed, then the control circuitry may proceed to step 1004. Step 1004 includes control circuitry identifying one or more phase control systems that have failed. In some embodiments, step 1004 may be combined with step 1002. For example, the determination that at least one phase control system has failed may include identifying the phase control system. Step 1004 may include control circuitry determining an address (e.g., an IP address or other communication address of a failed phase control system), an index (e.g., an integer indicating which phase control system has failed), a phase index (e.g., phase j of a LEM), a serial number, any other suitable identification, or any combination thereof.

Step 1006 includes control circuitry isolating the at least one failed phase control system. In some embodiments, step 1006 includes a phase controller generating a control signal indicative of zero current (e.g., a PWM signal with a minimal duty cycle). In some embodiments, step 1006 includes a phase controller ceasing to generate any control signal (e.g., ceasing communication with power electronics). In some embodiments, step 1006 may include one or more switching components (e.g., a contactor, a transistor, or a relay) to open a circuit, thereby preventing application of a DC bus voltage to a phase lead coupled to the failed phase control system. Step 1006 includes an electrical isolation, thereby preventing current from being applied by a failed phase control system, current being applied to a failed phase, or both.

Step 1008 includes control circuitry modifying one or more current constraints for non-failed (e.g., still operable) phase control systems. For example, if one or more phase control systems fail, the remaining phase control systems may allow continued operation of the corresponding LEM(s). However, if not all phase control systems are able to apply current to corresponding phases (e.g., isolated phase control systems from step 1006), the amount of current applied by the remaining phase control systems may be modified. For example, to achieve the same electromagnetic force with some phases disabled requires increased current flow in the remaining phases, with the current distribution among phases being determined using any suitable method. In an illustrative example, considering wye-connected phases, the isolation of a phase control system and corresponding one or more phases requires the applied current in the remaining phases to sum to zero. In some embodiments, the determination of current by either a central control system, a phase controller, or both, may be modified to reflect the isolation of one or more phase control systems. For example, in some embodiments, following identification and isolation of a failed phase control system, the remaining phase control systems may perform process 900, based only on the remaining phase control systems (e.g., allotting no current to phases corresponding to a failure). Each time a failure event is detected, the determination of current may be further constrained to reflect the isolation of the corresponding phase control system. Further, it may be determined at step 1008 that the LEM should stop operating (e.g., begin auto-braking). For example, if a sufficient number of phases corresponding to failed phase control systems cannot have current applied due to isolation (e.g., at step 1006), the control circuitry may determine that continued operation is unsafe, inefficient, or otherwise undesirable, and accordingly manage shutdown of the LEM (e.g., including slowing and stopping motion of a corresponding translator). A sufficient number of phases may be determined by the inability of a desired electromagnetic force to be achieved, a desired translator position to be reached, or otherwise the inability of a property of the system to achieve a desired value.

It is contemplated that the steps or descriptions of FIGS. 9-10 may be used with any other embodiments of the present disclosure. In addition, the steps and descriptions described in relation to FIGS. 9-10 may be done in alternative orders or in parallel to further the purposes of this disclosure. Further, each of these steps may be performed in any order or in parallel or substantially simultaneously to reduce lag or increase the speed of the system or method. Any of these steps may also be suitably skipped or omitted from the process. Furthermore, it should be noted that any of the suitable devices or equipment discussed in relation to FIGS. 1-8 could be used, alone or in concert, to perform one or more of the steps in FIGS. 9-10.

Any of the illustrative processes and systems of FIGS. 11-31, described in the context of braking, may be applied to one phase of an electromagnetic machine, more than one phase of an electromagnetic machine, phases of more than one electromagnetic machine (e.g., stators associated with opposing translators), or any combination thereof. Further, the braking techniques may be applied to electromagnetic machines having one phase or more than one phase. Any of the illustrative techniques, systems, and configurations shown in FIGS. 1-10 may be used to implement any of the braking processes of the present disclosure.

Figure 11:
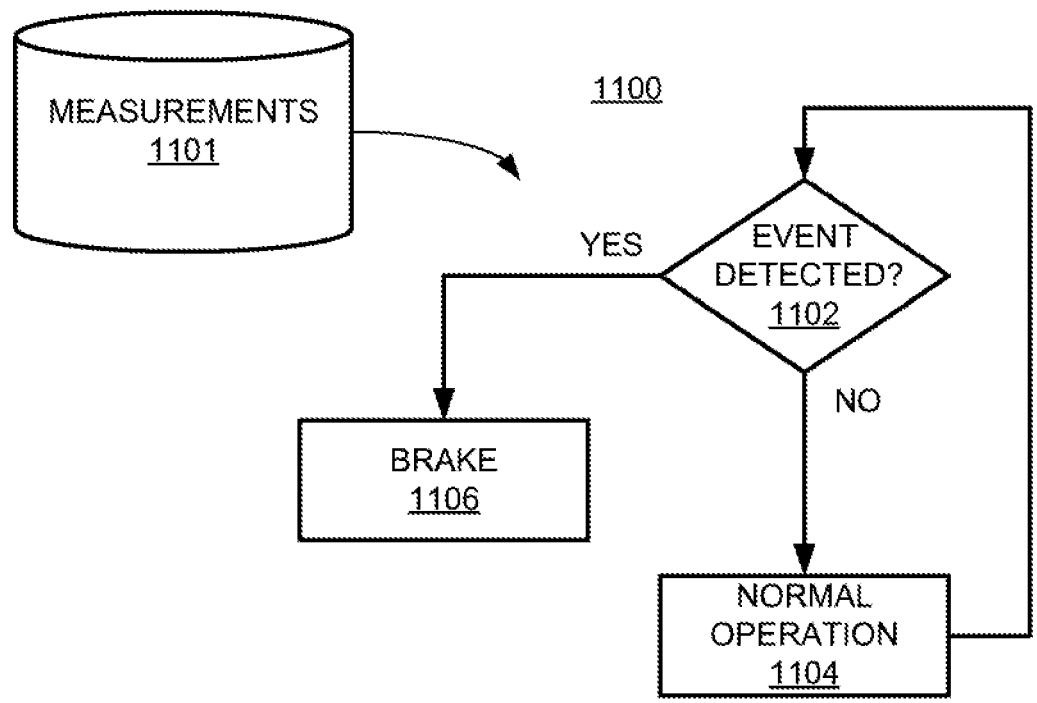
FIG. 11 shows a flowchart of an illustrative process for automatic braking, in accordance with some embodiments of the present disclosure.

In some embodiments, the control system may detect an event during operation and determine an electromagnetic technique to brake the translator(s) to shut down, slow down, or stop moving over a suitable time period. FIG. 11 shows a flowchart of illustrative process 1100 for auto-braking, in accordance with some embodiments of the present disclosure. The steps of illustrative process 1100 may be performed by one or more phase control systems, a central controller, or a suitable combination thereof. The following description will reference control circuitry which may be included in any suitable controller or control system.

Measurements 1101 may include sensor signals, metrics derived from sensor signals, an output of a model (e.g., output of an observer or estimation of a physical quantity or operating parameter), any other suitable value or metric indicative of an operating parameter, or any combination thereof. Step 1102 includes the control circuitry detecting an event, or otherwise determining an event has occurred. In some embodiments, the event may include a fault event or a failure event. Depending upon whether the control circuitry has detected an event at step 1102, the control circuitry may proceed to either braking process 1106 or normal operation 1104. Normal operation 1104 is an illustrative process performed when no event has been detected. Braking process 1106 is an illustrative process performed in response to an event being detected (e.g., a fault requiring auto-braking). In some embodiments, control circuitry may determine a type of fault, availability information for one or more operating parameters (e.g., what, if any, information is available in regards to an operating parameter), a loss in communication, any other suitable fault, or any combination thereof. In an illustrate example, a control system may repeatedly perform step 1102 to check for faults and perform step 1104 until a fault is detected. Step 1106 may include modifying an algorithm for determining phase currents, changing a constraint on phase currents, determining desired position information associated with braking (e.g., reduced stroke length and reduced translator velocities), determining desired force information associated with braking (e.g., a desired braking force applied to a translator, a synchronized braking force applied to more than one translator), any other suitable modification, or any combination thereof. In some embodiments, the control circuitry may determine the braking algorithm based on the type of fault. For example, if position information is available and current information is available, the control circuitry may continue to determine phase currents as during normal operation while adjusting desired target positions to slow the translators. In a further example, if position information is unavailable, the control circuitry may perform a position estimation or emf polarity estimation to determine phase currents.

In some embodiments, process 1100 may be implemented by more than one controller or control system. For example, during normal operation (e.g., step 1104) a first controller may be used, and during braking (e.g., step 1106) a second controller may be used. In some embodiments, a controller activated for braking may be relatively simpler (e.g., less computationally complex) than a controller used for normal operation. Because braking may involve operating conditions that are not required to be efficient, precise, or include very tight tolerances in operation parameter values, the associated controller or control system may include relatively fewer parameters, relatively fewer commands, or otherwise be configured to operate more simply. In some embodiments, a controller used during braking may have an associated power supply, an associated communications link, an associated processor, any other associated or dedicated equipment, or any combination thereof. In some embodiments, separate control systems for normal operation and braking provide redundancy. For example, in the event of a failure of the normal operation control system, the braking control system may remain functional and capable of braking one or more translators. In some embodiments, one braking controller, or more than one braking controller may be included. For example, each phase, motor, or other suitable group of hardware may have an associated respective braking controller.

In some embodiments, process 1100 may include more than one control algorithm, implemented by a single control system. For example, during normal operation (e.g., step 1104) a first algorithm may be used, and during braking (e.g., step 1106) a second algorithm may be used. In some embodiments, the control system may implement a flag, state machine (e.g., configured to manage system states), or other suitable management mechanism for managing algorithm states.

Figure 12:
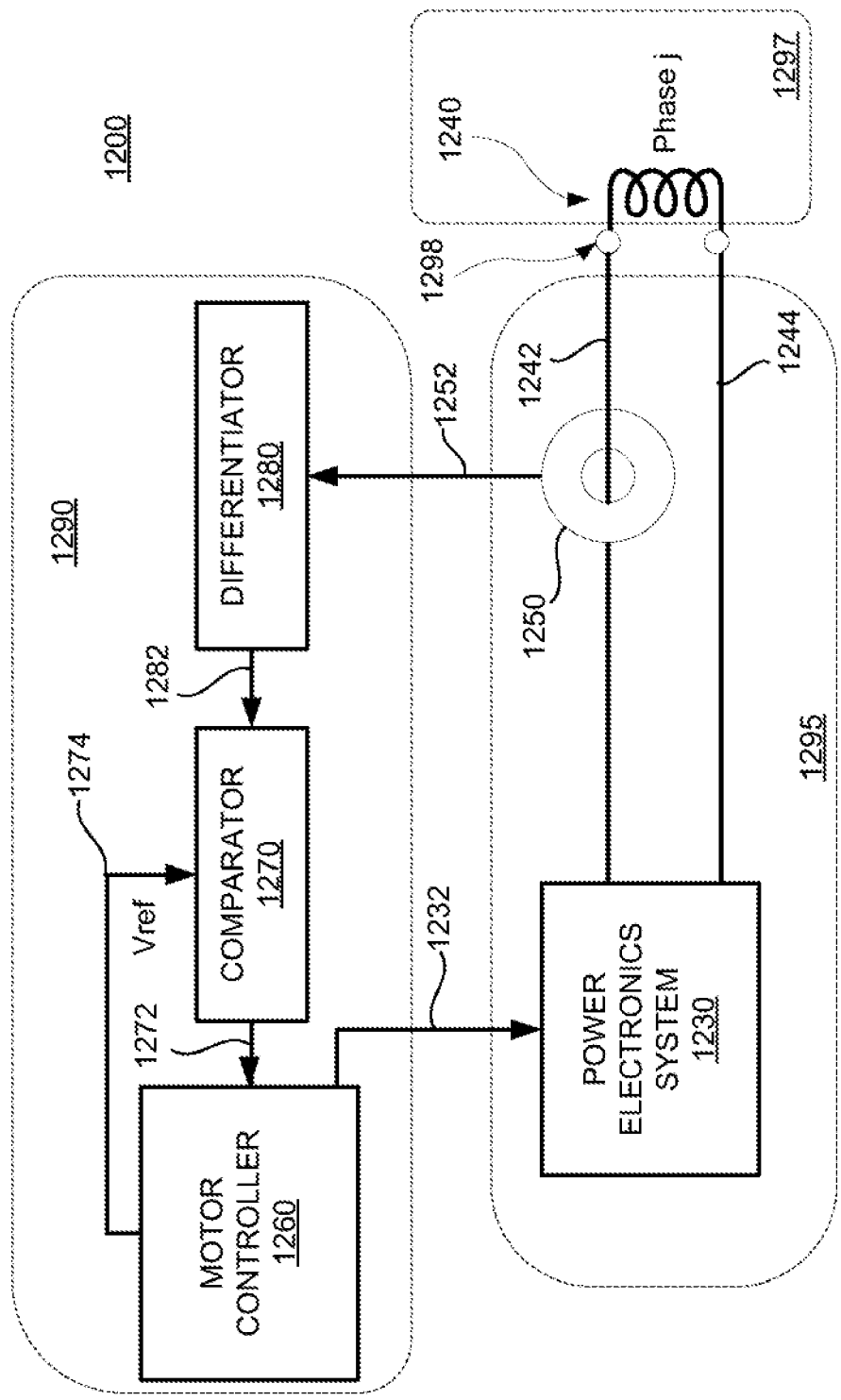
FIG. 12 shows an illustrative arrangement, including a power electronics system coupled to a phase of a multiphase electromagnetic machine, in accordance with some embodiments of the present disclosure.

FIG. 12 shows illustrative arrangement 1200, including power electronics system 1230 coupled to phase 1240 of a multiphase electromagnetic machine, in accordance with some embodiments of the present disclosure. Arrangement 1200 includes motor controller 1260, sensor 1250, differentiator 1260, and comparator 1270, which may be configured to control a current in phase 1240 (e.g., of multiphase electromagnetic machine 1297 which is not explicitly shown in FIG. 12). In some embodiments, sensor 1250 may include a current sensor, and differentiator 1280 and comparator 1270 may be used to determine a sign of a derivative of a sensed current.

In some embodiments, differentiator 1280, comparator 1270, or both, are implanted in hardware. For example, differentiator 1280 may be implemented using analog circuitry including an operational amplifier, capacitors, and resistors. Further, comparator 1270 may be implemented using analog circuitry including an operational amplifier. Accordingly, for example, a signal from sensor 1250 may be differentiated by differentiator 1280, and then compared with Vref 1274 (e.g., which may be zero volts) to determine a sign of the differentiated value. To illustrate, if the differentiated signal is greater than Vref 1274, then comparator 1270 may output a digital high (e.g., a "one" in binary), and conversely if the differentiated signal is less than Vref 1274, then comparator 1270 may output a digital low (e.g., a "zero" in binary). In some embodiments, Vref 1274 may be provided by motor controller 1260. In some embodiments, Vref 1274 may be a ground (e.g., chassis). Vref 1274 may include any suitable reference voltage.

In some embodiments, differentiator 1280, comparator 1270, or both, are implemented in software (e.g., of motor controller 1260). For example, a signal from sensor 1250, which may be indicative of instantaneous current in phase lead 1242, may be received at motor controller 1260. Motor controller 1260 may process the signal, apply one or more mathematical operations, apply one or more signal operations, or a combination thereof, to determine a value indicative of a derivative of the signal, and then compare the value to a reference value. In some embodiments, motor controller 1260 may store historical values, and may estimate a sign of a derivative based on a weighted combination of historical values. For example, any suitable numerical technique may be used to estimate a sign of a derivative of a measured current, in accordance with the present disclosure.

Sensor 1250 may include any suitable sensor for sensing an electrical parameter of phase lead 1242. As shown in FIG. 12, sensor 1250 may include a loop current sensor, which may be configured to output a signal indicative of instantaneous current in phase lead 1242. However, any suitable sensor may be used in accordance with the present disclosure. For example, sensor 1250 may include a voltage sensor, configured to measure a phase voltage between phase leads 1242 and 1244, either phase lead 1242 or 1244 and a ground, or any combination thereof.

In some embodiments, one or more components of arrangement 1200 may be grouped, integrated, or otherwise combined. For example, system 1290 shows an illustrative grouping including motor controller 1260, comparator 1270, and differentiator 1280, which may be implemented as an integrated system (e.g., in hardware or software). To illustrate, in some embodiments, control system 350 of FIG. 3 includes system 1290. In a further example, system 1295 shows an illustrative grouping including power electronics system 1230, sensor 1250, and phase leads 1242 and 1244, which may be implemented as an integrated system, coupled to multiphase electromagnetic machine 1297 via interconnects 1298. To illustrate, in some embodiments, power electronics system 330 of FIG. 3 includes system 1295 (e.g., and accordingly, sensor 1250 may be coupled to power electronics system 1230). It will be understood that systems 1290 and 1295 are illustrative, and that any suitable grouping or integration may be used, in accordance with the present disclosure. In some embodiments, system 1290 need not be included, and sensor 1250 is coupled to power electronic system 1230, a control system, a subsystem or module, or a combination thereof.

Equation 1, below, provides an illustrative example of how phase voltage V for phase j (i.e., the voltage drop across phase j, measured across phase leads 1242 and 1244 at power electronics system 1230), current i for phase j (e.g., as measured by sensor 1250), resistance R in phase j, inductance L in phase j (e.g., the inductance of windings of phase 1297, which may depend on position, flux, current, and/or other parameters), the time derivative of current i in phase j, force constant k in phase j (e.g., which may depend on position, flux, current, and other parameters), and translator velocity (e.g., the translator that interacts electromagnetically with phase j) are related, when the phase is not being shorted.

$$V_{Phase,j} = i_j R_j + L_j \frac{di_j}{dt} + k_j v \qquad \text{Equation 1}$$

The first term on the right hand side (RHS) of Equation 1 represents ohmic voltage drop in phase j, the second term on the RHS represents inductive voltage drop in phase j, and the third term on the RHS represents the back emf (e.g., from motion of the translator).

Equation 2 provides an illustrative example of how back emf for phase j (e.g., phase 1297), inductance L in phase j, and the time derivative of current i in phase j, are approximately related, when the phase is being shorted (e.g., phase leads 1242 and 1244 connected together at power electronics system 1230). Note that Equation 2 can be arrived at from Equation 1 by defining $V_{phase,j}$ as zero (e.g., the phase leads are shorted), and neglecting the ohmic voltage drop term.

$$0 \sim L_j \frac{di_j}{dt} + k_j v \text{ or} \qquad \text{Equation 2}$$

$$-L_j \frac{di_j}{dt} \sim \text{back emf} \qquad \text{Equation 3}$$

Equation 3 results from algebraically rearranging Equation 2, where $k_{j*v}$ is back emf. Equation 3 shows that the sign of the back emf may be approximated from the sign of the derivative in current (e.g., they have opposite sign in Equation 3).

Equation 4, below, provides an illustrative example of how phase voltage V for phase j (i.e., the voltage drop across phase j) and back emf are related, when phase j has no current (e.g., phase leads 1242 and 1244 are not connected to each other or a bus at power electronics system 1230). For example, Equation 4a may be relevant when the power electronics system attempts to apply a current of zero, or if corresponding switches (e.g., which couple the phase leads to buses or neutrals) are not activated at all. In a further example, Equation 4b may be relevant when the power electronics system attempts to apply a DC current (e.g., which simplifies to Equation 4a if the resistance R is small).

$$V_{Phase,j} = k_j v = \text{back } emf \qquad \text{Equation 4a:}$$

$$V_{Phase,j} = R*I + \text{back } emf \qquad \text{Equation 4b:}$$

Figure 13:
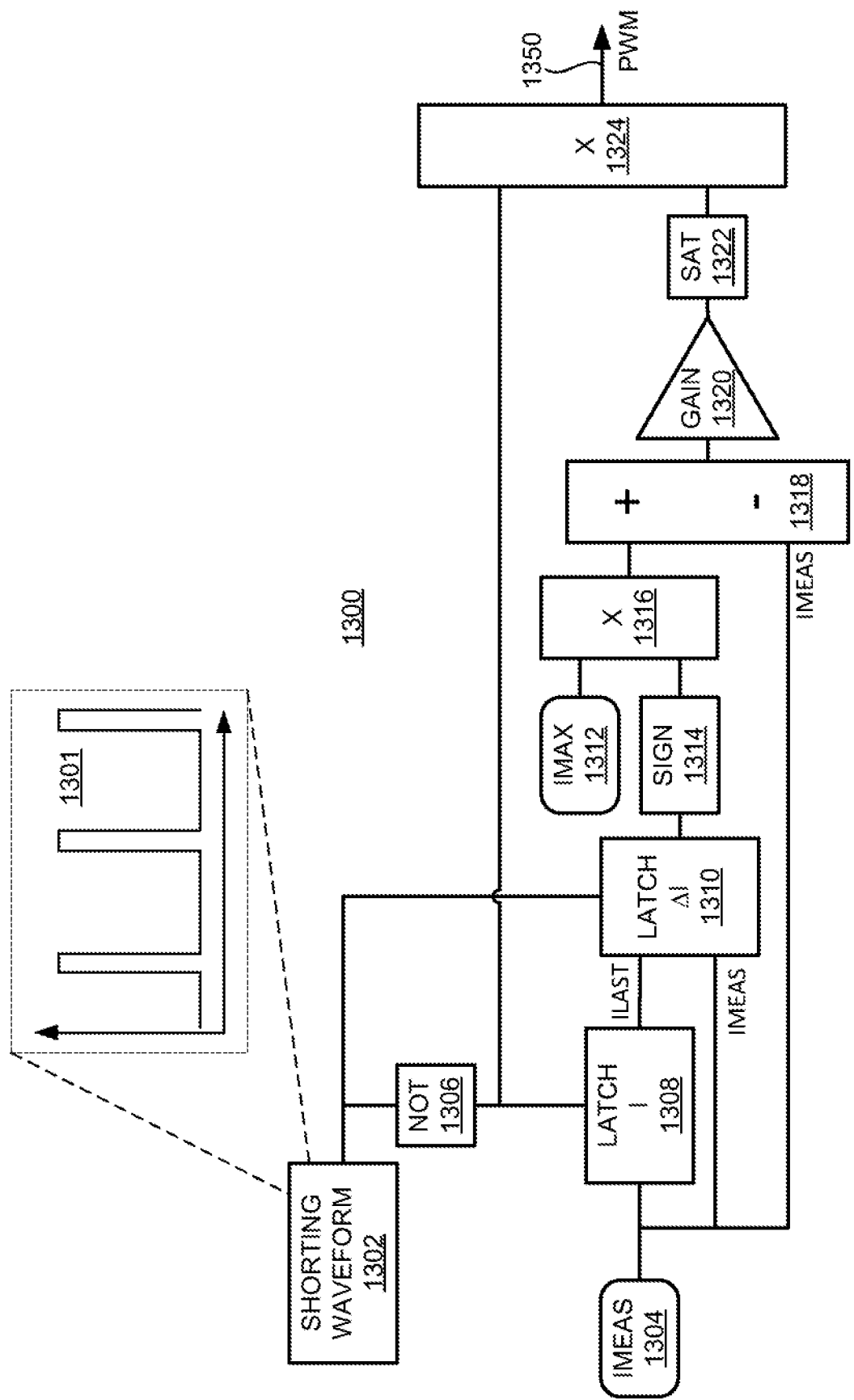
FIG. 13 shows an illustrative controller for determining a control signal, in accordance with some embodiments of the present disclosure.

In some embodiments, a controller may be configured to determine a control signal based on a polarity indicative of emf. FIG. 13 shows illustrative controller 1300 for determining control signal 1350, in accordance with some embodiments of the present disclosure. Controller 1300 may be implemented in any suitable hardware, software, or combination thereof. Controller 1300 will be described below in terms of phase j, wherein control signal 1350 may be configured to direct power electronics to apply current to phase j. In some embodiments, the actions performed by controller 1300 may be multiplexed (e.g., a vector of values are passed along the modules, and control signal 1350 is a multiplexed signal). In some embodiments, a set of controllers similar to controller 1300 are included and each may output a control signal to respective power electronics to apply current to a respective phase. In an illustrative example, controller 1300 may be implemented in real time on processing equipment such as control system 350, shown in FIG. 3. The following discussion with respect to FIG. 13 will be in terms of sequential logic and operations, for simplicity, but may be implemented using any suitable computational arrangement. In some embodiments, controller 1300 is configured for braking a translator by applying a braking current (e.g., a phase current causing an electromagnetic force on a translator opposing motion of the translator).

Measured current 1304 may be received from any suitable hardware or software. For example, a signal from a current sensor may be provided to an analog-to-digital converter of a control system that may provide measured current 1304 at a fixed sampling frequency.

Shorting waveform 1302 may be configured to output, for example, a binary signal defining when a phase is to be shorted in time. For example, waveform 1301 includes high values (e.g., shorting), and low values (e.g., not shorting), indicating a schedule for shorting phase j.

Inverter 1306 may be configured to invert the output of shorting waveform 1302. For example, when waveform 1301 is high, inverter 1306 may output low, and when waveform 1301 is low, inverter 1306 may output high.

Current latch 1308 may output a latest measured current 1304 value when the output of inverter 1306 is high, and may output a fixed value (e.g., the last value) when the output of inverter 1306 is low.

Current difference latch 1310 (i.e., latch 1310) may be configured to output a latest difference between measured current 1304 and the latched output of latch 1308 when the output of shorting waveform 1302 is high, and may output a fixed value (e.g., the last value) when the output of shorting waveform 1302 is low.

Maximum current 1312 may be configured to include a constant value (e.g., 350 amps), a varying value (e.g., dependent upon other parameters), or any other suitable value of a maximum desired current. For example, maximum current 1312 may include a maximum safe current value to be applied to phase j during braking with respect to capabilities of power electronics, a multiphase electromagnetic machine, or both.

Sign 1314 may be configured to output either a positive or negative reference value based on the sign of input. For example, if the output of latch 1310 is positive, sign 1314 may output a positive one, while if the output of latch 1310 is negative, sign 1314 may output a negative one. Accordingly, sign 1314 may be used to normalize the output of latch 1310, while preserving the sign (e.g., or preserving the opposite of the sign, if sign 1314 is inverted).

Multiplier 1316 may be configured to multiply the output of maximum current 1312 and sign 1314 to generate a maximum current of a desired sign, for braking.

Addition 1318 may be configured to combine the output of multiplier 1316 and measured current 1318 to generate an error, or difference, signal. The error signal may be indicative of how different the measured current is from the desired maximum current. As shown in FIG. 13, addition 1318 combines the output of multiplier 1316 with the negative of measured current 1304 (i.e., subtracts measured current from the output of multiplier 1316).

Gain 1320 may be configured to multiply the output of addition 1318 by a factor, which may be constant or may depend on other parameters. For example, gain 1320 may multiply the output of addition 1318 by a constant indicative of P-control (e.g., a proportional controller).

Saturation 1322 may be configured to limit the output of gain 1320 before multiplier 1324. For example, saturation 1322 may limit the output of gain 1320 to values between a predetermined maximum value and a predetermined minimum value. Saturation 1322 may be configured to prevent ill-defined, dangerous, or non-sensical values from propagating to multiplier 1324.

Multiplier 1324 may be configured to multiply the output of saturation 1322 by the output of inverter 1306. Accordingly, if shorting waveform 1302 outputs a high (e.g., shorting), then multiplier 1324 outputs zero (i.e., zero multiplied by the output of saturation 1322 is zero), and no control signal is outputted when shorting (e.g., control signal 1350 is inactive). Also, if shorting waveform 1302 output a low (e.g., not shorting), then multiplier 1324 outputs the output of saturation 1322, and control signal 1350 is active when not shorting (e.g., when phase current may be desired).

Control signal 1350 may be outputted to, for example, power electronics, to cause the application of current in phase j. In an illustrative example, control signal 1350 may include a PWM signal, with a corresponding duty cycle that specifies an "on" time for a switch (e.g., an IGBT, a MOSFET or any other suitable device). In some embodiments, control signal 1350 may include more than one signal for causing the application of current to phase j. For example, for wye connected phases, control signal 1350 may include signals for connecting a phase lead to a high bus or a low bus of a DC bus (e.g., using a set of IGBTs, MOSFETs or other components).

When shorting waveform 1302 outputs a low value (e.g., not shorted), latch 1308 is active, and the value latched current (i.e., "ILAST" as the output of latch 1308) is updated at latch 1310. However, latch 1310 is not active, and outputs a fixed (i.e., latched) value. The output of inverter 1306 is high, and accordingly, control signal 1350 is active, outputting a control signal indicative of maximum current 1312, having a desired sign. Note that as shown in FIG. 13, sign 1314 does not change value when latch 1310 is not active.

When shorting waveform 1302 output a high value (e.g., shorted), latch 1308 is inactive, the latched current (i.e., output of latch 1308) is not updated at latch 1310. However, when latch 1310 is active, it outputs a difference between a measured current 1304 and latched current from before latch 1308 was inactive (i.e., the difference is being updated). The output of inverter 1306 is low, and accordingly, control signal 1350 is inactive, and no control signal is outputted. Note that as shown in FIG. 13, latched current does not change value when latch 1308 is not active.

By alternating between a shorting and non-shorting state, controller 1300 may apply a maximum desired current, having a desired sign, to brake a translator of a multiphase electromagnetic machine. When shorting, controller 1300 updates information on the derivative of measured current (e.g., and also back emf). When not shorting, controller 1300 causes the application of a maximum desired braking current having an appropriate sign.

Figure 14:
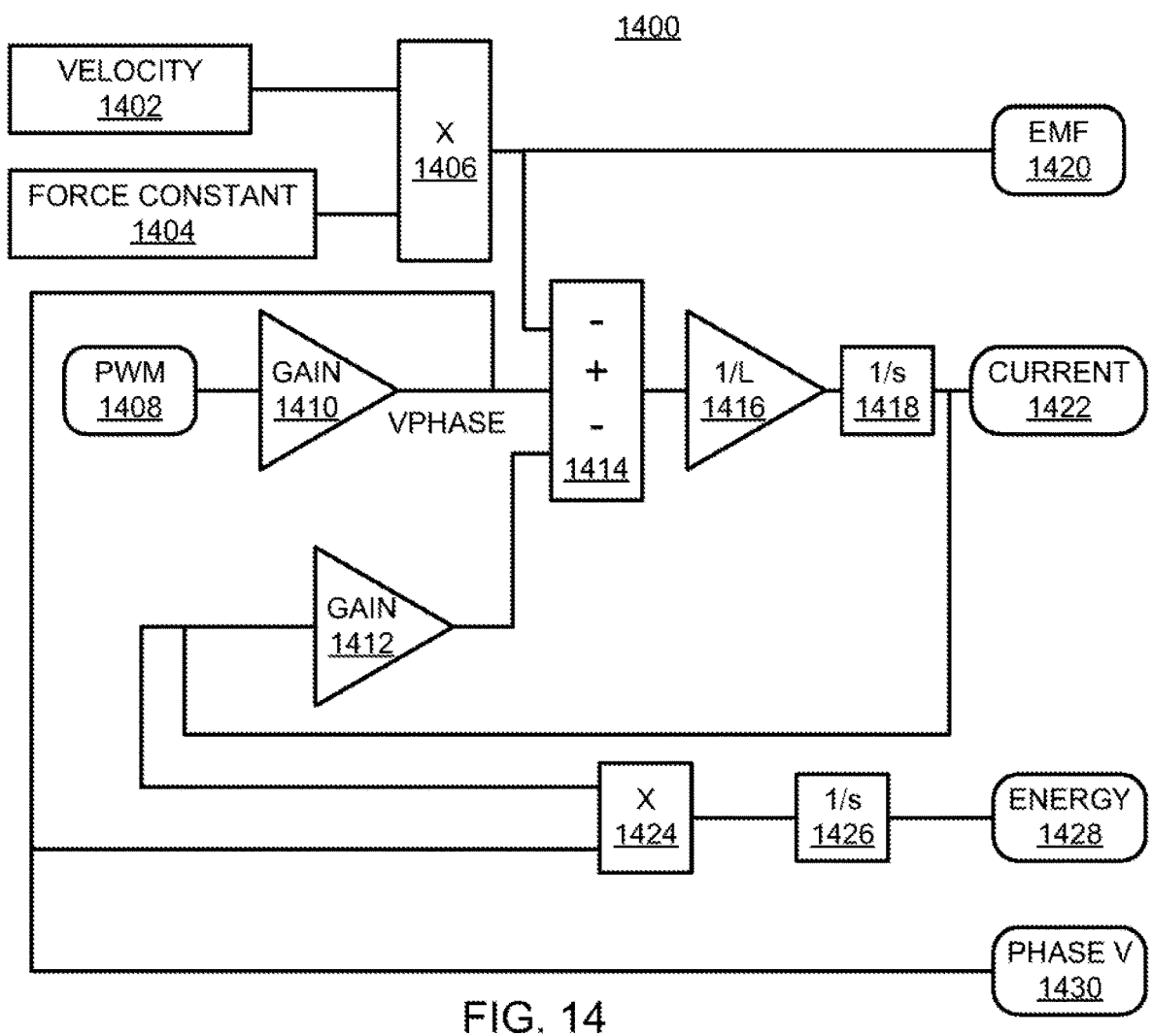
FIG. 14 shows an illustrative controller for processing output of the controller of FIG. 13, in accordance with some embodiments of the present disclosure.
Figure 15:
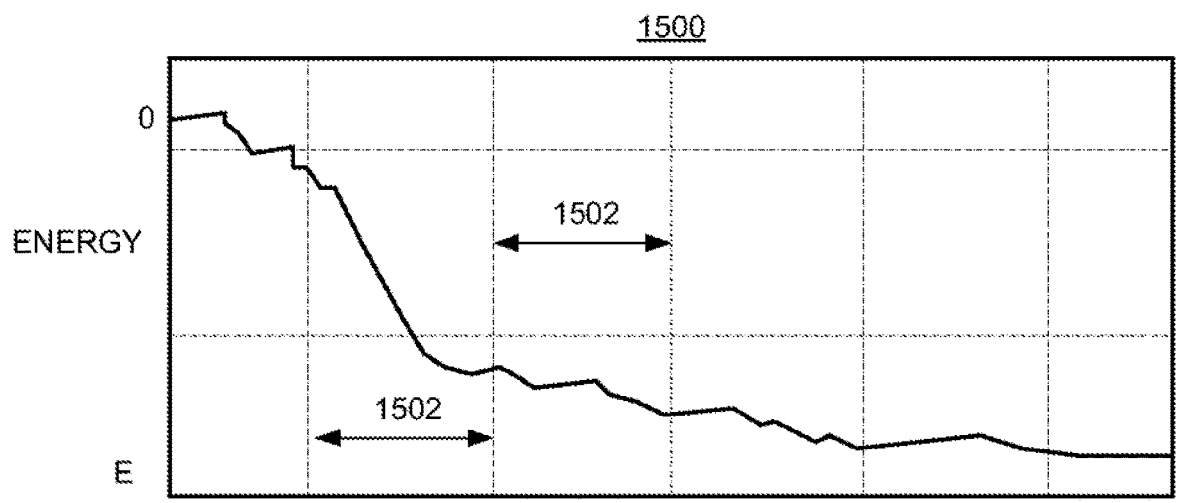
FIG. 15 shows a plot of an illustrative energy metric corresponding to a multiphase electromagnetic machine, in accordance with some embodiments of the present disclosure.
Figure 16:
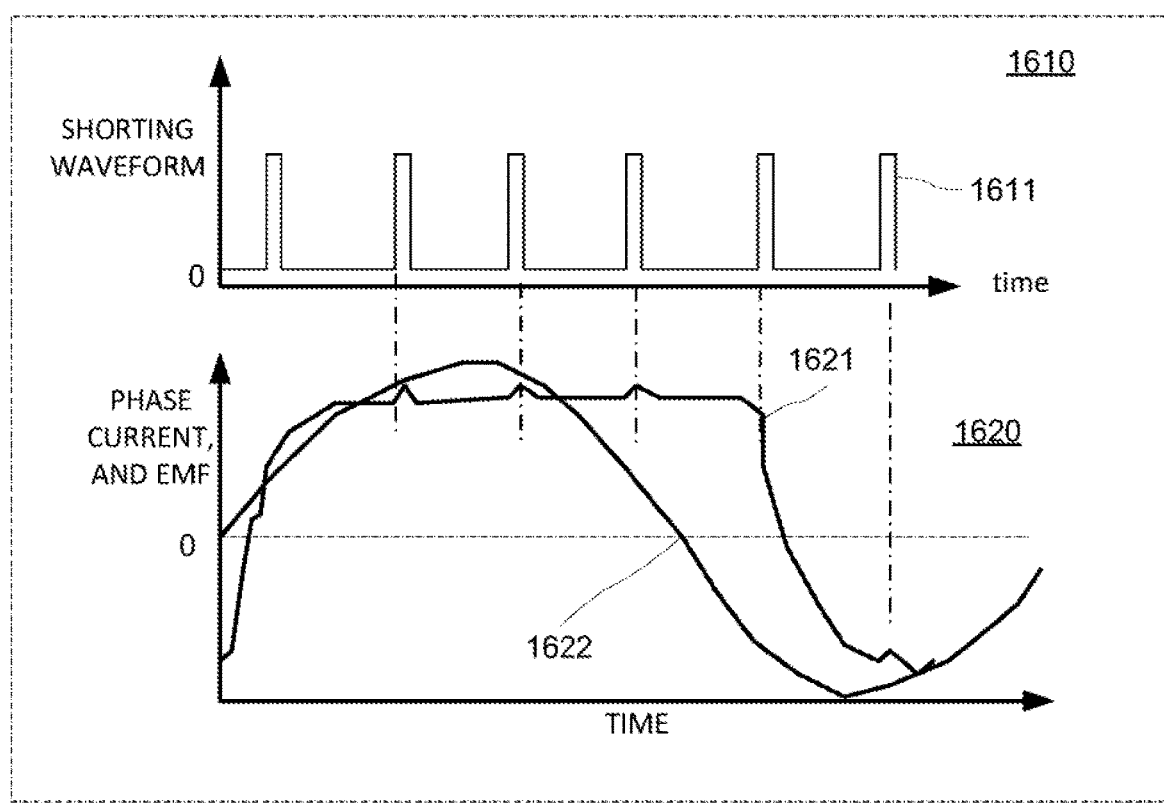
FIG. 16 shows plots of illustrative signals in a shorter timescale corresponding to a phase of a multiphase electromagnetic machine, in accordance with some embodiments of the present disclosure.

FIG. 14 shows illustrative controller 1400 for processing output of controller 1300 of FIG. 13, in accordance with some embodiments of the present disclosure. For discussion purposes, controller 1400 may provide a simplified representation of a power electronics system and a multiphase electromagnetic machine. The description of controller 1400 is intended to provide illustrative results of applying a control signal to power electronics to cause the application of current in a phase, to brake a translator. Control signal 1408 may be similar to control signal 1350 of FIG. 13 but need not be identical. The plots provided in FIGS. 15-16 are illustrative of information that may be derived from controller 1400 and controller 1300, for example, and may be indicative of a multiphase electromagnetic machine, which may be approximately modeled by controller 1400.

Back emf 1420 may be estimated, for example, as the product of translator velocity 1402 and force constant 1404, as multiplied by multiplier 1406.

Phase voltage 1430 is estimated as a proportionality factor multiplied by control signal 1408. For example, if control signal 1408 is a PWM signal, phase voltage 1430 may be proportional to the PWM duty cycle (e.g., full duty cycle corresponds to full DC bus voltage, or bus line-to-neutral phase voltage). As shown in FIG. 14, phase voltage "VPHASE" is determined from control signal 1408 at gain 1410.

Current 1422 in phase j (e.g., which may serve as an estimate of measured current 1304 in FIG. 13) is determined based on a voltage summation performed at addition 1414, division by inductance L at gain 1416, and integral 1418 (e.g., which converts the time derivative of current to current 1422). Controller 1400 as illustrated in FIG. 14 performs a computation similar to that represented by Equation 1, although solving for current 1422.

Instantaneous electrical power from phase I is given as the output of multiplier 1424, which multiplies instantaneous current 1422 and phase voltage 1430. Cumulative energy 1428 is the time integral, via integrator 1426, of instantaneous power from a suitable starting point.

FIGS. 15-16 show illustrative output of controller 1400 of FIG. 14, using data and illustrative model values. It will be understood that controller 2200 and 1400, as well as the plots shown in FIGS. 15-16, are merely illustrative and are included to provide examples in accordance with the present disclosure.

FIG. 15 shows a plot 1500 of an illustrative energy metric corresponding to a multiphase electromagnetic machine, in accordance with some embodiments of the present disclosure. The metric shown in plot 1500 is cumulative energy removed from a translator during braking. As shown, most of the energy is removed in about one time scale 1502 (i.e., a unit measure of time). Time scale 1502 may be any suitable time period, number of strokes, number of cycles, clock pulses, sampling points, or other progressing variable. In some embodiments, braking may occur relatively quickly (e.g., within a stroke, or several strokes), and the braking force may be relatively large (e.g., larger than electromagnetic forces applied during normal operation). In some embodiments, braking may occur relatively slowly (e.g., over the course of many strokes), and the braking forces may be relatively smaller (e.g., similar to or smaller than electromagnetic forces applied during normal operation).

FIG. 16 shows plots 1610 and 1620 of illustrative signals corresponding to a phase of a multiphase electromagnetic machine, in accordance with some embodiments of the present disclosure. Plot 1610 shows illustrative shorting waveform 1611, for which the pulses correspond to shorting (e.g., shorting when high, not shorting when low). Plot 1620 shows illustrative phase current 1621 and emf 1622 corresponding to the shorting waveform. In some embodiments, the frequency of pulses of shorting waveform 1611 is higher than the frequency of polarity changes of the phase current or emf.

Figure 17:
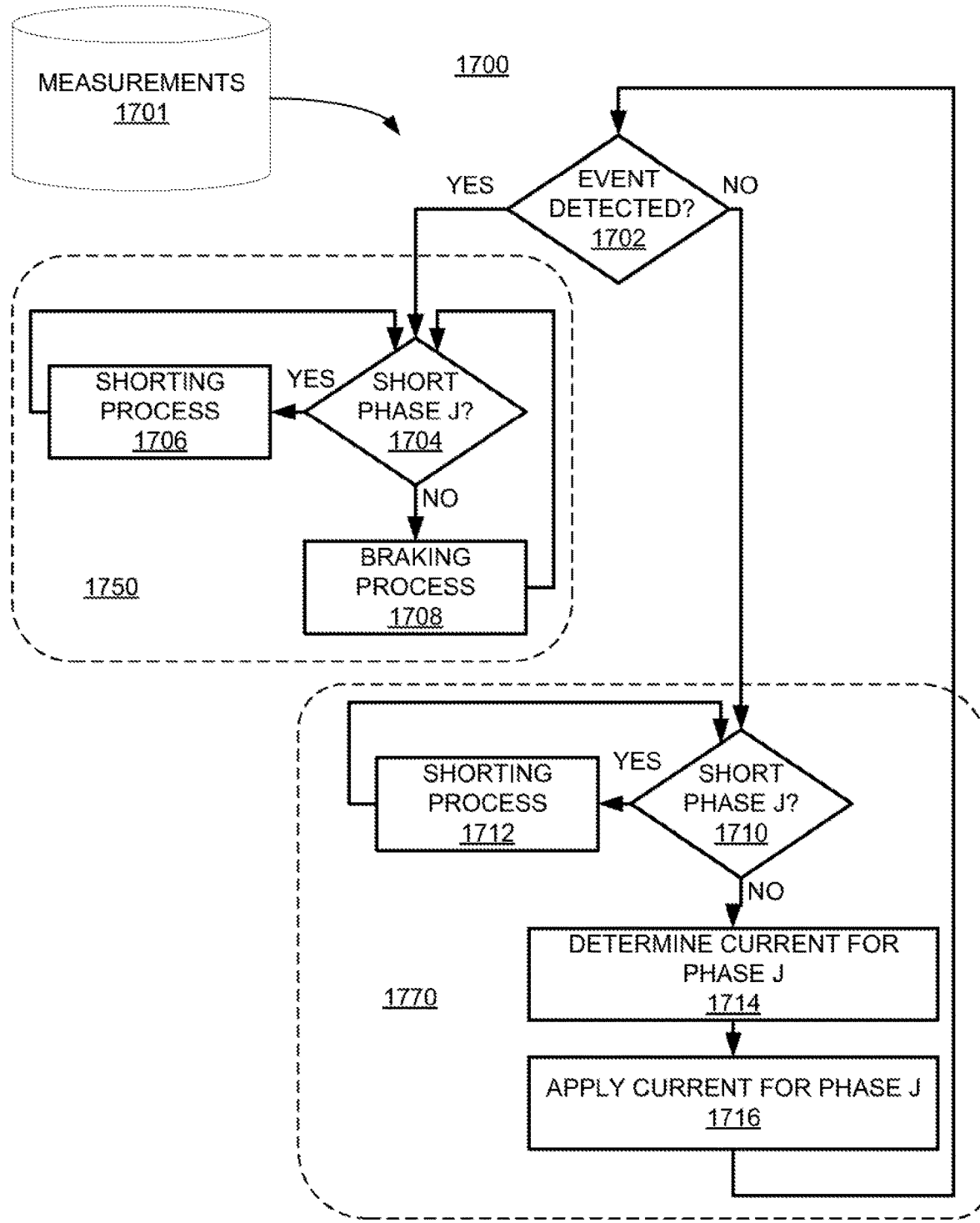
FIG. 17 shows a flowchart of an illustrative process for managing current in one or more phases of a multiphase electromagnetic machine, in accordance with some embodiments of the present disclosure.

FIG. 17 shows a flowchart of illustrative process 1700 for managing current in one or more phases of a multiphase electromagnetic machine, in accordance with some embodiments of the present disclosure. Process 1700 is an illustrative example of process 1100 of FIG. 11, including normal operation and a braking process.

Step 1702 includes the control circuitry detecting an event, or otherwise determining an event has occurred. In some embodiments, the event may include a fault event or a failure event. For example, a fault event may include a loss of communication in a control system (e.g., control system 350 of FIG. 3). In a further example, a fault event may include an unintended short of a phase in a multiphase electromagnetic machine (e.g., multiphase machine 340 of FIG. 3). In a further example, a fault event may include a loss in signal from a sensor as received by a control system (e.g., an encoder, a phase current sensor, or a DC bus voltage sensor). In a further example, a fault event may include a mode change to "stop" from a control system, during which braking is desired. In a further example, a fault event may include a loss of PWM control, or a PWM signal thereof, from a control system or phase control system. In a further example, a fault event may include a loss of a DC bus (e.g., loss of DC bus voltage), a loss in control of the DC bus, or a loss of a component coupled to the DC bus (e.g., an energy storage device). In some embodiments, control circuitry may determine an event has occurred by performing a set of diagnostics (e.g., checking that signals are refreshing, checking that sensors are providing signals, checking that all communications between systems and subsystems are occurring).

Depending upon whether the control circuitry has detected an event at step 1702, the control circuitry may proceed to either process 1750 (e.g., step 1704) or process 1770 (e.g., step 1710). Process 1770 is an illustrative process performed when no event has been detected (e.g., normal operation). Process 1750 is an illustrative process performed in response to an event being detected (e.g., a fault requiring auto-braking).

Step 1704 includes the control circuitry determining whether to short phase j. In some embodiments, step 1704 is repeated for all phases of a multiphase electromagnetic machine. In some embodiments, control circuitry decides whether to short phase j based on a shorting waveform. For example, a shorting waveform may include a series of binary values and, depending on whether the values are 0 or 1, the control circuitry may determine whether to short phase j or not.

Step 1706 includes the control circuitry causing a shorting process to occur via a power electronics system. In some embodiments, the control circuitry transmits a control signal to the power electronics system to short phase j. Step 1706 may include, for example, the control circuitry sending a control signal to the power electronics system for switching suitable contactors to short phase j, the control circuitry sending a control signal to the power electronics system for switching suitable transistors to short phase j, performing a measurement indicative of current in phase j, performing a measurement indicative of voltage in phase j, performing a measurement indicative of magnetic flux in phase I, or any suitable combination thereof. In some embodiments, the control circuitry maintains shorting process 1706 for a predetermined period of time, before returning to step 1704. In some embodiments, the control circuitry may repeat steps 1704 and 1706 sequentially (e.g., in a control loop) until the control circuitry determines not to short phase j. The power electronics system is configured to receive the control signal, which may be in the form of a digital signal (e.g., a binary zero or one, a PWM signal, a pulse signal), a message (e.g., a UDP or TCP message transmitted over ethernet), an analog signal (e.g., an analog voltage or current signal), any other suitable signal, modulation thereof, or any combination thereof.

Step 1708 includes the control circuitry causing a braking process to occur via the power electronics system. When the control circuitry decides at step 1704 to not short phase j, a desired phase current may be determined, and a control signal indicative of the desired phase current may be transmitted to the power electronics system. In response, the power electronics system may apply a current to phase j, for example, causing braking of a translator by applying an electromagnetic force on the translator in a direction opposite to the direction of motion of the translator. The braking process includes applying current to a phase such that the product of current and phase voltage (e.g., or PWM command) is negative. The magnitude of the applied current can be any suitable value including, for example, a maximum absolute value, a nominal value, a value determined in real time based on other operating parameters. In an illustrative example, the magnitude of the current may be determined as a maximum safe value in view of the power electronics system's capabilities, a maximum current rating of a component or material, or a maximum current value to keep the resulting electromagnetic force within a threshold.

In some embodiments, the time scale for performing step 1706 and step 1708 is dependent on the time scale of any changes in sign of the back emf in the phase. For example, the loop of step 1704 to step 1706 to step 1704 may be performed on a time scale much smaller than a characteristic time for the back emf to switch sign in the phase winding. Accordingly, this may help reduce the time during which step 1708 is not occurring (e.g., no braking is occurring), while not risking the back emf polarity changing. Additionally, in some circumstances it is preferred to perform step 1708 for a relatively longer time than step 1706 (e.g., to accomplish more braking), but not so long as a change in sign of back emf occurs.

Step 1710 includes the control circuitry determining whether to short phase j, under circumstances where no event has been detected. In some embodiments, step 1710 is repeated for all phases of a multiphase electromagnetic machine. In some embodiments, control circuitry decides whether to short phase j based on a shorting waveform. For example, a shorting waveform may include a series of binary values and depending, on whether the values are 0 or 1, the control circuitry may determine whether to short phase j or not. In some embodiments, the control circuitry performs step 1710 less frequently than step 1704 when an event has been detected, because during normal operation it may not be preferred to short the phase periodically. In some embodiments, the control circuitry need not perform step 1710, and rather determines to short phase j only when an event has been detected (e.g., at step 1704).

Step 1712 includes the control circuitry causing a shorting process to occur via a power electronics system. In some embodiments, the control circuitry transmits a control signal to the power electronics system to short phase j. Step 1712 may include, for example, the control circuitry sending a control signal to the power electronics system for switching suitable contactors to short phase j, the control circuitry sending a control signal to the power electronics system for switching suitable transistors to short phase j, performing a measurement indicative of current in phase j, performing a measurement indicative of voltage in phase j, performing a measurement indicative of magnetic flux in phase I, or any suitable combination thereof. In some embodiments, the control circuitry maintains shorting process 1712 for a predetermined period of time, before returning to step 1704. In some embodiments, the control circuitry may repeat steps 1710 and 1712 sequentially (e.g., in a control loop) until the control circuitry determines not to short phase j. The power electronics system is configured to receive the control signal, which may be in the form of a digital signal (e.g., a binary zero or one, a PWM signal, a pulse signal), a message (e.g., a UDP or TCP message transmitted over ethernet), an analog signal (e.g., an analog voltage or current signal), any other suitable signal, modulation thereof, or any combination thereof.

Step 1714 includes the control circuitry determining a desired current to be applied to phase j. The control circuitry may determine the desired current for phase j using any suitable technique, in accordance with the present disclosure. For example, the control circuitry may determine a desired current for phase j using any of techniques disclosed in commonly assigned U.S. Pat. No. 8,344,669 filed on Apr. 2, 2012, which is hereby incorporated by reference herein in its entirety. In a further example, step 1714 may include the control circuitry determining a desired current to be applied to phase j based on sensor input, a control scheme (e.g., feedback control using a PID controller), a mathematical model, a neural network, a lookup table (e.g., based on translator position and speed, as well as a tabulated force constant), any other suitable computation technique, or any suitable combination thereof. Sensor input may include signals received from an encoder (e.g., an optical encoder, or a magnetic encoder), a piezoelectric sensor (e.g., a force transducer or high bandwidth pressure sensor), a current transducer, a voltage sensor, any other suitable sensed value, or any combination thereof.

In an illustrate example of step 1714, the control circuitry may determine a least norm solution of desired phase currents, in real time, based on force constants (e.g., which depend on position information), a desired force, and any constraints (e.g., currents must sum to zero, or each current must be within a predetermined range). The control system may select an objective function (e.g., that the sequence of products of each phase current and corresponding force constant for a motor sum to a desired force, as shown by Eq. 5), and a constraint (e.g., the currents sum to zero). If all of the phase resistances ohmic $R_j$ are the same, a set of current values may be determined using Eq. 6:

$$F_{DES} = \Sigma_{j=1}^{N} k_j(x, \Phi_T) i_j \qquad \text{Equation 5:}$$

$$i = k(k^T k)^{-1} F \qquad \text{Equation 6:}$$

in which i is a column vector of the set of current values $i_j$ of N phases, k is column vector of the force constants $k_j$ (x, $\Phi_T$) of the N phases (e.g., based on position x and flux $\Phi_T$), and F is a 1×1 array (i.e., a scalar) having a value equal to the desired electromotive force $F_{des}$ between the stator and the translator. This particular selection of objective function and constraint allows a least norm solution. If the phase resistances are not equal, for example, the control system may determine a weighted least norm solution (e.g., by using a weighted current variable, and then transforming to current). If, additionally, the sum of the currents is constrained to zero, for example, Eq. 6 may still be used, although the arrays k and F are defined differently. For example, k is a N×2 array with the first column all ones, and the second column the set of force constants. Accordingly, F would be a 2×1 array, with the top row having a value of zero, and the bottom row having a value $F_{des}$. A least norm solution, or weighted least norm solution, may be achieved, for example, when a suitable quadratic objective function and affine equality constraint(s) are used.

In some embodiments, the control circuitry determines a desired trajectory of the translator (e.g., having apex positions to define a stroke). The desired electromagnetic force, and phase currents derived thereof, may be determined based on a desired position, a desired velocity, a desired acceleration, the desired trajectory, any other suitable aspects of operation, or any combination thereof. During braking (e.g., step 1708), the control circuitry may cause the translator to achieve one or more modified apex positions (e.g., closer to a mid-stroke position than a first apex position), to reduce the trajectory (e.g., stroke length, peak velocity, or both).

Step 1716 includes the control circuitry causing the power electronics system to apply current for phase j based on the determined desired current of step 1714. In some embodiments, the control circuitry generates a control signal based on, and indicative of, the determined desired current for phase j from step 1714. For example, the control signal may include a digital signal (e.g., a binary zero or one, a PWM signal, a pulse signal), a message (e.g., a UDP or TCP message transmitted over ethernet), an analog signal (e.g., an analog voltage or current signal), any other suitable signal, modulation thereof, or any combination thereof. In some embodiments, the control signal is transmitted to the power electronics system, causing a current to be applied to phase j. For example, the control circuitry may transmit a PWM signal to the power electronics system, which may in response apply a current to phase j. The applied current may be close in value to the desired current, or may differ from the desired current depending on, for example, how well the system is modeled, what perturbations are present, the accuracy of one or more sensors, or any other suitable factors which may affect the application of current.

In some embodiments, after the control circuitry causes the current to be applied to phase j, the control circuitry may repeat step 1702 as shown in FIG. 17. Accordingly, the control circuitry can periodically check whether an event has occurred, while still performing process 1770 repeatedly during, for example, normal operation. In some embodiments, the control circuitry proceeds to step 1710 after completing step 1716 (e.g., to maintain normal operation), only returning to step 1702 at a less frequent periodicity (e.g., every N time steps where N is an integer, once per stroke, or other suitable schedule).

It is contemplated that the steps or descriptions of FIG. 17 may be used with any other embodiments of this disclosure. In addition, the steps and descriptions described in relation to FIG. 17 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the systems and controllers discussed in relation to FIGS. 12-14 could be used, alone or in concert, to perform one or more of the steps in FIG. 17.

Figure 18:
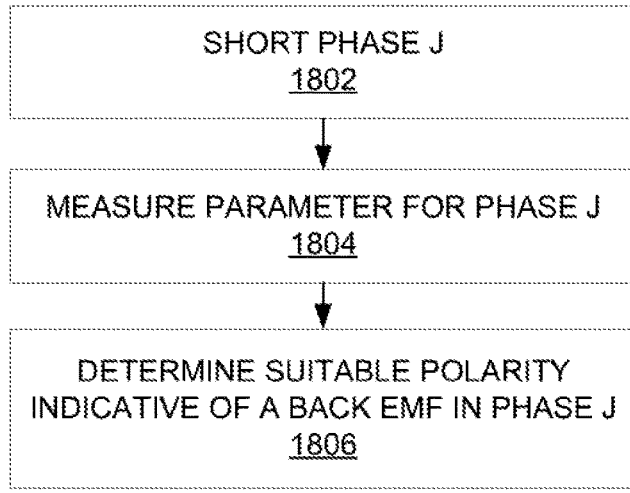
FIG. 18 shows a flowchart of an illustrative process for managing shorting one or more phases of a multiphase electromagnetic machine, in accordance with some embodiments of the present disclosure.

FIG. 18 shows a flowchart of illustrative process 1800 for managing shorting one or more phases of a multiphase electromagnetic machine, in accordance with some embodiments of the present disclosure.

Step 1802 includes the control circuitry causing the power electronics system to short phase j. Step 1804 includes the control circuitry measuring one or more parameters for phase j, while shorted. Step 1806 includes the control circuitry determining a suitable polarity indicative of a back emf in phase j. The performance of steps 1802, 1804, and 1806 by the control circuitry allows the sign of current to be applied to a phase J consistent with braking a translator. This is important for robust auto-braking, because current of the opposite sign (i.e., in which Vphase and the phase current have the same sign) results in a force in the direction of motion of the translator, thus adding energy to the translator via work, and possibly creating a dangerous, or more dangerous, situation.

In an illustrative example, referencing FIG. 12, step 1802 may include motor controller 1260 causing power electronics system 1230 to short phase lead 1242 and phase lead 1244 together. The short may be accomplished by power electronics system 1230 actuating one or more contactors that electrically short phase leads 1242 and 1244. In some embodiments, power electronics system 1230 includes a shorting circuit, which includes, for example, one or more sensors such as a voltage sensor, one or more passive circuit elements (e.g., a resistor, a capacitor, an inductor), one or more active circuit elements (e.g., a voltage source, a filter, a diode, a fuse), any other suitable components, or any suitable combination thereof.

It is contemplated that the steps or descriptions of FIG. 18 may be used with any other embodiments of this disclosure. In addition, the steps and descriptions described in relation to FIG. 18 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the systems and controllers discussed in relation to FIGS. 12-14 could be used, alone or in concert, to perform one or more of the steps in FIG. 18.

Figure 19:
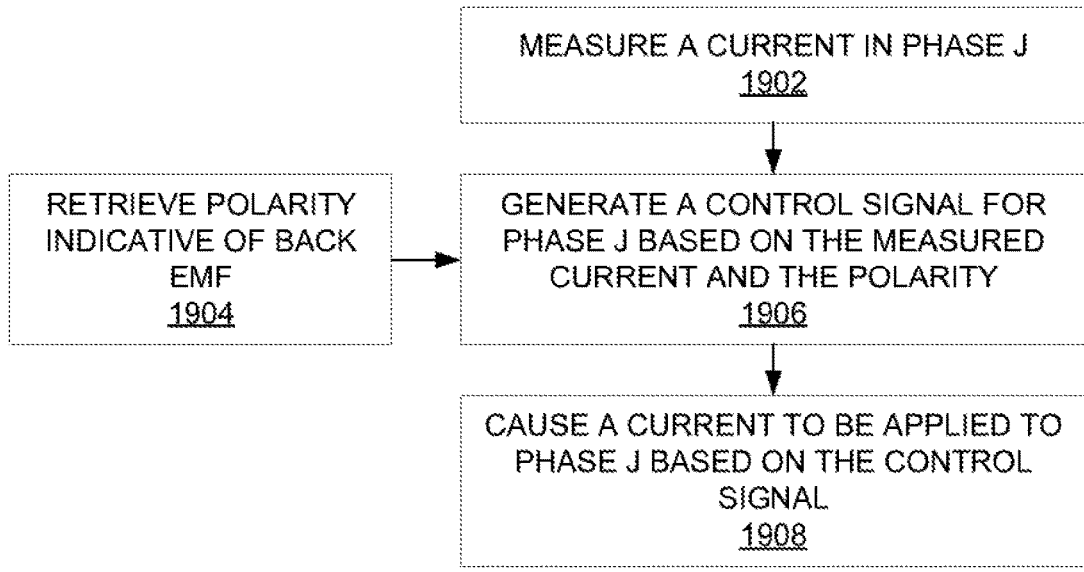
FIG. 19 shows a flowchart of an illustrative process for managing braking a translator of a multiphase electromagnetic machine, in accordance with some embodiments of the present disclosure.

FIG. 19 shows a flowchart of illustrative process 1900 for managing braking a translator of a multiphase electromagnetic machine, in accordance with some embodiments of the present disclosure.

Step 1902 includes control circuitry measuring a current in phase j. In some embodiments, the control circuitry continuously receives a signal from a current sensor, and samples the signal at some suitable sampling rate to retrieve discretized values. Accordingly, in some embodiments, the control circuitry measures current in phase j at a fixed sample rate. The control circuitry may determine a current in phase j based on a calibration (e.g., relating a signal voltage to a current value), a look-up table, an algorithm, any other suitable technique, or any combination thereof. In some embodiments, the control circuitry provides power to a current sensor, and samples a signal from the sensor indicative of current (e.g., a 4-20 mA loop current sensor output powered at a constant DC voltage). In some embodiments, at step 1902, the control circuitry need not measure current (i.e., in units of amps or milliamps), and may measure a signal proportional to current (e.g., voltage output of a current sensor not converted into units of current).

Step 1904 includes control circuitry retrieving a polarity indicative of back emf in phase j. The polarity information may be provided by, for example, stored information determined as a result of process 1800 of FIG. 18. For example, the control circuitry may short phase j to determine a polarity of back emf, store the polarity information, and then retrieve the polarity information at step 1904 (e.g., at a later time than the shorting).

Step 1906 includes control circuitry generating a control signal for phase j based on the measured current of step 1902 and the retrieved polarity of step 1904. In some embodiments, the measured current of step 1902 is used by the control circuitry as part of a feedback loop to determine a current command, a control signal, or both. In some embodiments, the polarity of step 1904 is used by the control circuitry to determine the polarity of the desired current. In an illustrative example, controller 2200 is configured to generate a control signal based on a measured current and a determined polarity indicative of back emf.

Step 1908 includes control circuitry causing a current to be applied to phase j based on the control signal. In some embodiments, the control circuitry transmits the generated control signal of step 1906 to a power electronics system, which applies current to phase j based on the control signal. In an illustrative example, the control circuitry may generate a PWM signal, and transmit the PWM signal to the power electronics system. The power electronics system may process the PWM signal (e.g., level-shift, amplify, isolate, filter, or otherwise modify), and apply a corresponding current to phase j. To further illustrate, a PWM signal or processed signal derived thereof, may be used to directly activate a switch, and may be coupled to a gate or other control terminal of the switch) which couples a bus to a phase lead.

It is contemplated that the steps or descriptions of FIG. 19 may be used with any other embodiments of this disclosure. In addition, the steps and descriptions described in relation to FIG. 19 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the systems and controllers discussed herein may be used, alone or in concert, to perform one or more of the steps in FIG. 19.

In some embodiments, the control circuitry performs a braking process which includes synchronizing two opposing translators. For example, considering an opposed free-piston linear generator having two translators, it may be desired to synchronize the two translators during braking to maintain a predictable and safe shutdown (e.g., avoiding damage of components, or unstable operation). Accordingly, the control circuitry may use position information of the translators to provide at least some synchronization of translators. The following discussion, in the context of FIGS. 20-23, describes the braking process taking into account position information, in accordance with some embodiments. The techniques of processes 1700, 1800, and 1900 may be used in accordance with auto-braking with synchronization. In some embodiments, the techniques may be applied to a high-phase count configuration, where each individual phase (i.e., iron core and corresponding winding) is controlled independently.

Figure 20:
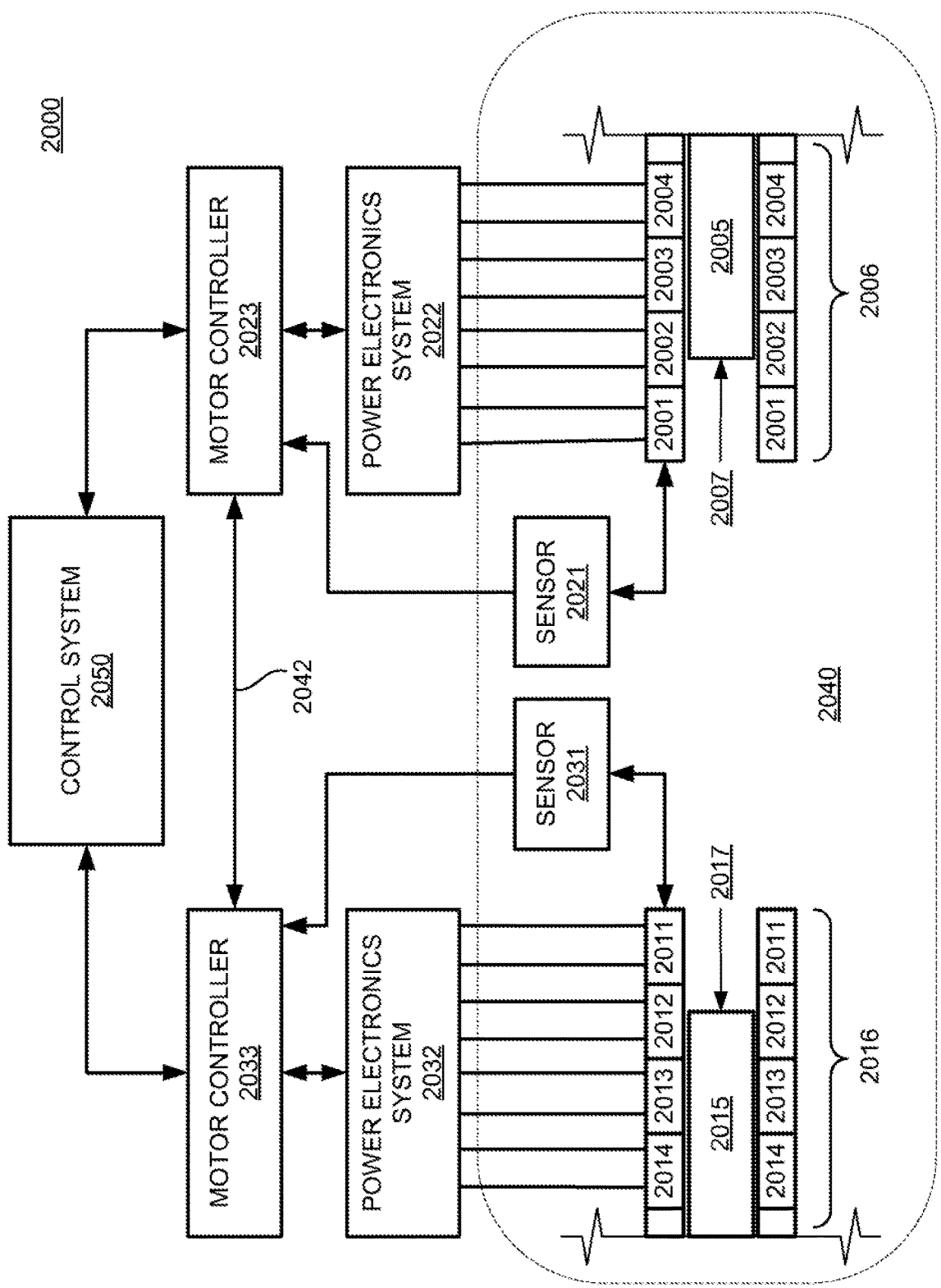
FIG. 20 shows an illustrative system, including a multiphase electromagnetic machine, in accordance with some embodiments of the present disclosure.

FIG. 20 shows illustrative system 2000, including a multiphase electromagnetic machine 2040 having two translators 2015 and 2005, in accordance with some embodiments of the present disclosure. System 2000 includes control system 2050, motor controllers 2023 and 2033, power electronics systems 2022 and 2032, optional sensors 2031 and 2021, and multiphase machines 2006 and 2016. Multiphase machine 2006 includes, for example, translator 2005, and phases 2001, 2002, 2003, and 2004. Multiphase machine 2016 includes, for example, translator 2015, and phases 2011, 2012, 2013, and 2014.

Translator 2005 is configured to translate along axis 2007, and translator 115 is configured to translate along axis 2017. Under normal operating circumstances, translators 2005 and 2015 move nominally in opposed fashion. Although there may be some perturbation, the trajectories of translators 2005 and 2015 are substantially similar. During a stroke (i.e., motion of a translator from one apex to another apex), magnets of a translator (not shown in FIG. 20) pass phases of the corresponding stator. While the magnets are aligned at least partially with a phase, an electromagnetic interaction may occur between the translator and the phase. For example, referencing FIG. 20, translator 2015 may electromagnetically interact with phases 2012-2014, but not interact significantly with phase 2011. As translator 2015 moves in-board (i.e., opposite the illustrated direction of axis 2017) from its illustrated position in FIG. 20, the magnets will eventually be near phase 2011, and an electromagnetic interaction may occur. Accordingly, the interaction between a phase and a translator depends on the position of the translator relative to the phase.

System 2000 optionally includes sensors 2021 and 2031, which may be configured to sense position information of respective translators 2005 and 2015 relative to respective phases 2001-2004 and 2011-2014. In some embodiments, sensors 2021 and 2031 are not included, not used for braking, or may otherwise be omitted from system 2000. For example, sensors 2021 and 2031 may include an encoder, a search coil, a proximity sensor, any other suitable sensor for sensing position information, or any combination thereof. Position information includes, for example, a position (e.g., a relative or absolute position), a velocity, an acceleration, a binary value indicative of a relative position (e.g., past a reference location), an index (e.g., which phase a terminal end of the translator is aligned with), information which may be used to determine position (e.g., sinusoidal encoder signals), any other suitable information indicative of position, or any combination thereof. Sensors 2021 and 2031 may be coupled to respective motor controllers 2023 and 2033, control system 2050, or a combination thereof.

Power electronics systems 2022 and 2032 are configured to apply current to phases 2001-2004 and 2011-2014, respectively (e.g., by performing process 1770 of FIG. 17). In some embodiments, power electronics systems 2022 and 2032 each include switches (e.g., IGBTs, MOSFETS or any other suitable switches), diodes, brake resistors, control signal interface boards (e.g., for managing PWM signals), current sensors, any other suitable components, or any combination thereof. In some embodiments, power electronics systems 2022 and 2032 are configured to short phases of respective multiphase machines 2006 and 2016 (e.g., perform shorting process 1800 of FIG. 18). In some embodiments, power electronics systems 2022 and 2032 are configured to measure phase voltages in respective phases 2001-2004 and 2011-2014. For example, in some embodiments, power electronics systems 2022 and 2032 are configured to measure phase voltages in respective phases when no current is applied (e.g., the phases are not coupled to a DC bus or a neutral).

In some embodiments, control system 2050 is configured to, for example, process signals (e.g., from sensors or subsystems), generate control signals (e.g., to transmit to subsystems), execute computer readable instructions for controlling multiphase machines 2006 and 2016. In some embodiments, control system 2050 may be distributed, partitioned, combined with other systems, or otherwise modified from system 2000 shown in FIG. 20. In some embodiments, control system 2050 provides a desired current, a desired force, an operating state, a command, or other suitable information to motor controllers 2023 and 2033, which generate respective control signals that are transmitted to respective power electronics systems 2022 an 2032. In some embodiments, for example, control system 2050 provides desired current values for each phase to the corresponding power electronics system.

In some embodiments, motor controllers 2023 and 2033 are configured to provide control signals to respective power electronics systems 2022 and 2032. In some embodiments, motor controllers 2023 and 2033 are configured to receive signals from respective sensors 2021 and 2031. In some embodiments, each of motor controllers 2023 and 2033 is configured to receive signals from both sensors 2021 and 2031.

In some embodiments, communication link 2042 ("comm link 2042") includes a path for communication between motor controllers 2023 and 2033. Comm link 2042 may be used to allow communication among more than one translator-stator machine (e.g., a multiphase machine having two translators). Further, in some embodiments, motor controllers 2023 and 2033 include a common communication bus internally, in which information for each phase of the respective motor is transmitted. Comm link 2042 may include, for example, a common bus, to which all phase controllers are coupled and are configured to pull up, pull down, or otherwise affect the common bus to transmit information to each other. Accordingly, in some embodiments, comm link 2042 allows for simple (e.g., 1 or 2 wires, with information in the form of pulses, edges or levels) yet fast and reliable communication among motor controllers, phase controllers thereof, or both. In some embodiments, comm link 2042 is capable of transmitting signals having more information, and relatively more complex features (e.g., modulated signals, digital communication, network communication).

In some embodiments, a position estimator is distributed across phases, and communication is established among control circuitry coupled to each corresponding phase of each opposed LEMs. Accordingly, any suitable technique disclosed herein can be used to maintain synchronization of the opposed multiphase machines while braking. A dedicated communication link (e.g., comm link 2042 of FIG. 20) may be included for this function, among the phase controllers. The communications link need not be capable of transmitting complex signals. For example, the signal may include a simple edge signal (a "tick") corresponding to the detection of the first magnet of the translator reaching the corresponding tooth of each phase. A simple trigger signal, from each phase controller, may be sent to the corresponding phase controller of the opposed motor, using any available electrical or optical technique. The signals of opposed phases can eventually be compared (e.g., using OR logic), for example, to limit the number of conductors. In some such embodiments, while auto-braking, the translator that appears to be faster, or leading (i.e. the one that senses a magnet first on the phase of interest), immediately starts braking, while the opposed phase controller waits for a predetermined time before engaging the auto-brake mechanism (e.g., process 1900 of FIG. 19). Accordingly, the opposed phase controller causes a corresponding power electronics system to extract relatively less energy from the "late" or "slow" translator (e.g., until both translators are synchronized again). Accordingly, control circuitry (e.g., phase controllers or motor controllers) may maintain synchronization during "auto-brake," even if a central controller (e.g., control system 350 of FIG. 3 or control system 2050 of FIG. 20) stops operating or is otherwise unavailable or unreliable. In some embodiments, an idle time is determined (e.g., from computation) as a function of the measured time between the two ticks, to ensure convergence. In some embodiments, a simple gain is used, although any suitable processing may be used, having any suitable complexity, in accordance with the present disclosure. In some embodiments, translator position, velocity, or other position information is used to optimize the synchronization performance of the control circuitry.

Figure 21:
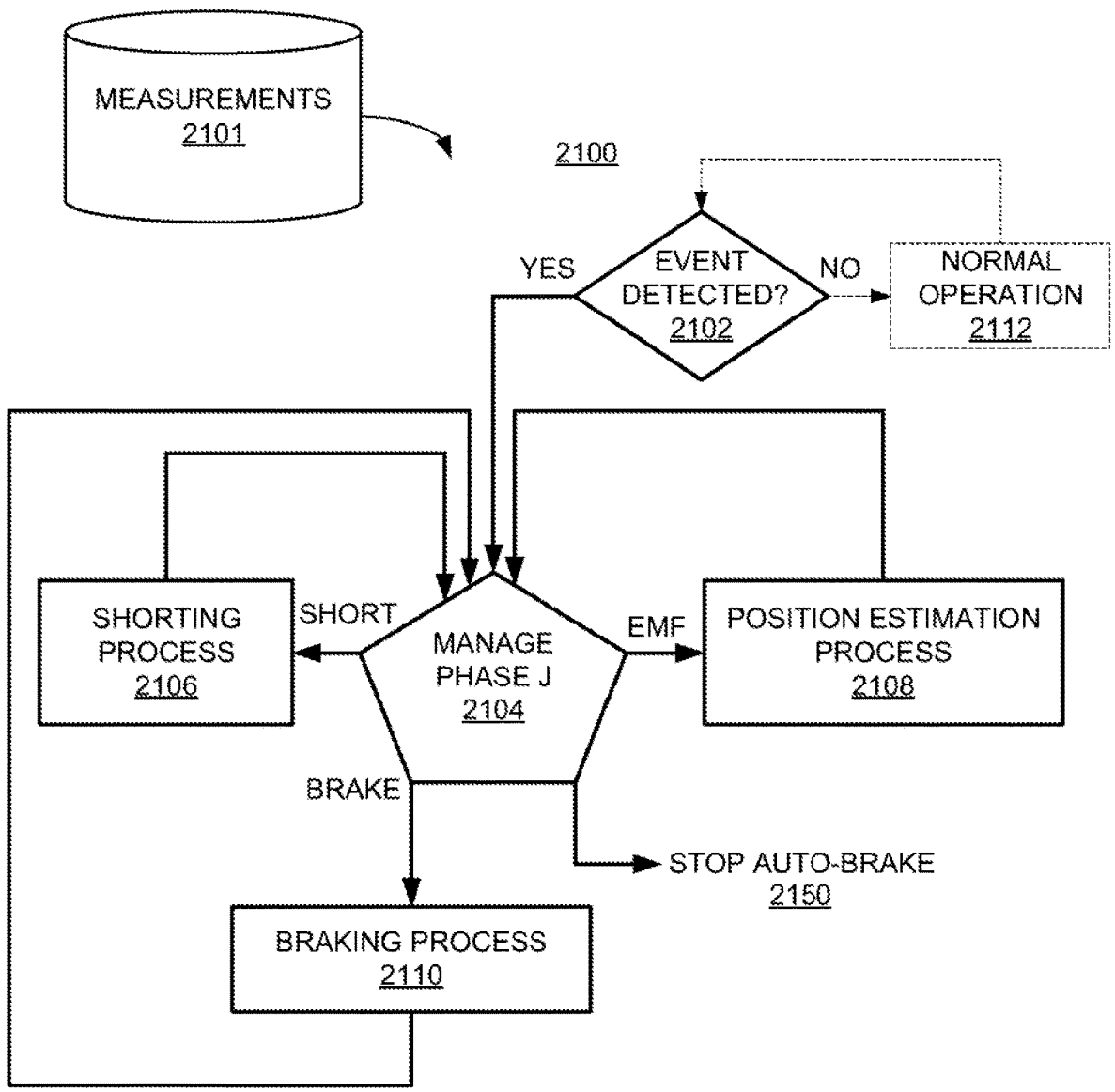
FIG. 21 shows a flowchart of an illustrative process for managing braking a translator of a multiphase electromagnetic machine based on position information of the translator, in accordance with some embodiments of the present disclosure.

FIG. 21 shows a flowchart of illustrative process 2100 for managing braking a translator of a multiphase electromagnetic machine based on position information of the translator, in accordance with some embodiments of the present disclosure. Control circuitry may perform process 2100, or any step thereof, to slow or stop a translator.

Step 2102 includes the control circuitry detecting an event, or otherwise determining an event has occurred. In some embodiments, the event may include a fault event or a failure event. For example, an event may include a loss of communication between subsystems of a control system (e.g., control system 350 of FIG. 3). In a further example, an event may include an unintended short of a phase in a multiphase electromagnetic machine (e.g., multiphase electromagnetic machine 340 of FIG. 3). In a further example, an event may include a loss in signal from a sensor as received by a control system (e.g., an encoder, a phase current sensor, or a DC bus voltage sensor). In a further example, an event may include a mode change to "stop" from a control system, during which braking is desired. In some embodiments, control circuitry may determine an event has occurred by performing a set of diagnostics (e.g., checking that signals are refreshing, checking that sensors are providing signals, checking that all communications between systems and subsystems are occurring).

Depending upon whether the control circuitry has detected an event at step 2102, the control circuitry may proceed to either step 2104, or process 2112. Process 2112 is an illustrative process performed when no event has been detected (e.g., normal operation).

Step 2104 includes the control circuitry determining how to manage phase j to achieve braking in response to a detected event. In some embodiments, managing phase j includes determining whether to perform shorting process 2106, perform position estimation process 2108, perform braking process 2110, or stop auto-braking 2150. In some embodiments, step 2104 is repeated for all phases of a multiphase electromagnetic machine. In some embodiments, the control circuitry may execute a predetermined schedule of performing shorting process 2106, position estimation process 2108, braking process 2110, and performing stopping auto-brake 2150. The predetermined schedule may include time durations and intervals for performing the processes.

For example, at step 2104, the control circuitry may perform position estimation process 2108 to estimate position, followed by shorting process 2106 to determine a polarity indicative of back emf in phase j, and then perform braking process 2110 to extract energy from the corresponding translator. In a further example, at step 2104, the control circuitry may repeat process 2108 until the position has been estimated, which may include determining phase voltage at no current flow for each phase to estimate position. When the position is estimated, the control circuitry may then perform shorting process 2106 repeatedly to determine the polarity of each phase that may interact electromagnetically with the translator (e.g., the set of phases that j includes). Finally, the control circuitry may perform braking process 2110 based on the polarity, or polarities, determined at step 2106. The control circuitry may then repeat step 2108, step 2106, or both, at some interval to track the translator(s) position and back emf while braking. Because phase j cannot simultaneously 1) be shorted (e.g., phase leads coupled together), 2) have no current flow (e.g., phase leads isolated from one another), and 3) have current applied (e.g., an applied Vphase from a DC bus which causes current flow), processes 2106, 2108, and 2110 are not performed by the control circuitry at the same instant.

In some embodiments, shorting process 2106 includes any or all suitable steps of process 1706 of FIG. 17, or process 1800 of FIG. 18.

In some embodiments, braking process 2106 includes any or all suitable steps of process 1708 of FIG. 17, or process 1900 of FIG. 19.

Figure 22:
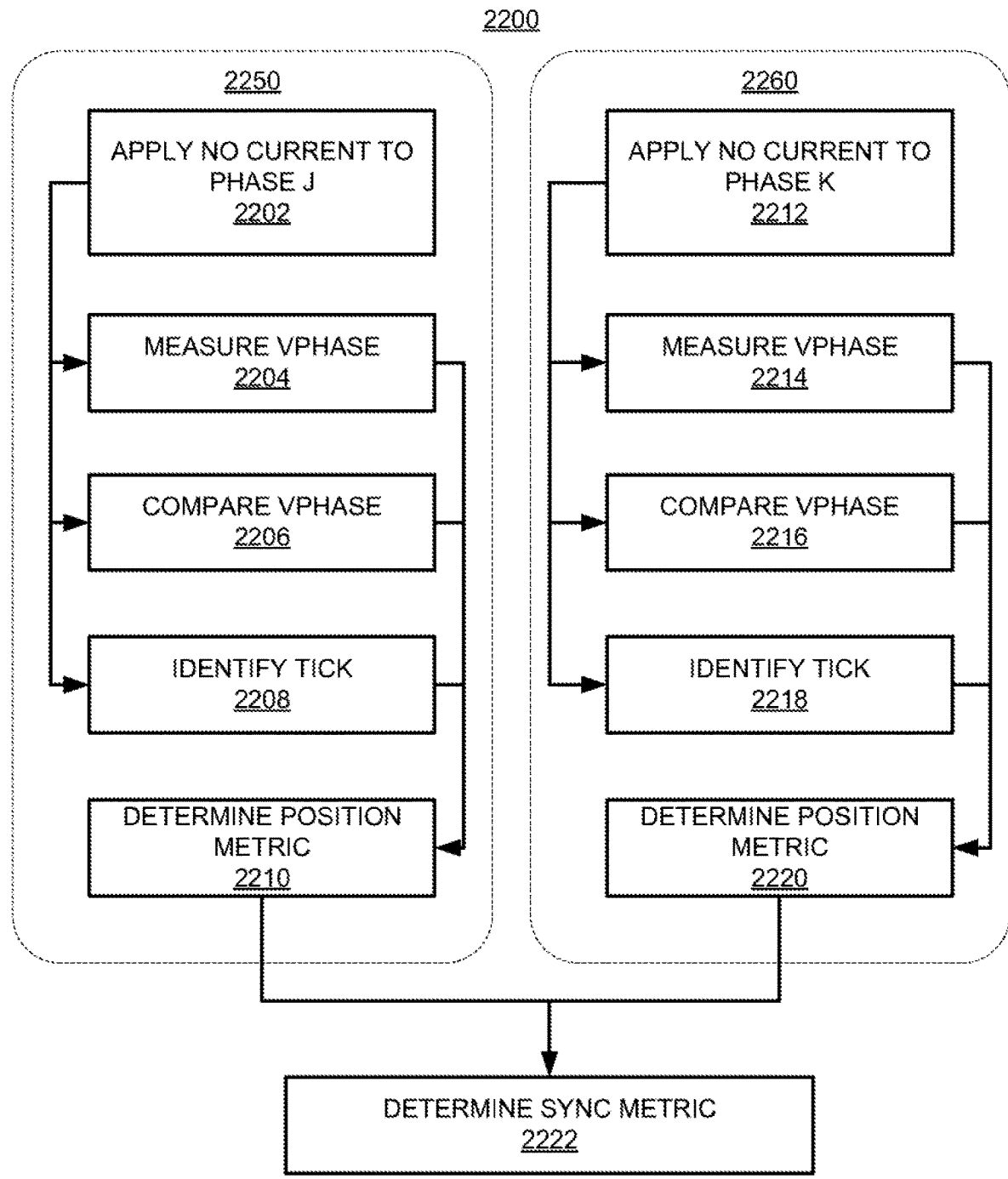
FIG. 22 shows a flowchart of an illustrative process for position estimation, in accordance with some embodiments of the present disclosure.

Position estimation process 2108 is further described in the context of process 2200 of FIG. 22. FIG. 22 shows a flowchart of illustrative process 2200 for position estimation, in accordance with some embodiments of the present disclosure.

To accomplish synchronization between two translators, position information is needed for each translator to determine the relative lead/lag, and which requires more or less braking. Accordingly, process 2250 includes position estimation for one translator, and process 2260 includes position estimation for the other translator. Also, processes 2250 and 2260 may be, but need not be, similar or identical. The following description will be framed in terms of process 2250 (i.e., for phase j of one translator), and it will be understood that the discussion applies to process 2260 (i.e., for phase k of the other translator).

Step 2202 includes the control circuitry causing no current to flow in phase j. In some embodiments, step 2202 includes the control circuitry not generating a control signal. In some embodiments, step 2202 includes the control circuitry generating a null control signal (e.g., desired current of zero amps, or a PWM with zero duty cycle, other suitable signal). The control circuitry may optionally proceed to step 2204, 2206, 2208, or a combination thereof depending on the technique employed. For example, in some embodiments, the control circuitry measures Vphase at step 2204, and then proceeds to step 2210. In a further example, in some embodiments, the control circuitry compares Vphase to a reference at step 2206, and then proceeds to step 2210. In a further example, in some embodiments, the control circuitry identifies a tick at step 2208, and then proceeds to step 2210. In a further example, the control circuitry measures Vphase at step 2204, compares it to a reference at step 2206, and then identifies a tick in the comparison at step 2208 to determine a position metric.

In some embodiments, the control circuitry need not include an absolute position estimator for each phase. In some embodiments, the control circuitry need not include a sensor for each phase controller, of each respective motor. Accordingly, in some embodiments, a "tick" signal provides sufficient information to auto-brake with synchronization.

Step 2204 includes the control circuitry measuring, or otherwise determining an indication of, Vphase in phase j. In some embodiments, a voltage transducer is coupled across phase leads of phase j and provides a signal indicative of Vphase to the control circuitry, which is configured to receive the signal. In some embodiments, the control circuitry uses a sampled voltage value from the sensor to determine a value indicative of Vphase. In some embodiments, the control circuitry uses a sampled voltage value from the sensor, modified by a calibration, to determine a value of Vphase (i.e., in relevant units, sign, and magnitude). In some embodiments, the control circuitry performs signal processing on the signal received from the sensor, to generate a processed signal for determining Vphase, or an indication thereof.

Step 2206 includes the control circuitry comparing Vphase in phase j, or an indication thereof, to a reference signal. In some embodiments, a phase controller includes a comparator circuit configured to compare Vphase of phase j to a reference voltage. For example, the comparator circuit may output one of two binary values indicating if Vphase is greater than, or less than, the reference voltage. In some embodiments, a phase controller may compare a signal indicative to Vphase to a reference in software as a mathematical operation, outputting a difference, a binary value, or other suitable output. In some embodiments, the control circuitry first performs step 2204 to determine Vphase, and then compares the Vphase value to a reference value (e.g., a threshold).

Step 2208 includes the control circuitry identifying a tick in a Vphase signal, or signal derived thereof. In some embodiments, the "tick" is generated by a voltage comparator, configured to compare the phase voltage to a reference value when no current is flowing in phase j. Under the no current condition, the phase voltage equals, or may otherwise be approximated by, the back emf (e.g., as shown by Equation 4). As a first magnet of the translator (e.g., a magnet at either end of a magnet array) axially passes a tooth of phase j, it may be detected when the phase voltage reaches a given threshold. The control circuitry may identify the threshold crossing and accordingly may estimate a translator position. In some embodiments, the voltage threshold level may be adjustable, for example, to achieve improved position precision. For example, a region or point of high $dV_{phase}/dx$ (i.e., phase voltage gradient in terms of translator position) may indicate that a tooth of a phase and a magnet are transitioning between overlapping and non-overlapping, or vice versa. In some embodiments, a voltage comparator may be implemented using a transistor, an operational amplifier, an integrated circuit, or any other suitable comparator.

Step 2210 includes the control circuitry determining a position metric of the translator. In some embodiments, the control circuitry repeats step 1302 and any suitable combination of steps 2204-2208 to determine the position metric. The position metric may include a phase index (e.g., which phase j exhibits a tick), a spatial position estimate (e.g., an axial position or position range), a timestamp of when a magnet overlapped a phase j, any other suitable position information, or any combination thereof.

Step 2220 includes the control circuitry determining a position metric of the other translator. In some embodiments, the control circuitry repeats step 2212 and any suitable combination of steps 2214-2218 to determine the position metric. The position metric may include a phase index (e.g., which phase k exhibits a tick), a spatial position estimate (e.g., an axial position or position range), a timestamp of when a magnet overlapped a phase j, any other suitable position information, or any combination thereof. In some embodiments, the control circuitry may determine a position of a translator, or portion thereof (e.g., a leading edge of a magnet), at step 2220.

Step 2222 may include the control circuitry determining a synchronization metric based on the position metrics determined at steps 2210 and 2220 for the two respective translators. In some embodiments, the control circuitry may compare the position metrics for the two translators to determine which translator is moving more quickly, moving more slowly, leading in position, lagging in position, or a combination thereof. In some embodiments, the control circuitry may compare timestamps for when respective first magnets of the two translators overlapped opposite phases to determine which translator is leading or lagging. A synchronization metric may include, for example, a time (e.g., time at which a tick for a phase occurs), an indexed time (e.g., "first" or "last"), a spatial position (e.g., 0.02 meters), an indexed position (e.g., "at or near phase j"), any other suitable metric, or any combination thereof.

In some embodiments, a communication protocol is used to communicate ticks among phase controllers. For example, in some embodiments, a single, multiplexed bus is used for all the "tick" signals from the phases. In a further example, a relatively simple and low-cost "bus" (e.g., which could just be a single wire) may be implemented on which every phase controller sends its tick by pulling the bus line up or down. Accordingly, this may help in limiting the number of conductors required between the two motor controllers corresponding to the two respective translators. For example, a "tick" signal may be sent only as an end magnet appears near, or begins to overlap with, a phase winding. Accordingly, at that time that phase should be the only phase exhibiting a tick, and the likelihood of any conflict on the single bus is reduced (e.g., also reducing signal delays on the bus).

Any suitable combination of auto-brake, and auto-brake with synchronization may be used, in accordance with the present disclosure. For example, when the first or last magnet on the magnet carrier (e.g., magnets on the ends axially of the magnet array) axially passing a phase is the detected event, it may be challenging, or impossible, to get a "tick" feature from the central phases (e.g., because they will likely not see a magnet/no-magnet transition). In some such circumstances, the central or middle phases may be used for "auto-brake" only (e.g., as described in the context of step 1708 of FIG. 17), without taking into account the position information.

In some embodiments, a "halt" signal is sent from one phase to its counterpart on the other multiphase electromagnetic machine, when its auto-brake is deactivated for reasons other than synchronization (e.g., a DC bus overvoltage, a dead MOSFET or IGBT, etc.). The phase would thus prevent its counterpart from braking whether or not the magnet carrier is present over the phase, thus actively helping prevent desynchronization.

In some embodiments, the detection of the magnet carrier is achieved by implementing a comparator circuit on the phase voltage. In some embodiments, the comparator is realized with a single transistor. For example, a star configuration may be used (e.g., comparators spanning a phase winding from the power electronics system to a neutral wye), provided the neutral is accessible on the motor (e.g., for a wye connected motor). In circumstances in which the motor neutral is not accessible, the neutral may be reconstructed as the average of all phase voltages.

Polarity Determination Based on PWM

Figure 23:
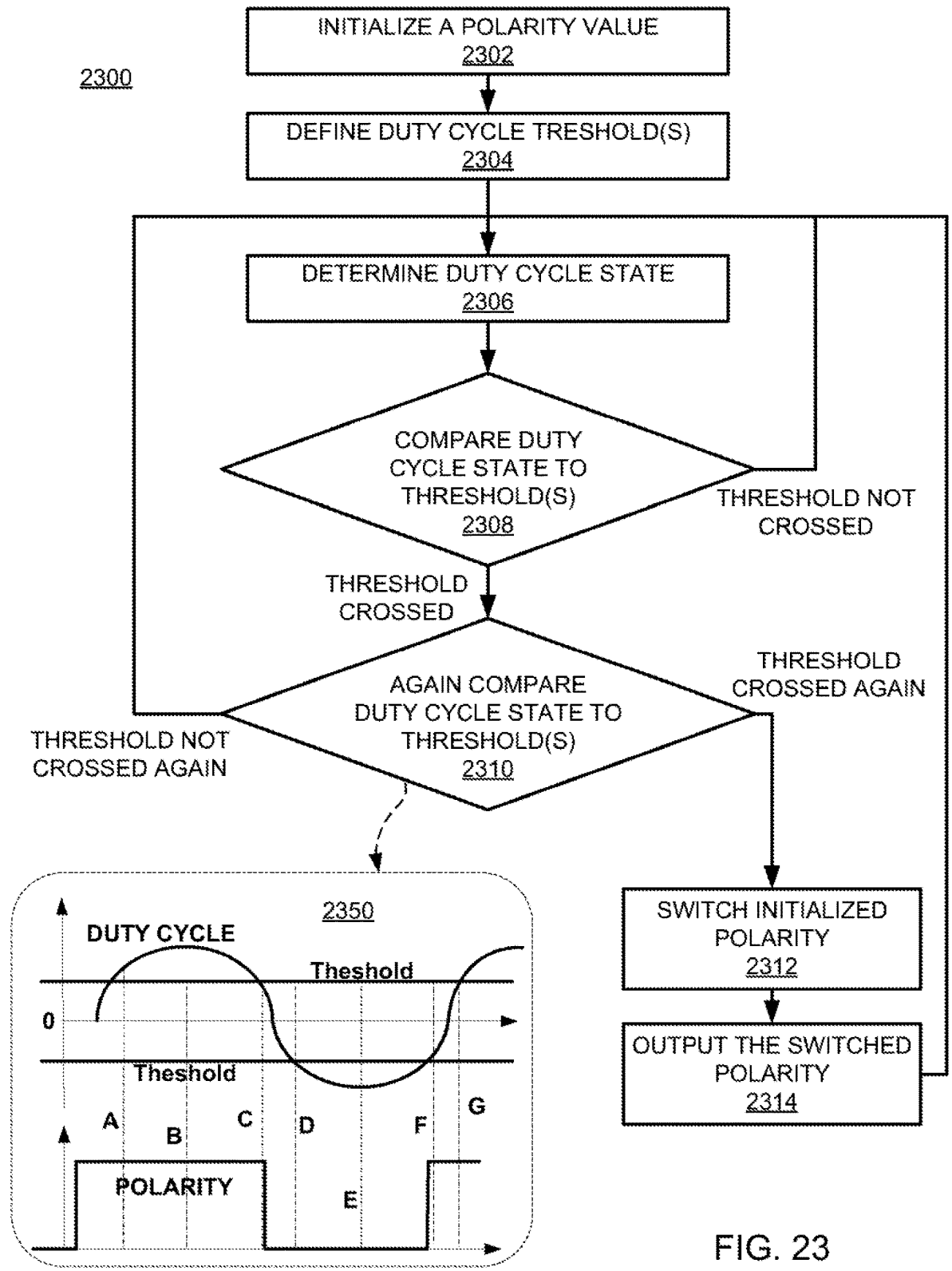
FIG. 23 shows a flowchart of an illustrative process for determining a polarity associated with a phase, in accordance with some embodiments of the present disclosure.

FIG. 23 shows a flowchart of illustrative process 2300 for determining a polarity associated with a phase, in accordance with some embodiments of the present disclosure. In some embodiments, a control system performs process 2300 in response to an event being detected. In some embodiments, the control system may perform process 2300 prior to an event being detected. While the description of process 2300 is provided in the context of a PWM duty cycle (e.g., a control signal for phase current), any suitable parameter (e.g., current, current derivative, magnetic flux, emf, phase voltage, or other parameter) or metric derived thereof, or combination thereof, may be used in accordance with the present disclosure.

Step 2302 includes initializing a polarity value. In some embodiments, the control system initializes the polarity based on a polarity during normal operation. For example, when an event is detected, the control system may use the last determined polarity, or determine the last polarity based on available information, to initialize the polarity during braking. In an illustrative example, a polarity may be one of two values (e.g., a binary state such as positive or negative).

Step 2304 includes defining one or more duty cycle thresholds. In some embodiments, a duty cycle threshold includes a predetermined value (e.g., a predetermined duty cycle value). In some embodiments, the duty cycle threshold may depend on an operating parameter. For example, the threshold may be based on peak current, peak translator velocity, power output, peak duty cycle, motor electrical frequency (e.g., a frequency of polarity changes), a time period between threshold crossings, any other suitable parameter, or any combination thereof. A duty cycle threshold may include any suitable numerical value, including zero.

Step 2306 includes determining a duty cycle state. In some embodiments, the control system may use the last duty cycle value as the duty cycle state. In some embodiments, the control system may use a filtered value (e.g., using an FIR or IIR filter) based on historical duty cycle values. The duty cycle state may include a desired duty cycle, an achieved duty cycle, an average duty cycle, a representative duty cycle (e.g., determined based on a model, algorithm or other suitable calculation), a duty cycle determined based on other available parameters, any other suitable duty cycle value, or any combination thereof.

Step 2308 includes comparing the duty cycle state to a duty cycle threshold of step 2304. In some embodiments, the threshold used depends on a property of the duty cycle state. For example, in some embodiments, the polarity of the threshold is matched to the polarity of the duty cycle state. In some embodiments, an absolute value of the duty cycle is compared to a threshold value having a positive sign.

Step 2310 includes again comparing the duty cycle state to a duty cycle threshold. In some embodiments, a second crossing of the duty cycle state and the threshold is used to estimate when polarity has switched, is about to switch, is likely to switch, or otherwise has a high probability of switching. In some embodiments, upon the second comparison, the control system may proceed to step 2312.

Step 2312 includes switching the initialized polarity. In some embodiments, the control system may update a flag, update a stored value, update a parameter value, or otherwise provide an instruction to indicate the switch.

Step 2314 includes outputting the switched polarity. In some embodiments, step 2314 includes a central controller outputting the polarity to a phase controller or motor controller. In some embodiments, the control system may output the polarity for storage in memory to be used to determine a phase current. In some embodiments, the control system may output the polarity to another algorithm or portion of algorithm to estimate a translator position, a translator velocity, estimate a phase current (e.g., a desired current or an applied current).

In an illustrative example, process 2300 may be applied during braking, while maintaining a braking current for each phase at a fixed relative magnitude, although the polarity switches, depending on translator position (e.g., magnetic pole positions relative to the phase). In this illustrative example, phase current information is available. At step 2302, the control system may initialize a polarity value to "positive." At step 2304, the control system may define a near-zero, but nonzero, threshold value. At step 2306, the control system may determine a recent PWM value (e.g., the last PWM value), indicative of the control signal duty cycle required for the power electronics system to maintain the current. At step 2308, the control system may determine whether the product of the determined duty cycle and the initialized polarity is greater than the threshold (e.g., positive value here). If the product of the determined duty cycle and the initialized polarity is greater than the threshold, then the control system returns to step 2306 and repeats. If the product of the determined duty cycle and the initialized polarity is not greater than the threshold, then the control system proceeds to step 2310. In some embodiments, at step 2310, the control system determines whether the threshold crossing is the second crossing since the last polarity switch. In some embodiments, at step 2310, the control system determines when the next threshold crossing after step 2308 occurs. When the polarity of the determined duty cycle switches, the threshold value may switch as well. At step 2310, the control system may determine that the product of the determined duty cycle and the initialized polarity (i.e., now negative) is not greater than the threshold (i.e., also negative), and proceed to step 2312. At step 2312, the control system switches the polarity to "negative," and at step 2314, the control system outputs the negative polarity. Process 2300 continues until braking is completed. Illustrative panel 2350 shows the aforementioned example. In some embodiments, the absolute value of the determined duty cycle is compared to a positive threshold value. In some embodiments, not using absolute value, where the product of the determined duty cycle and the present polarity compared with the threshold value, the threshold value changes sign only when polarity is changed. Table 1 shows an illustrative state diagram corresponding to illustrative panel 2350.

In some circumstances, an event may include a fault event associated with a DC bus, a component coupled to the DC bus, a grid tie inverter, an AC grid, or a combination thereof. In some such circumstances, the DC bus may be compromised, unregulated, or otherwise unreliable to transfer energy from a translator to an AC grid. A brake resistor allows for energy dissipation, which may

TABLE 1

Illustrative state diagram of panel 2350 of FIG. 23.

Figure 24:
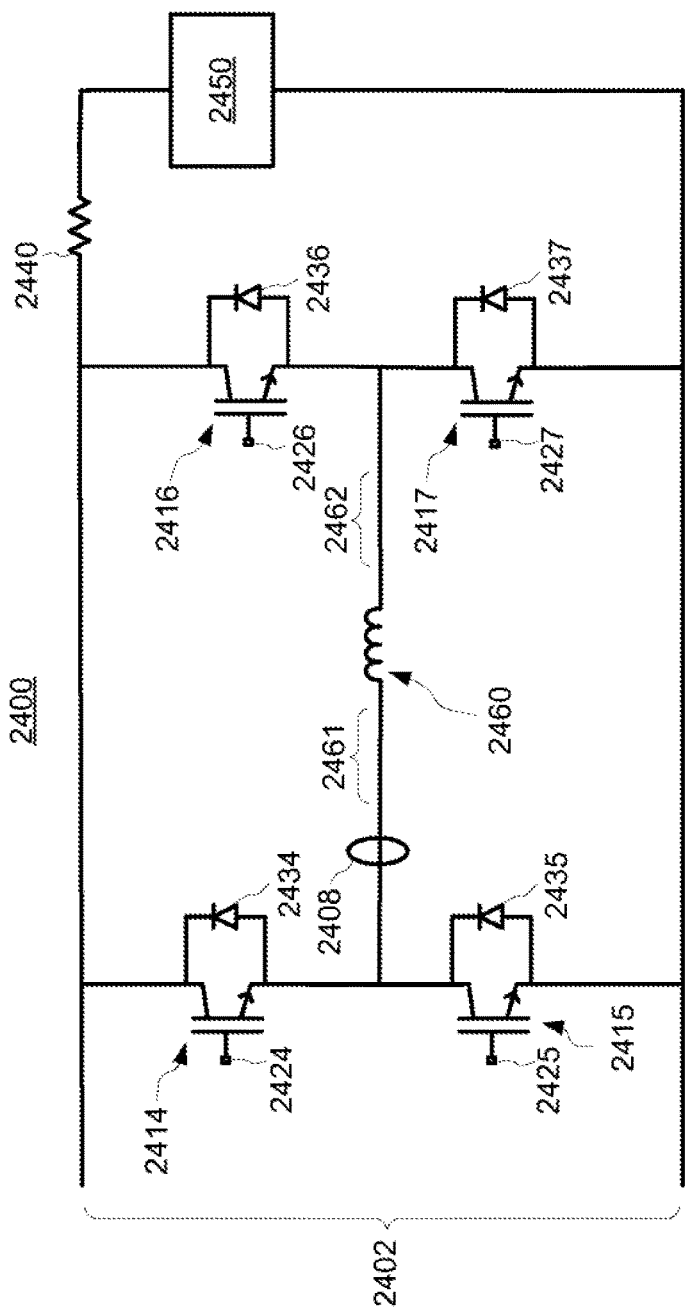
FIG. 24 shows a block diagram of an illustrative power electronics system having a brake resistor and a switch, and one phase of a multiphase machine, in accordance with some embodiments of the present disclosure.
Figure 25:
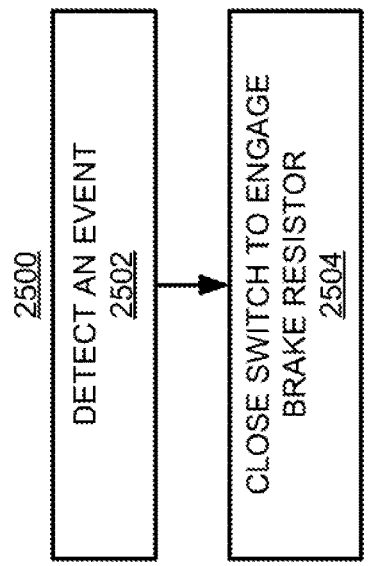
FIG. 25 shows a flowchart of an illustrative process for engaging a brake resistor, in accordance with some embodiments of the present disclosure.

| Index | Comparison | Polarity | Dthreshold |
|---|---|---|---|
| A | D × Polarity > Dthreshold, True | 1 | +0.05 |
| B | D × Polarity > Dthreshold, True | 1 | +0.05 |
| C | D × Polarity > Dthreshold, False | 1 → −1 | +0.05 |
| D | D × Polarity > Dthreshold, False | −1 | −0.05 |
| E | D × Polarity > Dthreshold, True | −1 | −0.05 |
| F | D × Polarity > Dthreshold, False | −1 → 1 | −0.05 |
| G | D × Polarity > Dthreshold, False | 1 | −0.05 | help to brake a translator. In some embodiments, a brake resistor may be coupled to phase leads to remove energy, in addition to the control system performing one or more of the disclosed braking techniques. For example, in order to controllably slow a translator to a stop (e.g., stop reciprocating), the use of a brake resistor may accompany the application of phase currents to generate a force that opposes translator motion. In some embodiments, the use of a brake resistor still requires a functioning motor controller (e.g., one or more phase controllers having position information, current information, or both) and a functioning power electronics system. FIG. 24 shows a block diagram of illustrative power electronics system 2400 having brake resistor 2440 and switch 2450, and one phase of a multiphase machine, in accordance with some embodiments of the present disclosure. FIG. 25 shows a flowchart of illustrative process 2500 for engaging a brake resistor, in accordance with some embodiments of the present disclosure. Step 2502 of FIG. 25 includes detecting an event (e.g., a fault event or a failure event), and step 2504 includes closing a switch to engage a brake resistor in response to the detection.

System 2400 includes an H-bridge configuration including switches 2414-2417 and fly-back diodes 2434-2437 coupled to phase 2460 of an electromagnetic machine by phase leads 2461 and 2462. The H-bridge is coupled to DC bus 2402, which may be regulated or otherwise maintained by a grid tie inverter or other suitable equipment, for example. Current sensor 2408 is configured to sense current in phase 2460 and output a sensor signal to a control system, for example. The electromagnetic machine may include multiple phases, each coupled by a respective H-bridge. Although shown as coupled to an H-bridge, in some embodiments, phase 2460 may be coupled to a wye-neutral connection (e.g., included in a star configuration). Accordingly, in some such embodiments, only two switches, rather than four, are used, with the other side of the H-bridge replaced by a neutral connection (e.g., resulting in a half H-bridge). Any suitable switch topology may be used in the context of process 2500.

Switches 2414-2417 may include transistors or any other suitable controllable solid-state switches. For example, switches 2414-2417 may include IGBTs, MOSFETs, or other suitable switches for which the control system is coupled to the respective gate terminals 2424-2427 configured to open or close the corresponding switches (e.g., gate terminals may each include two terminals to produce a voltage difference in some embodiments). Switches 2414-2417 are configured in parallel with respective fly-back diodes 2434-2437 to prevent large voltage spikes when switched (e.g., due to the inductance of phase 2460). Switches 2414 and 2416 may be referred to as high-voltage switches (e.g., coupled to a high-voltage bus line of DC bus 2402). Switches 2415 and 2417 may be referred to as low-voltage switches (e.g., coupled to a low-voltage bus line of DC bus 2402). Further, switches 2414 and 2415 may be associated with a first side of the H-bridge, and switches 2416 and 2417 may be associated with a second side of the H-bridge.

Switch 2450 may include any suitable switch such as, for example, a transistor, a contactor, a relay, any other suitable controllable switch or any combination thereof. Switch 2450 is open (i.e., not forming an electrically conductive path) during normal operation, such that it does not short DC bus 2402 through brake resistor 2440 (e.g., thus wasting energy). When an event is detected, the control system may close switch 2450 (e.g., forming an electrically conductive path), thus coupling brake resistor 2440 to both bus lines of DC bus 2402. Accordingly, when braking, brake resistor will experience a voltage drop equal to, or nearly equal to, the voltage across DC bus 2402. The voltage across DC bus 2402 may be hundreds of volts, or more, for example. During braking, brake resistor 2440 dissipates energy according to its ohmic loss. For example, the dissipated power is determined from Power=I²R, while dissipated energy is equal to integral of Power over time. In an illustrative example, because switch 2450 undergoes a one-or-two throw cadence during a normal operation-to-braking-to-stopped cadence (e.g., off-on, or off-on-off), switch 2450 may include a contactor or other non-solid-state switch (e.g., because it is not typically cycled at high frequency).

Passive Brake with Half-Wave Rectifier (2 Diodes)

Figure 26:
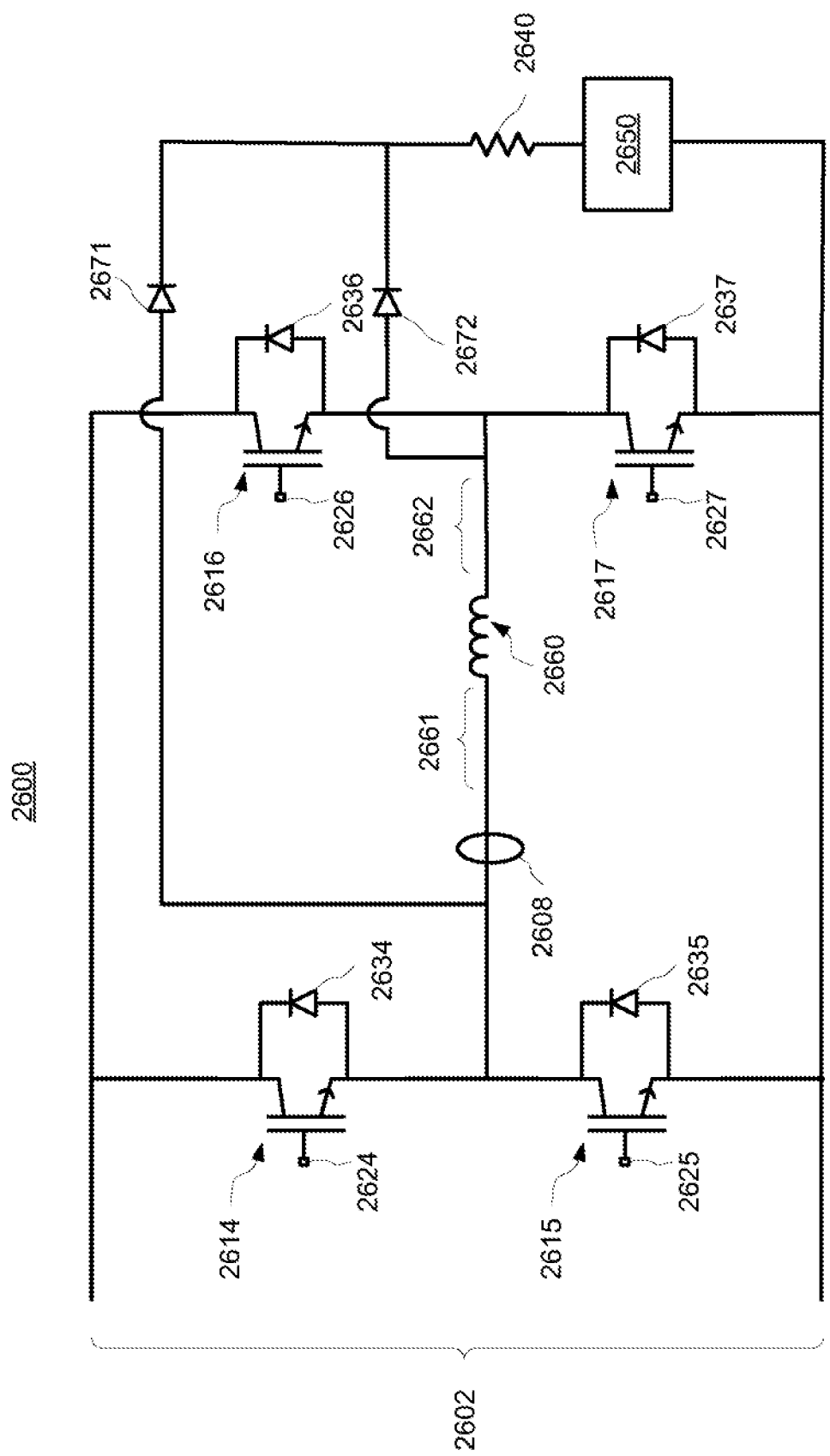
FIG. 26 shows a block diagram of an illustrative power electronics system having a brake resistor, a switch, and a diode pair, and one phase of a multiphase machine, in accordance with some embodiments of the present disclosure.

In some embodiments, a half-wave rectifier may be used in conjunction with a brake resistor to cause a translator to brake. The half-wave rectifier may include two diodes coupling a phase to a brake resistor. FIG. 26 shows a block diagram of illustrative power electronics system 2600 having brake resistor 2640, switch 2650 and diodes 2671-2672, and one phase of a multiphase machine, in accordance with some embodiments of the present disclosure. Illustrative process 2500 of FIG. 25 for engaging a brake resistor may be applied to system 2600, with the additional consideration that step 2502 includes maintaining switches 2614-2617 open, in accordance with some embodiments of the present disclosure.

System 2600 includes an H-bridge configuration including switches 2614-2617 and fly-back diodes 2634-2637 coupled to phase 2660 of an electromagnetic machine by phase leads 2661 and 2662. The H-bridge is coupled to DC bus 2602, which may be regulated or otherwise maintained by a grid tie inverter, for example. Current sensor 2608 is configured to sense current in phase 2660 and output a sensor signal to a control system, for example. The electromagnetic machine may include multiple phases, each coupled by a respective H-bridge. Although shown as coupled to an H-bridge, in some embodiments, phase 2660 may be coupled to a neutral connection (e.g., included in a star configuration). Accordingly, in some such embodiments, only two switches, rather than four, are used, with the other side of the H-bridge replaced by a neutral connection (e.g., resulting in a half H-bridge). Any suitable switch topology may be used in the context of process 2500.

Switches 2614-2617 may include transistors or any other suitable controllable solid-state switches. For example, switches 2614-2617 may include IGBTs, MOSFETs, or other suitable switches for which the control system is coupled to the respective gate terminals 2624-2627 configured to open or close the corresponding switches (e.g., gate terminals may each include two terminals to produce a voltage difference in some embodiments). Switches 2614-2617 are configured in parallel with respective fly-back diodes 2634-2637 to prevent large voltage spikes when switched (e.g., due to the inductance of phase 2660). Switches 2614 and 2616 may be referred to as high-voltage switches (e.g., coupled to a high-voltage bus line of DC bus 2602). Switches 2615 and 2617 may be referred to as low-voltage switches (e.g., coupled to a low-voltage bus line of DC bus 2602). Further, switches 2614 and 2615 may be associated with a first side of the H-bridge, and switches 2616 and 2617 may be associated with a second side of the H-bridge.

Diode 2671 is coupled to phase lead 2661 and brake resistor 2640, allowing current flow only from phase lead 2661 to brake resistor 2640. Diode 2672 is coupled to phase lead 2662 and brake resistor 2640, allowing current flow only from phase lead 2662 to brake resistor 2640. Diodes 2671 and 2672 have similar polarity relative to brake resistor 2640, creating a half-wave rectifier. The relative positions of brake resistor 2640 and switch 2650 may be swapped (e.g., as long as they are in series, the order need not be as illustrated).

Switch 2650 may include any suitable switch such as, for example, a transistor, a contactor, a relay, any other suitable controllable switch or any combination thereof. Switch 2650 is open (i.e., not forming an electrically conductive path) during normal operation, such that it does not interfere with operation of switches 2614-2617. When an event is detected, the control system may close switch 2650 (e.g., forming an electrically conductive path), and hold or otherwise maintain switches 2614-2617 open. When switches 2614-2617 are all open, any emf generated by a translator interacting with phase 2660 will cause a current to flow through either diode 2671 and 2672 to brake resistor 2640 (e.g., and subsequently to the low-voltage bus line of DC bus 2602). In some embodiments, the control system need not apply a signal to gate terminals 2624-2627 to maintain respective switches 2614-2617 open (e.g., the gate terminals may be pulled down). During braking, brake resistor 2440 dissipates energy from the induced current according to its ohmic loss. For example, the dissipated power is determined from Power=I²R, while dissipated energy is equal to an integral of Power over time. In an illustrative example, because switch 2450 undergoes a one-or-two throw cadence during a normal operation-to-braking-to-stopped cadence (e.g., off-on, or off-on-off), switch 2450 may include a contactor or other non-solid-state switch (e.g., because it is not typically cycled at high frequency).

Figure 27:
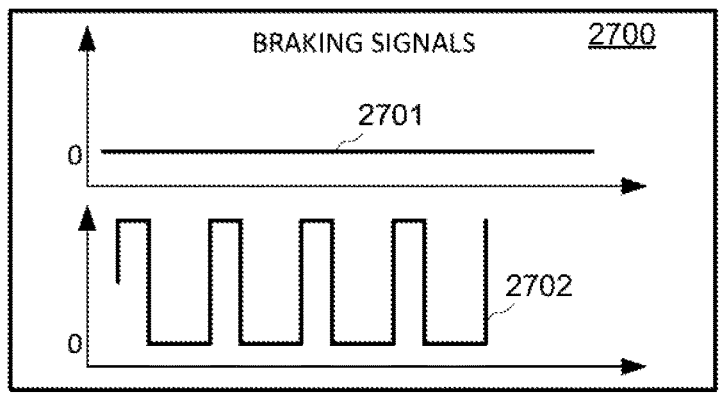
FIG. 27 shows illustrative braking signals for applying to a power electronics system, in accordance with some embodiments of the present disclosure.
Figure 28:
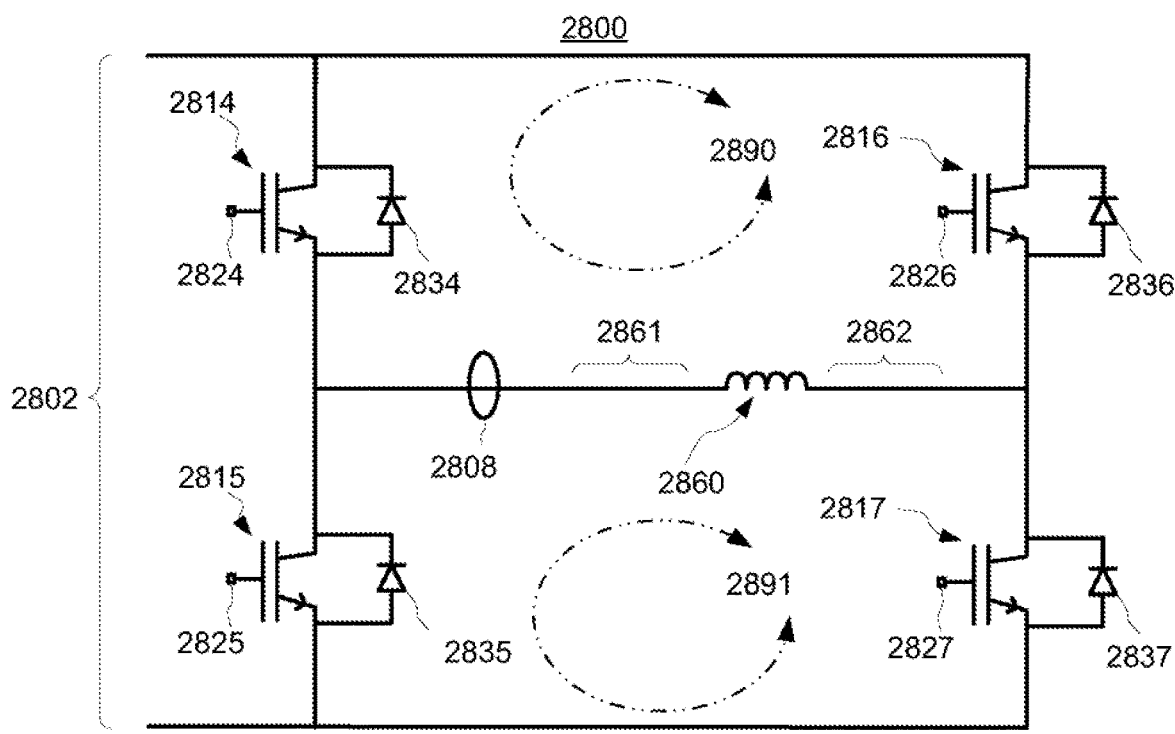
FIG. 28 shows a block diagram of an illustrative power electronics system configured to receive braking signals, in accordance with some embodiments of the present disclosure.
Figure 29:
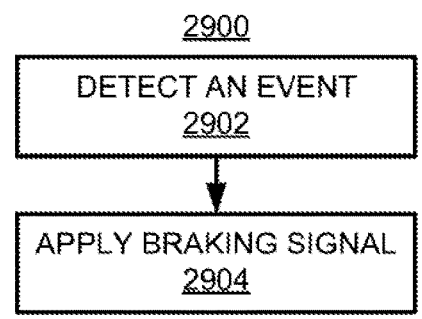
FIG. 29 shows a flowchart of an illustrative process for applying braking signals, in accordance with some embodiments of the present disclosure.

In some embodiments, the control system may generate braking signals, and a power electronics system applies the braking signals to control one or more switches coupled to a phase. For example, in the context of an H-bridge configuration, the power electronics system may apply suitable braking signals to suitable switches to cause a translator to brake. FIG. 27 shows illustrative braking signals for applying to a power electronics system, in accordance with some embodiments of the present disclosure. FIG. 28 shows a block diagram of illustrative power electronics system 2800 configured to receive braking signals, in accordance with some embodiments of the present disclosure. FIG. 29 shows a flowchart of illustrative process 2900 for applying braking signals, in accordance with some embodiments of the present disclosure.

Brake signals 2700 include signals applied to switches of a power electronics system, which may be configured to apply corresponding currents to phases of a multiphase electromagnetic machine. Braking signal 2701 includes a zero, or null signal, which is configured to maintain a switch open. In some embodiments, the lack of an applied signal may constitute signal 2701. For example, the gate of a switch may be pulled down to ground and in the absence of an applied signal, may be maintained at zero volts. Braking signal 2702 includes both on and off intervals. For example, as illustrated in FIG. 27, braking signal 2702 includes a PWM signal with roughly a 30% duty cycle. Brake signal 2702 may include any suitable signal shape in time that includes on and off periods. For example, brake signal 2702 may include a sinusoidal signal, a square wave, a triangular wave, a sawtooth wave, a chirp signal, a wavelet, any other suitable shape or waveform, or modulation thereof, having a regular or irregular period, or any combination thereof.

System 2800 includes an H-bridge configuration including switches 2814-2817 and fly-back diodes 2834-2837 coupled to phase 2860 of an electromagnetic machine by phase leads 2861 and 2862. The H-bridge is coupled to DC bus 2802, which may be regulated or otherwise maintained by a grid tie inverter, for example. Current sensor 2808 is configured to sense current in phase 2860 and output a sensor signal to a control system, for example. The electromagnetic machine may include multiple phases, each coupled by a respective H-bridge. Although shown as coupled to an H-bridge, in some embodiments, phase 2860 may be coupled to a neutral connection (e.g., included in a star configuration). Accordingly, in some such embodiments, only two switches, rather than four, are used, with the other side of the H-bridge replaced by a neutral connection (e.g., resulting in a half H-bridge). Any suitable switch topology may be used in the context of process 2900.

Switches 2814-2817 may include transistors or any other suitable controllable solid-state switches. For example, switches 2814-2817 may include IGBTs, MOSFETs, or any other suitable switch for which the control system is coupled to the respective gate terminals 2824-2827 configured to open or close the corresponding switches (e.g., gate terminals may each include two terminals to produce a voltage difference in some embodiments). Switches 2814-2817 are configured in parallel with respective fly-back diodes 2834-2837 to prevent large voltages when switched (e.g., due to the inductance of phase 2860). Switches 2814 and 2816 may be referred to as high-voltage switches (e.g., coupled to a high-voltage bus line of DC bus 2802). Switches 2815 and 2817 may be referred to as low-voltage switches (e.g., coupled to a low-voltage bus line of DC bus 2802). Further, switches 2814 and 2815 may be associated with a first side of the H-bridge, and switches 2816 and 2817 may be associated with a second side of the H-bridge.

Referencing FIG. 28, the control system may operate the H-bridge to brake translator by activating either both the high-voltage switches or both the low voltage switches, with the remaining switches maintained open (e.g., not activated). Table 2 shows illustrative control signals. Step 2902 of FIG. 29 includes detecting an event (e.g., a fault event), and step 2904 includes applying braking signals in response to the detection (e.g., implementing modes Braking A or Braking B of Table 2).

TABLE 2

Illustrative control signals to H-bridge switches, for normal operation and braking

| | Switch 2814 | Switch 2815 | Switch 2816 | Switch 2817 |
|---|---|---|---|---|
| Normal operation | PWM based on position | PWM based on position | PWM based on position | PWM based on position |
| Braking A | Signal 2701 | Signal 2702 | Signal 2701 | Signal 2702 |
| Braking B | Signal 2702 | Signal 2701 | Signal 2702 | Signal 2701 |

As shown in Table 2, during normal operation, the control signal to each of switches 2814-2817 may include a PWM signal determined based on position information, phase current information, any other suitable information, or any combination thereof. For example, the control system executes a feedback control loop for current for each phase by determining a least norm current solution for all phase currents to achieve a desired electromagnetic force.

As shown in Table 2, during Braking A, the control signal to each of switches 2814-2817 may include a braking signal, which may be, but need not be, independent of position or current information. Referencing operation during Braking A, the low-voltage switches (i.e., switches 2815 and 2817 as shown in FIG. 28) are closed according to a non-zero braking signal, while the high-voltage switches (i.e., switches 2814 and 2816 as shown in FIG. 28) are maintained open according to a zero braking signal. To illustrate, during braking A, current loop 2891 is formed, which allows current to flow and dissipate energy to the low-voltage bus line. Because braking signal 2702 includes both on and off intervals, the energy transfer from phase 2860 may be non-steady. During Braking A, high-voltage switches 2814 and 2816 are maintained open to prevent short-circuiting between the low and high bus lines of DC bus 2802.

As shown in Table 2, during Braking B, the control signal to each of switches 2814-2817 may include a braking signal, which may be, but need not be, independent of position or current information. Referencing operation during Braking B, the high-voltage switches (i.e., switches 2814 and 2816 as shown in FIG. 28) are closed according to a non-zero braking signal, while the low-voltage switches (i.e., switches 2815 and 2817 as shown in FIG. 28) are maintained open according to a zero braking signal. To illustrate, during braking A, current loop 2890 is formed, which allows current to flow and dissipate energy to the low-voltage bus line. Because braking signal 2702 includes both on and off intervals, the energy transfer from phase 2860 may be non-steady. During Braking B, low-voltage switches 2815 and 2817 are maintained open to prevent short-circuiting between the low and high bus lines of DC bus 2802.

In some embodiments, during braking, a control system may switch between, or alternate among Braking A and Braking B. For example, the control system may alternate between Braking A and Braking B to prevent any switch pair (e.g., low-voltage switch pair or high-voltage switch pair) from overheating, or to otherwise balance the energy transfer among the switches of the H-bridge. In some embodiments, Braking A, Braking B, or both may be included along with other braking techniques (e.g., any of the illustrative techniques of the present disclosure), during braking in response to detecting an event. In some embodiments, in the context of phase coupled in a star configuration, more than one phase may be used to create a current loop (e.g., similar to current loop 2890 or 2891).

Figure 30:
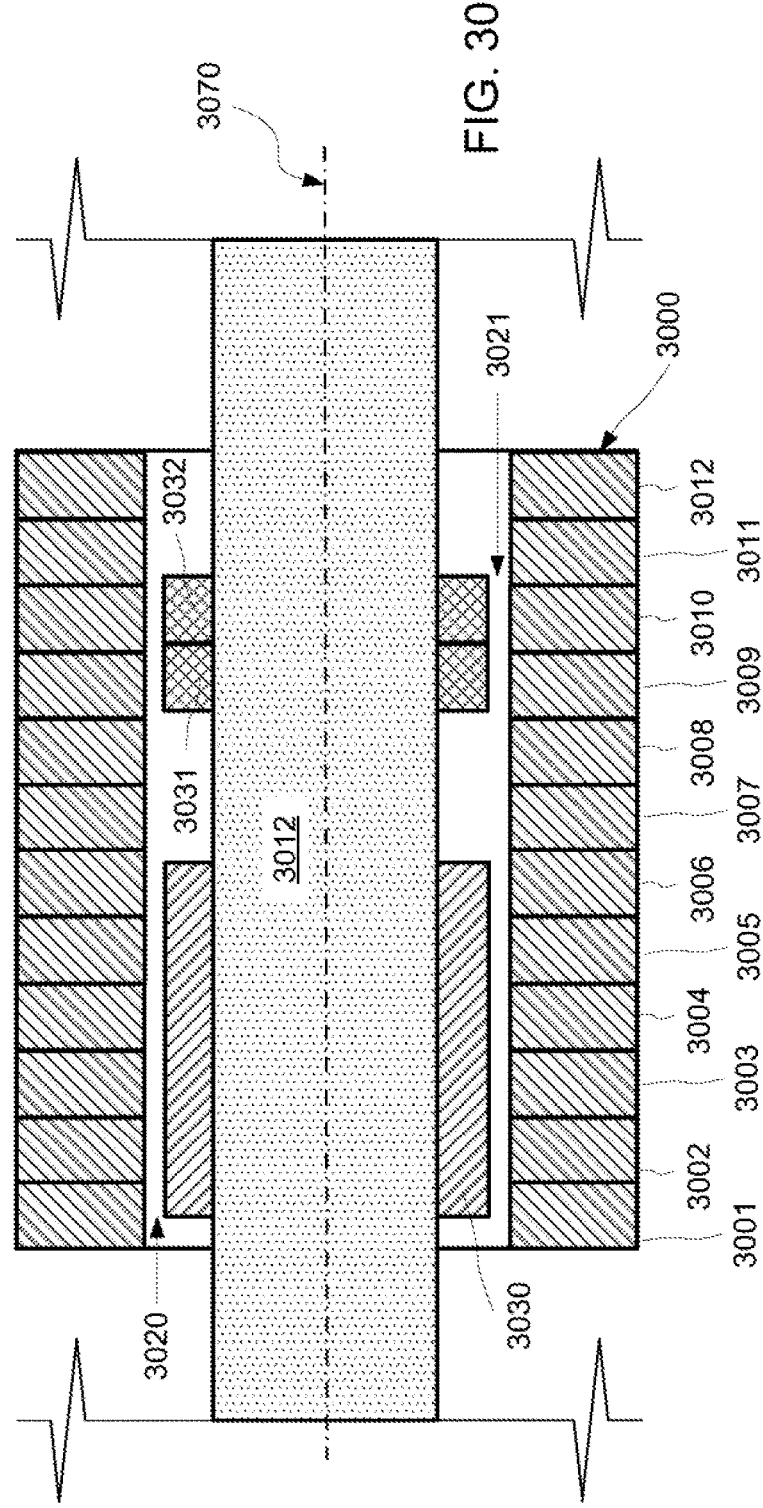
FIG. 30 shows a cross-sectional view of a stator and a translator, configured for linear eddy current braking, in accordance with some embodiments of the present disclosure.
Figure 31:
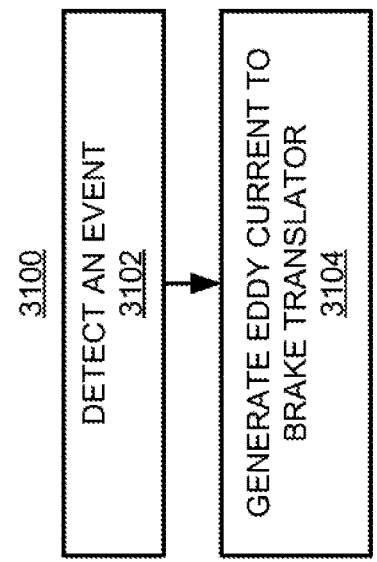
FIG. 31 shows a flowchart of an illustrative process for engaging an eddy current brake, in accordance with some embodiments of the present disclosure.

In some embodiments, a linear multiphase electromagnetic machine is configured to include an eddy current brake. For example, a magnetic field is generated by one or more phases in a conductive material of a translator, which generates an eddy current that causes a force that opposes motion of the translator. FIG. 30 shows a cross-sectional view of stator 3000 and translator 3012, configured for linear eddy current braking, in accordance with some embodiments of the present disclosure. Stator 3000 and translator 3012 are part of a linear multiphase electromagnetic machine. Stator 3000 includes phases 3001, 3002, 3003, 3004, 3005, 3006, 3007, 3008, 3009, 3010, 3011, and 3012, arranged axially along axis 3070. Translator 3012 includes magnet section 3030 and conductive sections 3031 and 3032 arranged axially offset from magnet section 3030. Although not shown in FIG. 30, translator 3012 may include additional conductive sections on the other side of magnet section 3020 from conductive sections 3031 and 3032 (e.g., such that magnet section 3030 is axially between conductive sections). FIG. 31 shows a flowchart of illustrative process 3100 for engaging an eddy current brake, in accordance with some embodiments of the present disclosure. Step 3102 includes detecting an event such as, for example, a fault event or failure event. Step 3104 includes generating an eddy current to brake a translator, in response to detecting the event.

A conductive section, in the context of eddy current braking, may include any suitable electrically conductive material. For example, a conductive section (e.g., conductive sections 3031 and 3032) may include aluminum, copper, steel, stainless steel, an alloy, any other suitable material, or any combination thereof. In a further example, a conductive section (e.g., conductive sections 3031 and 3032) may include any suitable geometric properties such as axial thickness, cross-section shape, outer diameter, inner diameter, mounting features (e.g., bosses or recesses), cooling features (e.g., fins, ribs or grooves), any other suitable geometric properties, or any combination thereof. To illustrate, the conductive section may include a metal ring affixed to a translator rod/tube and configured to form a predetermined airgap with a stator.

Magnet section 3030 and stator 3000 have an associated air gap 3020, which may be configured to affect electromagnetic interactions. For example, air gap 3020 may affect reluctance, a force constant, motor efficiency, and any other suitable operating parameters. Conductive sections 3031 and 3032 and stator 3000 have an associated air gap 3021, which may be configured to affect electromagnetic interactions. Air gap 3021 may be the same as, or different from, air gap 3020. For example, air gap 3021 may affect a magnetic field at conductive sections 3031 and 3032, an eddy current in conductive sections 3031 and 3032, and any other suitable operating parameters.

During operation (e.g., both normal operation and braking), magnet section 3030 may be axially aligned with a subset of phases of stator 3000. As illustrated in FIG. 30, for example, magnet section 3030 is axially aligned with phases 3001-3006, and axially offset from phases 3007-3012. Accordingly, phases 3001-3006 may interact electromagnetically with magnet section 3030, while phases 3007-3012 do not electromagnetically interact with magnet section 3030 significantly. In an illustrative example, phase currents may be applied to phases 3001-3006 to generate a braking force on translator 3012.

Conductive sections 3031 and 3032, as illustrated in FIG. 30, are axially aligned at least partially with phases 3010-3012. Because phases 3009-3011 are part of the subset of phases 3007-3012 that are axially offset from magnet section 3030, the current in phases 3009-3011 may be used for eddy current braking. For example, during normal operation in the absence of conductive sections 3031 and 3032, when translator 3012 is at the position illustrated in FIG. 30, phase current need not be applied to phases 3007-3012. Application of current to phases 3007-3012 in this spatial configuration would not produce a significant electromagnetic force on translator 3012. In a further example, during normal operation in the presence of conductive sections 3031 and 3032, when translator 3012 is at the position illustrated in FIG. 30, phase current is not applied to phases 3007-3012 (e.g., which would cause eddy current braking). In response to an event being detected, a control system may determine a subset of phases that are axially offset from magnet section 3030 and axially aligned with conductive sections 3031 and 3032 and apply current to those phases (e.g., phases 3009-3011 as illustrated in FIG. 30). In an illustrative example, the control system may apply a current to at least one of phases 3009-3011 to generate an eddy current in conductive sections 3031 and 3032 depending on axial alignment (e.g., phase 3009 may be used to generate eddy current in conductive sections 3031 because they are axially aligned). The applied current may have any suitable temporal character including, for example, a sinusoidal amplitude, a pulsed amplitude, a square-wave amplitude, a constant amplitude, any other suitable amplitude, or any combination thereof. As translator 3012 moves axially along axis 3070 during braking, the subset of phases that are axially aligned and that are axially offset may change. Accordingly, the control system may apply phase currents to suitable phases for generating an eddy current. For example, the control system may determine phases that have associated non-zero force constants with respect to magnet section 3030 and deem those phases as potential phases to apply current for eddy current braking. For example, the control system may determine phases that are axially aligned with conductive section 3031, conductive section 3032, or both, and deem those phases as potential phases to apply current for eddy current braking.

Figure 32:
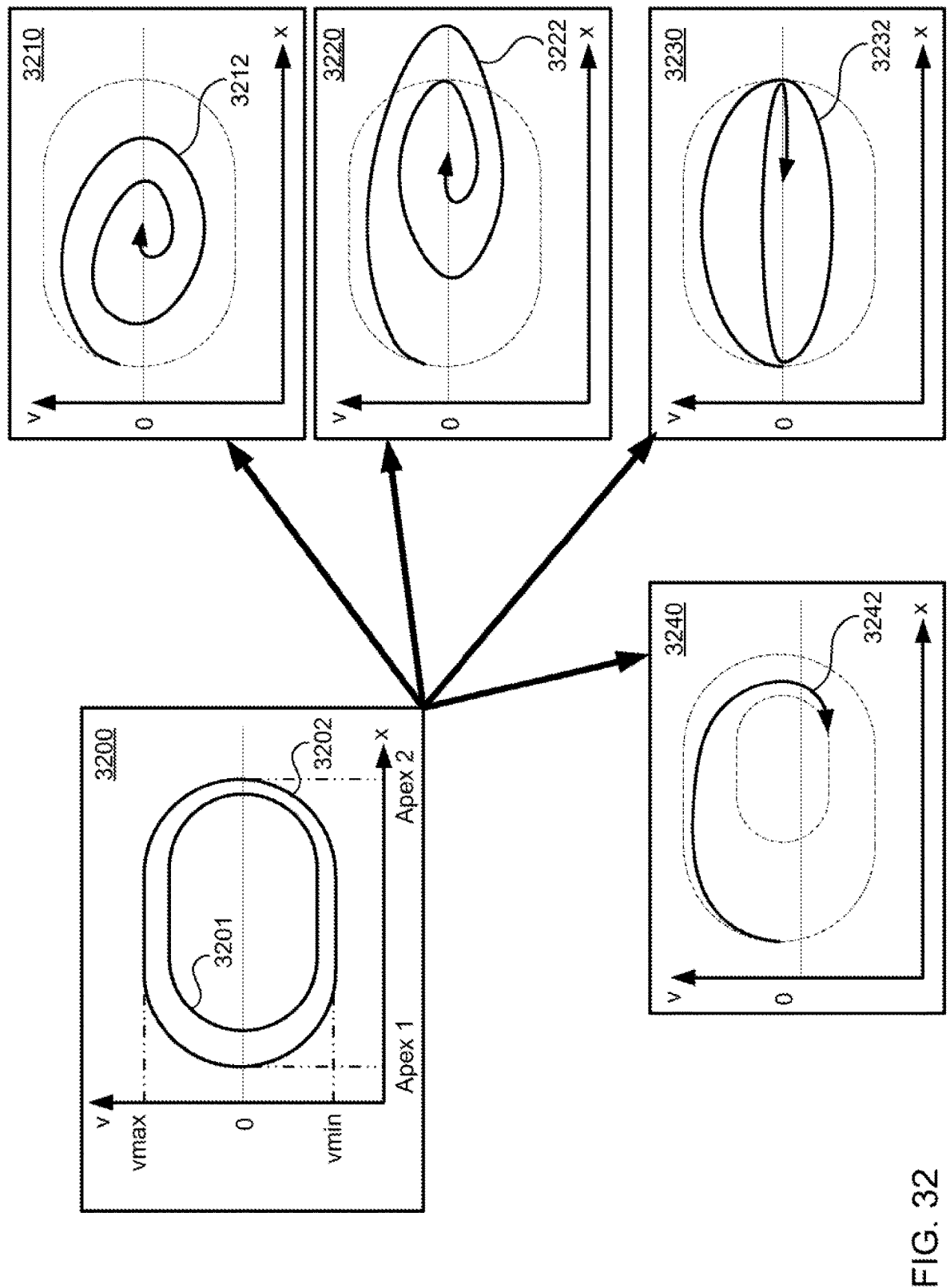
FIG. 32 shows illustrative position-velocity trajectories associated with a translator, in accordance with some embodiments of the present disclosure.

FIG. 32 shows illustrative position-velocity trajectories associated with a translator, in accordance with some embodiments of the present disclosure. Panel 3200 shows position-velocity trajectory 3201 and position-velocity trajectory 3202, which includes larger translator speeds (e.g., equal to the absolute value of velocity) and a larger stroke (e.g., equal to the difference between apex position 1 and apex position 2). Position-velocity trajectory 3202 may correspond to a relatively higher-power operating condition of a free-piston machine. Position-velocity trajectories 3201 and 3202 are substantially steady and correspond to normal operation or otherwise steady operation. A translator may move among position-velocity trajectories during normal operation (e.g., load following), or may remain operating substantially at a particular position-velocity trajectory.

Panel 3210 shows position-velocity trajectory 3212 during braking, from normal operation to a final velocity of zero (i.e., stopped). Position-velocity trajectory 3212 lessens in both peak velocity and stroke length during each subsequent stroke. In some embodiments, position-velocity trajectory 3212 is illustrative of braking processes disclosed herein.

Panel 3220 shows position-velocity trajectory 3222 during braking, from normal operation to a final velocity of zero (i.e., stopped). Position-velocity trajectory 3222 lessens in peak velocity during each subsequent stroke. The stroke length of position-velocity trajectory 3222 initially increases, and then decreases to zero (i.e., when the velocity is zero). In some embodiments, position-velocity trajectory 3222 is illustrative of braking processes disclosed herein.

Panel 3230 shows position-velocity trajectory 3232 during braking, from normal operation to a final velocity of zero (i.e., stopped). Position-velocity trajectory 3232 lessens in peak velocity during each subsequent stroke. The stroke length of position-velocity trajectory 3232 remains substantially fixed until it decreases to zero (i.e., when the velocity is zero). In some embodiments, position-velocity trajectory 3232 is illustrative of braking processes disclosed herein.

Panel 3240 shows position-velocity trajectory 3242 during braking, transitioning from a first operating state to a second operating state having a lower associated operating power. Position-velocity trajectory 3242 lessens in peak velocity and stroke length during the transition. In some embodiments, position-velocity trajectory 3242 is illustrative of braking processes disclosed herein.

It will be understood that position-velocity trajectories 3201, 3202, 3212, 3222, 3232, and 3242 are merely illustrative, and that a translator may achieve any suitable trajectory during normal operation and braking, in accordance with present disclosure. For example, in some embodiments, a translator undergoing braking may slow down over many cycles (e.g., more than shown in FIG. 32), one cycle, or any suitable number of cycles or a portion thereof. In a further example, the end state of the braking trajectory may be fully-stopped (e.g., a velocity of zero), or an operating condition having a relatively smaller velocity (i.e., lower kinetic energy), stroke length, or a combination thereof.

The above-described embodiments of the present disclosure are presented for purposes of illustration and not of limitation, and the present disclosure is limited only by the claims that follow. Additionally, it should be noted that any of the systems, devices or equipment disclosed herein may be used to perform one or more of the steps of any process disclosed herein. For example, an of the illustrative LEM topologies of FIGS. 4-7 may be used in connection with any of the systems and processes described in the context of FIGS. 9-32. Furthermore, it should be noted that the features and limitations described in any one embodiment may be applied to any other embodiment herein, and flowcharts or examples relating to one embodiment may be combined with any other embodiments in a suitable manner, done in different orders, performed with addition steps, performed with omitted steps, or done in parallel. For example, each of these steps may be performed in any order or in parallel or substantially simultaneously to reduce lag or increase the speed of the system or method. In addition, the systems and methods described herein may be performed in real time. It should also be noted that the systems and/or methods described above may be applied to, or used in accordance with, other systems and/or methods.

It will be understood that the present disclosure is not limited to the embodiments described herein and can be implemented in the context of any suitable system. In some suitable embodiments, the present disclosure is applicable to reciprocating engines and compressors. In some embodiments, the present disclosure is applicable to free-piston engines and compressors. In some embodiments, the present disclosure is applicable to combustion and reaction devices such as a reciprocating engine and a free-piston engine. In some embodiments, the present disclosure is applicable to non-combustion and non-reaction devices such as reciprocating compressors and free-piston compressors. In some embodiments, the present disclosure is applicable to gas springs. In some embodiments, the present disclosure is applicable to oil-free reciprocating and free-piston engines and compressors. In some embodiments, the present disclosure is applicable to oil-free free-piston engines with internal or external combustion or reactions. In some embodiments, the present disclosure is applicable to oil-free free-piston engines that operate with compression ignition, spark ignition, or both. In some embodiments, the present disclosure is applicable to oil-free free-piston engines that operate with gaseous fuels, liquid fuels, or both. In some embodiments, the present disclosure is applicable to linear free-piston engines. In some embodiments, the present disclosure is applicable to engines that can be combustion engines with internal combustion/reaction or any type of heat engine with external heat addition (e.g., from a heat source or external reaction such as combustion).

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method for braking a translator of a linear multiphase electromagnetic machine, wherein the linear multiphase electromagnetic machine is coupled to a DC bus, and wherein a resistor and at least one switch are coupled in series across the DC bus, the method comprising:
   detecting, using circuitry, a fault event, wherein the at least one switch is in an open position prior to detecting the fault event; and
   in response to detecting the fault event, causing the translator of the linear multiphase electromagnetic machine to brake by closing the at least one switch.

2. The method of claim 1, wherein the DC bus is coupled to a grid-tie inverter, and wherein detecting the fault event comprises detecting a fault selected from at least one of the group: the DC bus and the grid-tie inverter.

3. The method of claim 1, wherein:
   each phase of the linear multiphase electromagnetic machine comprises a respective first phase lead and a respective second phase lead,
   each first phase lead is coupled to a first side of a respective H-bridge coupled across the DC bus,
   each second phase lead is coupled to a second side of the respective H-bridge across the DC bus,
   each first phase lead is coupled by a first respective diode to the resistor, wherein the first respective diode has a polarity relative to the resistor, and
   each second phase lead is coupled by a second respective diode to the resistor, wherein the respective second diode has the polarity relative to the resistor, and wherein causing the translator to brake further comprises causing switches of each first side and switches of each second side of each respective H-bridge to remain open.

4. The method of claim 3, wherein the polarity relative to the resistor allows current to flow from each first phase lead to the resistor, and wherein the polarity relative to the resistor allows current to flow from each second phase lead to the resistor.

5. The method of claim 1, wherein:
   each phase of the linear multiphase electromagnetic machine comprises a respective first phase lead and a respective second phase lead,
   each first phase lead is coupled to a neutral wye connection,
   each second phase lead is coupled to a side of the respective half H-bridge across the DC bus,
   each first phase lead is coupled by a first respective diode to the resistor, wherein the first respective diode has a polarity relative to the resistor, and
   each second phase lead is coupled by a second respective diode to the resistor, wherein the respective second diode has the polarity relative to the resistor, and wherein causing the translator to brake further comprises causing switches of each first side and the switches of each respective half H-bridge to remain open.

6. The method of claim 5, wherein the polarity relative to the resistor allows current to flow from each first phase lead to the resistor, and wherein the polarity relative to the resistor allows current to flow from each second phase lead to the resistor.

7. The method of claim 1, wherein the DC bus comprises a first bus and a second bus, and wherein closing the at least one switch allows a current to flow from the first bus to the second bus through the resistor.

8. The method of claim 7, wherein the resistor dissipates energy based on the current flowing from the first bus to the second bus.

9. A method for braking a translator of a linear multiphase electromagnetic machine, wherein:
- each phase of the linear multiphase electromagnetic machine comprises a respective first phase lead and a respective second phase lead;
- each first phase lead is coupled to a first side of a respective H-bridge coupled across a DC bus, wherein the first side comprises a first high-voltage switch and a first low-voltage switch;
- each second phase lead is coupled to a second side of the respective H-bridge across the DC bus, wherein the second side comprises a second high-voltage switch and a second low-voltage switch, the method comprising:
  - detecting, using circuitry, a fault event; and
  - in response to detecting the fault event, applying braking signals to the first high-voltage switch, the first low-voltage switch, the second high-voltage switch, and the second low-voltage switch to cause the translator to brake.

10. The method of claim 9, wherein the braking signals comprise one of:
- a first set of signals comprising:
  - a first signal applied to activate both the first high-voltage switch and the second high-voltage switch for a first time period, and to open the first high-voltage switch and the second high-voltage switch for a second time period; and
  - a second signal applied to open both the first low-voltage switch and the second low-voltage switch during both the first time period and the second time period; and
- a second set of signals comprising:
  - a third signal applied to activate both the first low-voltage switch and the second low-voltage switch for a third time period, and to open the first low-voltage switch and the second low-voltage switch for a fourth time period; and
  - a fourth signal applied to open both the first high-voltage switch and the second high-voltage switch during both the third time period and the fourth time period.

11. The method of claim 10, wherein the first signal comprises an on-off duty cycle, and wherein the third signal comprises an on-off duty cycle.

12. The method of claim 10, wherein the first signal and the third signal each comprises at least one of the group: a sinusoidal signal, a square wave, a triangular wave, a sawtooth wave, a chirp signal, and a wavelet.

13. The method of claim 9, wherein the braking signals are configured to cause:
- a first state wherein the first high-voltage switch and the second high-voltage switch are closed for a first time period;
- a second state wherein the first low-voltage switch and the second low-voltage switch are closed for a second time period that does not overlap the first time period; and
- a third state wherein the first high-voltage switch, the second high-voltage switch, the first low-voltage switch, and the second low-voltage switch are all open for a third time period that does not overlap the first time period or the second time period.

14. The method of claim 9, further comprising determining position information about the translator, wherein the applying the braking signals is further based on the position information.

15. The method of claim 9, wherein the applying the braking signals is independent of position information about the translator.

16. A method for braking a translator of a linear multiphase electromagnetic machine, wherein:
- the linear multiphase electromagnetic machine comprises a stator comprising a plurality of phases;
- the translator comprises:
  - a magnetic section, and
  - at least one conductive section axially offset from the magnetic section; and
- the magnetic section is axially offset from a subset of phases of the plurality of phases, the method comprising:
  - detecting, using circuitry, a fault event; and
  - in response to detecting the fault event, applying to at least one phase of the subset of phases a respective current configured to generate an eddy current in the at least one conductive section, wherein the eddy current generates a force that opposes an axial motion of the translator to cause the translator to brake.

17. The method of claim 16, further comprising determining the subset of phases of the plurality of phases.

18. The method of claim 16, further comprising identifying the at least one phase by determining that the at least one phase is at least partially axially aligned with the at least one conductive section.

19. The method of claim 16, wherein the at least one phase comprises a first phase and a second phase, the at least one conductive section comprises a first conductive section and a second conductive section, the method further comprising:
- identifying the first phase by determining that the first phase is at least partially axially aligned with the first conductive section, wherein the first conductive section is axially offset to a first side of the magnetic section; and
- identifying the second phase by determining that the second phase is at least partially axially aligned with the second conductive section, wherein the second conductive section is axially offset to a second side of the magnetic section, wherein the second side is opposite the first side.

* * * * *